(12) United States Patent
Pellicciari

(10) Patent No.: US 7,343,871 B2
(45) Date of Patent: Mar. 18, 2008

(54) DEVICE FOR SURVEYING THE PRESSURE OF FLUIDS HOUSED IN TANKS OR FLOWING THROUGH DUCTS

(75) Inventor: Marcello Pellicciari, Zola Predosa (IT)

(73) Assignee: Sistec S.r.l., Roncello (IT)

( * ) Notice: Subject to any disclaimer, the term of this patent is extended or adjusted under 35 U.S.C. 154(b) by 0 days.

(21) Appl. No.: 10/582,322

(22) PCT Filed: Dec. 2, 2004

(86) PCT No.: PCT/IT2004/000669

§ 371 (c)(1),
(2), (4) Date: Jun. 9, 2006

(87) PCT Pub. No.: WO2005/057155

PCT Pub. Date: Jun. 23, 2005

(65) Prior Publication Data

US 2007/0079747 A1    Apr. 12, 2007

(30) Foreign Application Priority Data

Dec. 9, 2003   (IT) .......................... BO2003A0737

(51) Int. Cl.
*G01L 17/00* (2006.01)
*B60C 23/00* (2006.01)

(52) U.S. Cl. .................... 116/34 R; 116/266; 340/626; 73/146.8

(58) Field of Classification Search .............. 116/34 R, 116/228, 229, 266, 268, 269; 137/227, 557; 200/61.25; 340/442, 611, 626; 73/146.3, 73/146.8

See application file for complete search history.

(56) References Cited

U.S. PATENT DOCUMENTS

| 3,451,418 | A | * | 6/1969 | Junichiro et al. ............ 137/227 |
| 3,910,223 | A |   | 10/1975 | Krohn .......................... 116/70 |
| RE29,116 | E | * | 1/1977 | Guy et al. ................... 137/227 |
| 4,072,048 | A |   | 2/1978 | Arvan .......................... 73/146 |
| 5,819,779 | A | * | 10/1998 | Takemura et al. ........... 137/229 |
| 6,832,573 | B2 | * | 12/2004 | Evans et al. .............. 116/34 R |
| 2005/0166662 | A1 | * | 8/2005 | Giovanni ..................... 73/1.57 |

FOREIGN PATENT DOCUMENTS

| EP | 0893284 A1 | 1/1999 |
| GB | 892201 | 3/1962 |

* cited by examiner

Primary Examiner—R. Alexander Smith
(74) Attorney, Agent, or Firm—Jacobson Holman PLLC

(57) ABSTRACT

An apparatus for surveying the pressure of fluids housed in tanks or flowing through ducts comprises a device (100), an envelope (1) with axial symmetry which forms the external covering of the device (100), said envelope (1) being kept in distal position with respect to a connecting body (2) by a counter spring (3); the envelope (1) axially slides with respect to the body (2) to allow the commutation of the apparatus (100) from a non-active to an active condition; the commutation of the device (100) is due to an external force (F).

33 Claims, 39 Drawing Sheets

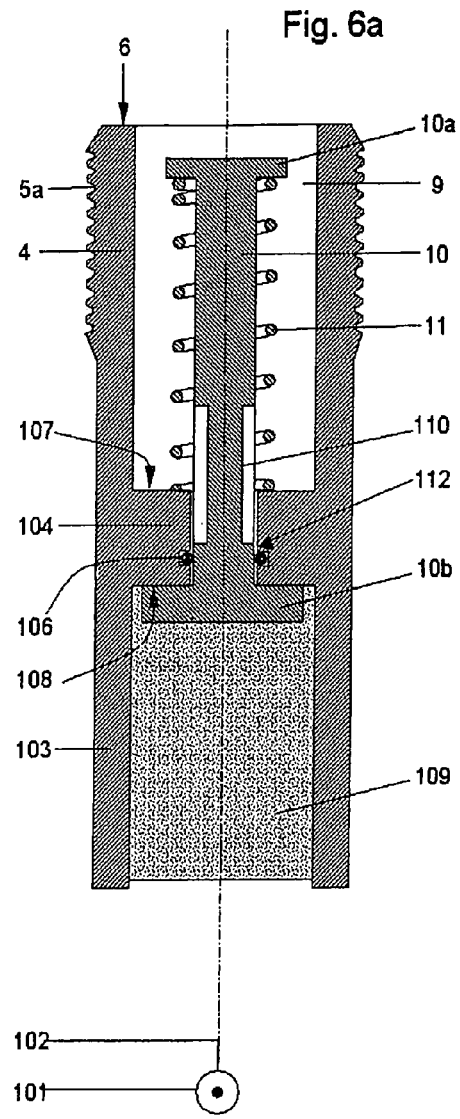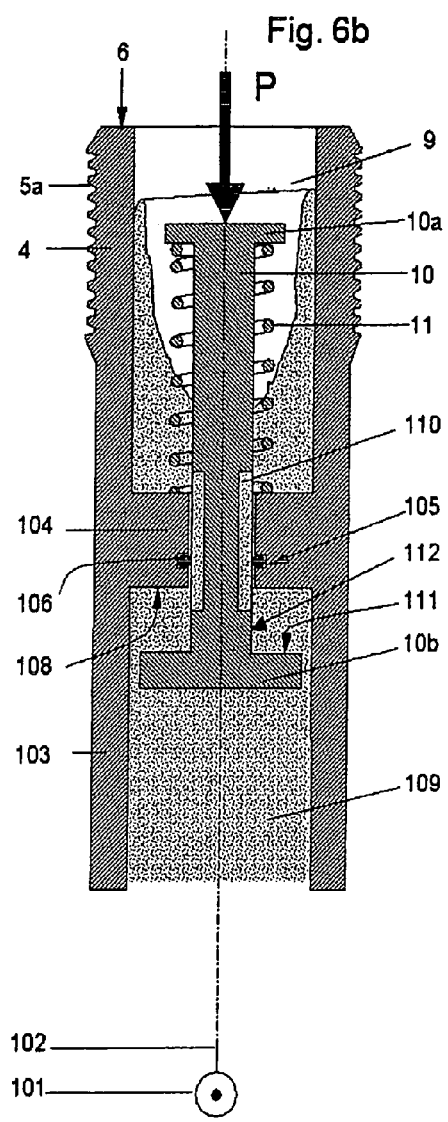

External environment

External environment

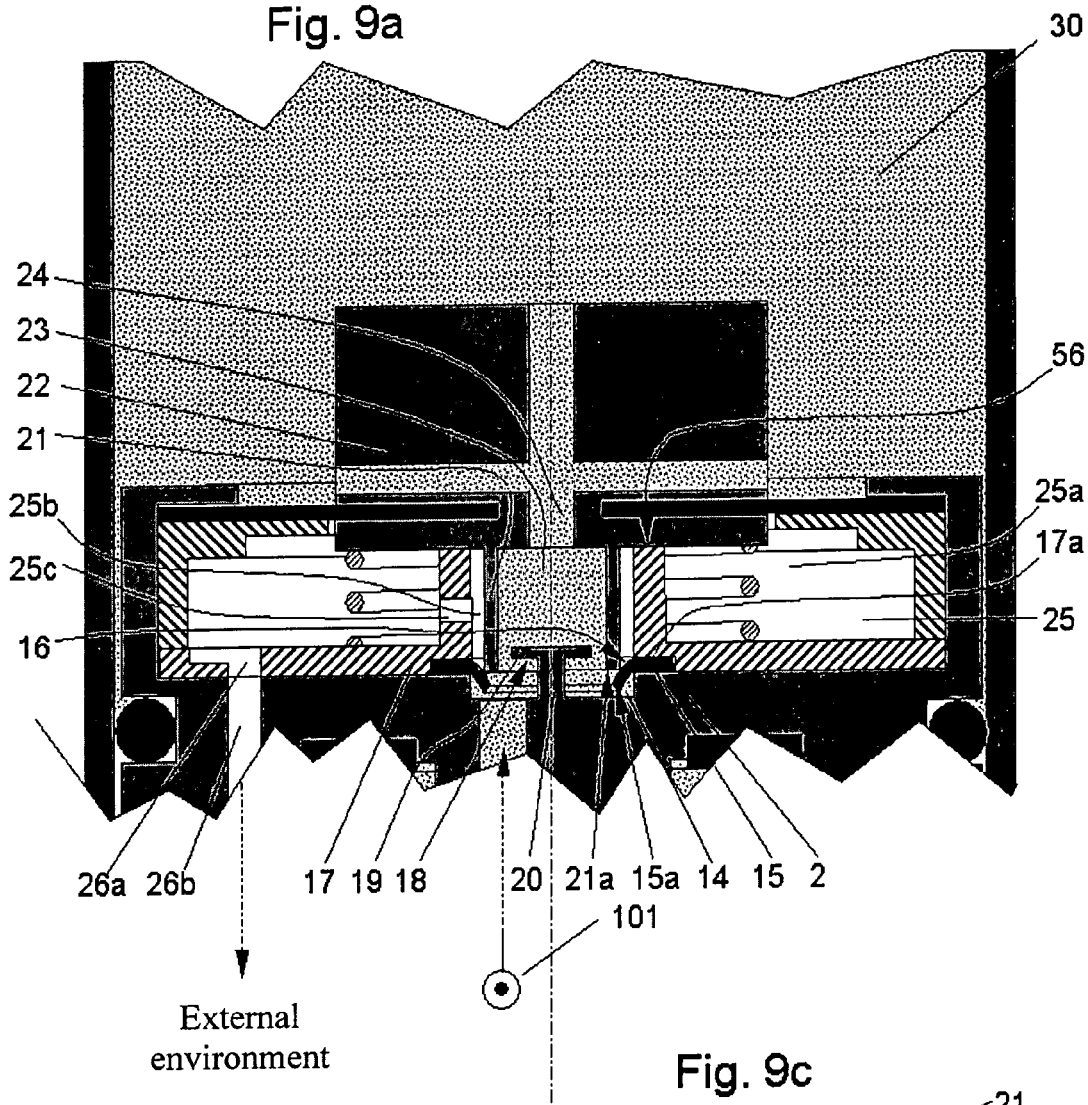
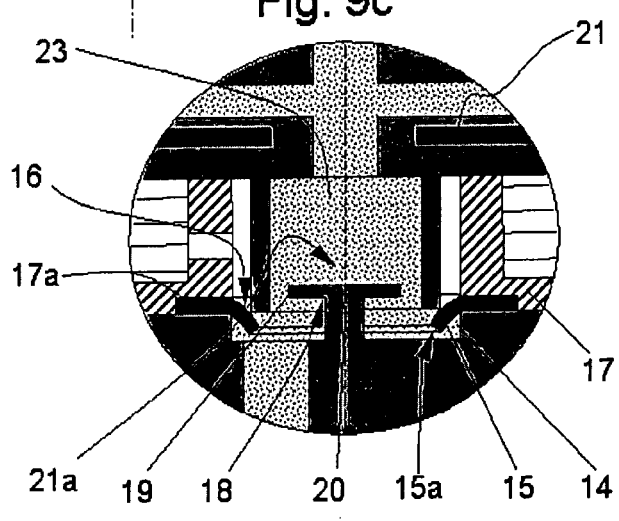
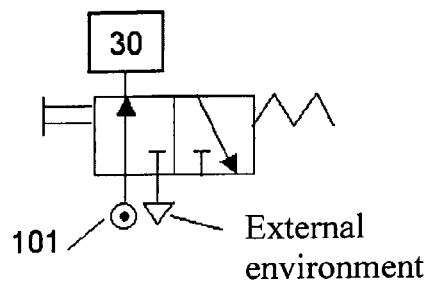

DEVICE FOR SURVEYING THE PRESSURE OF FLUIDS HOUSED IN TANKS OR FLOWING THROUGH DUCTS

This is a nationalization of PCT/IT2004/000669 filed 2 Dec. 2004 and published in English.

BACKGROUND OF THE INVENTION

The present invention relates to a device capable surveying the pressure of fluids housed in tanks or flowing through ducts. The device according to the invention is used in the industry, the sanitary services, the transports and in all those civil or military systems in which the pressure must remain within pre-established values or threshold values to avoid the decay or the operating stop of the system comprising said tanks or ducts.

Some examples of systems using one or more devices according to the present invention are as follows:
a) air compressed braking systems for road or rail vehicles;
b) static balancing circuits for power-operated machines and robots;
c) pneumatic circuits, in general, for power-operated machines, automatic machine tools and the like;
d) tires for road or rail vehicles or aeroplanes;
e) delivering and/or stocking circuits and systems for technical gases for processes;
f) delivering and/or stocking circuits and systems gases for critical uses, as oxygen for respirators used by patients with cardiopulmonary problems, tanks in circuits feeding air or gaseous mixtures for breathing apparatuses;
g) circuits and nets for compressed air for industrial or civil use;
h) circuits and distribution nets of combustible gases for domestic or industrial uses;
i) supplying systems of inert gases in ambiences used for military or civil treatment of explosive substances.

PRIOR ART

EP-A 0 893 284 discloses a device capable of signalling the inflation condition of a tire screwed onto a jointing tube of an inflation valve presenting a valve core stressed by a valve spring for being closed. The device comprises:
1—an external envelope;
2—a threaded body slidably mounted, at least partially, within and rotating together with the envelope, said threaded body being adapted to be screwed onto the jointing tube;
3—a plunger fitted with a rod positioned to engage the valve core and housing a lamina that varies the geometrical configuration from a resting configuration to a pressured configuration in response to a pressure greater than a first pre-established threshold value, which variation effects movement within the rod of a bistable valve fitted with a double rigid member;
4—a movable sealing member connected to the plunger, said sealing member delimiting, with respect to the envelope, at least a first chamber located under the plunger, and at least a second chamber located over the plunger; said plunger being movably positioned between the first chamber and the second chamber with a range of motion of a magnitude sufficient to cause the opening of the valve core from a closed position, said range of motion being limited between:
5—a first limit stop into which the plunger is urged by the movable sealing member in an absence of pressurization, and in which the plunger does not cause the opening of the valve core, and
6—a second limit stop, in which the plunger separates a third chamber from the first chamber by sealingly contacting a gasket and causes the opening of the valve core; wherein this second limit stop is successively kept only if the difference between:
7—the pressure in the second chamber, the value of which reaches the value in the tire during the loading phase of the device, and
8—the pressure in the first chamber, which is connectable to atmospheric pressure is kept higher than a first pre-established threshold value, so that a resultant thrust acting on the plunger is higher than the forces of the valve spring and the movable sealing member; and
9—means for used signalling the configuration of the lamina or the position of the plunger, whereby the device indicates if the pressure in the tire exceeds or not said first pre-established threshold value.

This patent describes a device fitted with a mechanical sensor that does not need electric power for measuring the pressure. In addition, the device has very small dimensions and mass to be used for surveying the internal pressure of a tire.

However, the device presents some defects:

The device is installed on traditional inflation valves for tires with automatic closure. Therefore, if the pressure in the tire is lower than a pre-established threshold value, the valve core closes the inflation valve.

If the device in which, in case of pressure lower than the threshold value, a suitable plunger moves of some millimeters in order to allow the closing of the inflation valve, has no reliable seal, the tire continues to leak until its complete deflation. The deflation occurs even if the gasket and/or the seat of valve core have any defect.

The device is used for emitting a warning signal when the tire deflates under only one threshold value. The deflation causes the translation of the plunger. But, if the plunger, because of excessive damages, frictions or deviations with respect to the external envelope, does not sufficiently move, the signal is not emitted.

The device uses an arched lamina that is stable only in two geometrical configurations. This lamina is difficult to be realised particularly in mass productions of devices requiring close geometrical and operating tolerances.

The seal of the reference pressure room (for example the atmospheric pressure) is obtained with a gasket; the arched lamina rests on. This lamina, therefore, acts in a prefixed configuration and with much precision, by resting on the gasket. For this reason, small deformations of the gasket compromise the precision of its geometry, in particular after an extended use of the device.

The purpose of the present invention is to remedy these defects. The invention, as claimed, solves the problem of creating a device for surveying the pressure of fluids housed in tanks or flowing through ducts. In particular, it resolves the problem of creating a device surveying the relative pressure of the fluid housed in tanks or flowing through ducts and signalling the exceeding of a plurality of threshold values higher or lower than one or more prefixed nominal values.

The main advantages offered by the invention are that the exceeding of the threshold values of relative pressure is sensed by means of a plurality of mechanical sensors that simultaneously commute and emit a signal that depends on the instantaneous value of relative pressure of the fluid to be surveyed. The fluid is housed in a proper measuring chamber inside the device. Therefore, the emission of the signal occurs independently on the movement or the change of the geometrical configuration of other parts of the device. The sensors are capable of operating without electrical feeding, since the commutation is assured by the elastic energy absorbed by the sensors stressed by external forces, or by means of application of pressure stresses of the fluid acting on suitable surfaces.

The device is fitted with sealing member capable of separating the duct or the tank from the internal parts of the device and from the external environment, when the device is in a first non-active condition. Said members have the aim to assure the closure of the duct or the tank and to prevent the passage of the fluid towards the external environment, also when the device is mounted on automatic self-closing valves.

The device according to the present invention is fitted with measuring mechanisms operating on the basis of the equilibrium of the forces of pressure and elastic counter forces. Therefore, the use of laminas with variable geometric configuration is avoided, said laminas being expensive, little reliable and with difficult realisation in a mass production. In the equilibrium of said forces, important elastic reactions do not act, said reactions being due to the compression of gaskets or sealing rings made of elastomer. Said reactions are indeterminate during the assembly of the device and irregularly change in time because of the permanent deformations of the gaskets. On the contrary, the springs in equipment of the device are supported by rigid supports that have easy determinable elastic reactions and that assure the repeatability of the elastic reactions in time. Finally, the forces due to the pressure are pre-determinable and adjustable during the assembly of the device and allow its valid and effective calibration during the production.

The device, used for surveying the internal pressure of a loaded tire, signals the condition of radial deformation that is proportional to the difference between the absolute pressure inside the tire and the atmospheric pressure.

FEATURES OF THE INVENTION

The device according to the invention comprises the following elements:
- a connecting body with an axial symmetry;
- connecting means connectable to ends of tubes coming from containers or pipes to send a fluid to the body;
- an external envelope, with an axial symmetry, housing the connecting body, the external envelope sliding on the body from a first distal position to a second position proximal with respect to the body according to the action of an external force;
- self-closing means capable of sealing an entrance room located between the connecting means and a measuring chamber;
- a manoeuvre member mechanically connected to the external envelope, the manoeuvre member allowing that the self-closing means opens the entrance room when the external envelope slides form the first distal position to the second proximal position; the manoeuvre member allowing the closing of the self-closing means, when the external envelope is in the distal position, and the relative pressure in the measuring chamber is lower than a first pre-established threshold value;
- the measuring chamber contains the fluid of the container or pipe, coming through passages from the entrance room when opened by the manoeuvre member; at least the force of the pressure of the fluid acts in the measuring chamber; the manoeuvre member closes the connection among the measuring chamber, the ends and the external environment;
- a deforming element sensitive to the forces acting in the measuring chamber, the deforming element being capable of moving the manoeuvre member together with a rigid member guiding the deforming element;
- a space connected to the environment and housing a spring, the space is found in a position opposite to the measuring chamber so that the spring acts to the deforming element contrasting at least the pressure force in the measuring chamber on the deforming element; therefore, when the manoeuvre member is in a position proximal with respect to a support, and the relative pressure in the measuring chamber is lower than the first pre-established threshold, the force of the spring exceeds the contrasting forces acting on the deforming element, and the deforming element moves the manoeuvre member towards a distal position allowing that the self-closing means to seal the entrance room;
- passages connecting the measuring chamber to the environment, when the self-closing means close the entrance room.

The device presents a spring housed by the measuring chamber. The spring is located between the end of the body and a supporting basis, integral with the external envelope for pushing said external envelope towards a first position distal with respect to the end (4). In the distal position a limit stop of the external envelope is in contact with the body.

A first movable diaphragm, a rigid member, the body, the external envelope and a second movable diaphragm delimit the measuring chamber.

Measure mechanisms act according to the equilibrium of the forces of the relative pressure in the measuring chamber and of elastic elements contrasting said forces of pressure. The forces of the elastic elements are prefixed by means of the contact with rigid supports, in order to obtain easy determinable and repetitive in the time elastic reactions.

A rigid support consists of a basis fixed by a wall integral with the external envelope. The entrance room, feeding a valve with three ways and two positions, and the space, connected to the environment, are always separated. The entrance room is connected to a cavity located at the extremity of the end, while the space communicates with the environment.

The valve with three ways and two positions comprises a self-closing diaphragm held by a seat, located between a first support and the body.

The valve with three ways and two positions further consists of the self-closing diaphragm having a surface sealing the entrance room when said surface is in contact with an edge of a head disposed at the extremity of a pin integral with the body. The pin crosses a hole located in the self-closing diaphragm.

The manoeuvre member acts on the valve with three ways and two positions for commuting from the closing condition, in which the entrance room is separated from the measuring chamber and the measuring chamber communicates with the environment, to the opening condition, in which the entrance room communicates with the measuring chamber and the measuring chamber is separated from the environment. Sensors are further provided commuting from first to second conditions of equilibrium to emit signals depending on the instantaneous value of the relative pressure of the fluid; the sensors being capable of sensing thresholds of different values of the relative pressure of the fluid founding in the measuring chamber.

The sensors are sensitive of the force of the relative pressure in the measuring chamber transmitted to the sensors through the second movable diaphragm.

The sensors consist of sliders resting on the second movable diaphragm, of elastic members, of contacts supported by the sliders and of contacts fixed to the basis. If the value of the relative pressure in the measuring chamber exceeds a threshold value, the contacts supported by the sliders touch the contacts fixed to the basis for defining a first electric condition. Vice-versa, if the value of the relative pressure in the measuring chamber is lower than the threshold value, the contacts supported by the sliders are detached from the contacts fixed to the basis for defining a second electric condition.

Said electric conditions are transmitted to the basis fitted with electric circuits and apparatuses processing the electric conditions of the contacts to obtain signals to be transmitted.

The sensors are housed in a cavity joined to the environment for reference of the value of the pressure in the measuring chamber to the value of the environment.

A bushing, integral with the rigid member, opens the self-closing diaphragm to commute the valve with three ways and two positions from a first condition defined by the disjunction of the bushing from the self-closing diaphragm to a second condition in which the contact between the edge of the bushing and the surface of the self-closing diaphragm seals the communication between the cavity of the bushing and the space.

The commutation of the valve with three ways and two positions in the second condition occurs when the bushing, in contact with the surface of the diaphragm, acts on the diaphragm with a push sufficient to translate the surface towards the entrance room which is in communication with the cavity.

The rigid member is fitted with internal ducts to connect the entrance room to the measuring chamber through the cavity when the forces acting in the measuring chamber exceed the spring.

An interspace is provided obtained by increasing the radial dimensions of the external envelope to keep on providing the advantage consisting in the shortening of the total length of the device and to maintain the counter spring, disposed between the body and the supporting basis, integral with the external envelope.

A first Belleville acts on the rigid member contrasting the action of at least the force of the pressure in the measuring chamber on said rigid member and the first movable diaphragm.

A second Belleville washer acts on the first slider.

The connecting body is separated in two portions, a first portion is fixed to fasten the device on the end, and a second portion is movable to axially translate both with respect to the fixed portion and with respect to the external envelope.

A flange is realised at the end of a protuberance, integral with the movable portion of the body; a gasket is located between the flange and an end, integral with the fixed portion of the body; the gasket seals the flange with the end.

The body houses a cavity in which the protuberance axially translates.

A hollow sleeve is integral with the movable portion of the body; the internal wall of the hollow sleeve axially slides with respect to a peripheral wall of the fixed portion.

The internal wall is coupled to the peripheral wall with a sufficient accuracy; therefore the hollow sleeve forms a guide for the movable portion.

The counter spring is housed in an interspace out the hollow sleeve; the space is permanently connected to the environment through the duct, obtained in the first support, the duct located in the movable portion of the body, the chamber separating the first fixed portion from the second movable portion, the duct obtained in the fixed portion of the body, the duct, obtained in the movable portion of the body, the interspace radially obtained in the movable portion to house the counter spring, the duct, obtained in the fixed portion and the duct, obtained in the external envelope.

The second slider is integral with the third slider for forming a sole fourth slider, free to axially move between a distal position and a position proximal with respect to the basis. The fourth slider is in the first position distal with respect to the basis, the distal position being the position of equilibrium reached by the fourth slider when the environmental pressure acts in the measuring chamber. The first distal position of the fourth slider is reached because of the reaction of the first elastic member contrasting with the strength to the deformation offered by the second movable diaphragm. The second spring keeps the first slider pressed against the second movable diaphragm in the first position distal with respect to a second support.

The first elastic member, located between the fourth slider and the basis, keeps the fourth slider pressed against the second movable diaphragm.

The second elastic member is located between the fourth slider and the contact.

The fourth slider comprises the joined second and third sliders. The first elastic member is found between the fourth slider and the wall, connected to the first slider. The reaction of the first elastic member discharges on the first slider, and the fourth slider is free to axially move between a distal position and a position proximal with respect to the basis.

A plate is disposed between the rigid member and the first Belleville washer. The plate is free to axially translate with respect to the rigid member between a distal position and a position proximal with respect al first support.

The rigid member and the plate are separated to uncouple the actions regarding the seal of the gasket for separating the chamber from the chamber.

BRIEF DESCRIPTION OF THE DRAWINGS

Other advantages, features and aims of the invention may be more readily understood by referring to the accompanying drawings, which concern a preferred embodiment, in which:

FIGS. 6a and 6b represent, as an example, the schema of an usual inflation valve, said valve being commonly closed;

FIGS. 9a, 9b, and 9c represent the valve with three ways and two positions in a second condition;

DESCRIPTION OF PREFERRED
EMBODIMENTS OF THE INVENTION

Figure 1A:
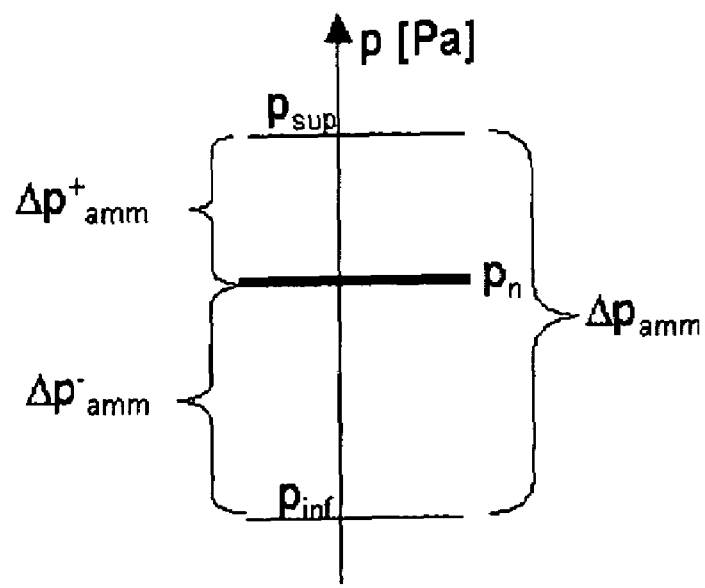
FIGS. 1a, 1b are diagrams showing the course of the nominal value of the pressure of the fluid to be surveyed.
Figure 2A:
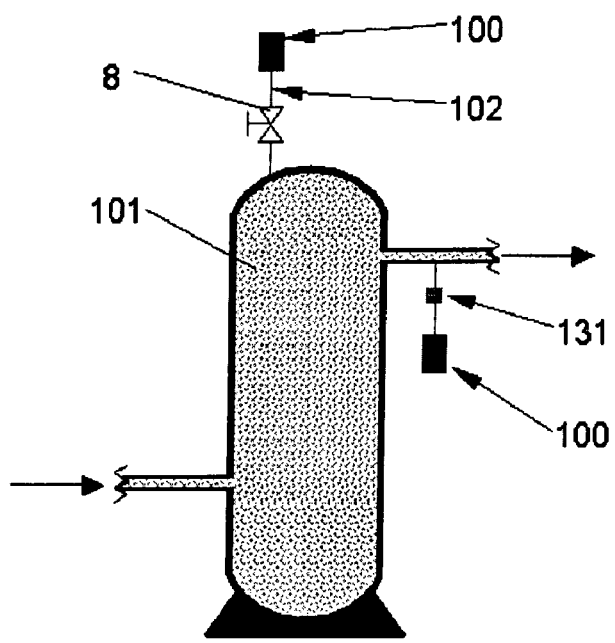
FIGS. 2a, 2b and 2c show the types of use of the device.
Figure 2B:
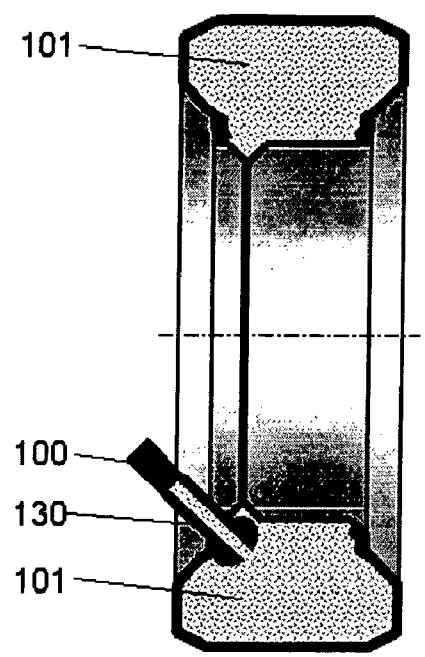

The diagrams of FIGS. 1a and 2b show that a range of a prefixed nominal value Pn exists delimited by an upper and a lower end. The value of the upper end is $Psup \geq Pn$ with $(Psup-Pn)=\Delta P^+amm$ the value of the lower end is $Pinf \leq Pn$ with $(Pn-Pinf)=\Delta P^-amm$. From these mathematical notations it results that the total amplitude of the functionality field is $(Psup-Pinf)=\Delta Pamm$.

Therefore, there are the following inequalities:

an upper end at a pressure $Psup \geq Pn$, with $(Psup-Pn)=\Delta P^+amm$.

a lower end at a pressure $Pinf \leq Pn$, with $Pn-Pinf)=\Delta P^-amm$.

The total amplitude of the functionality field is $(Psup-Pn)=\Delta P^+amm$.

The amplitude of the field is prefixed by the manufacturer or the system use manager, generally according to rules. The field can be more or less wide, but, of course, if in one of the above mentioned inequalities the extreme case is valid (sign=), in the other one it cannot be the same case since, in practice, the amplitude of the field with $\Delta Pamm$ must be finite and cannot be=0.

In many systems comprising the ducts and/or tanks in pressure or in many other applications, it is necessary to act when the pressure exceeds the field of the allowable pressures $\Delta Pamm$. In other words, when the pressure value exceeds the high limit Psup or the low limit Pinf, it is necessary to act for avoiding some problems. Said problems consist in the decay of the performances of the system, in the breaking of its functionality or, in extreme cases, in the damaging of the system and/or the components depending on. The action, generally, has the purpose to restore the right functioning conditions of the system.

For this reason, it is suggested to equip the system, in particular the duct and/or tank in pressure, with one or more surveying devices, which sense the exceeding of the critical pressure thresholds with proper precision and promptly. So doing, it is possible to signal the exceeding outside of the system in a proper way and to realise the suitable actions by means of operators and/or automatic machine tools.

In some systems and applications apparatuses are provided for assuring the fluid pressure inside the system without autonomously causing pressure increasing. It is the very frequent case of the circuits feed by tanks in pressure (gas bottles feeding circuits with dispensers). In this case the maximum pressure of the circuit corresponds to the filling pressure of the tank. But the pressure of the delivered gas progressively decreases because of its use. The pressure decreasing sometimes depends on other reasons as an incorrect control of the system, accidental leaks and similar. These causes occur also simultaneously.

A further important case is the one of the tires for road vehicles. After their inflation at a nominal pressure, the tires progressively tend to deflate not only because of punctures or other damages, but also for the migration of the gas through the carcass.

Figure 1B:
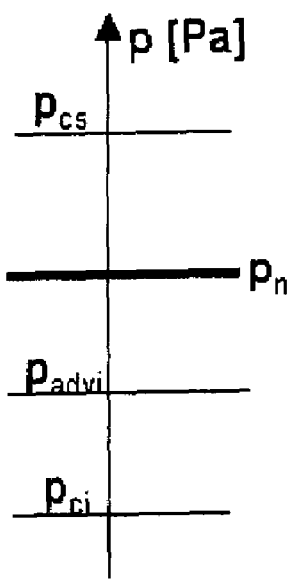

There are so many requirements of surveying and signalling the exceeding of the low critical threshold Pci. Such a requirement exists also for surveying and signalling the exceeding of a low critical threshold Padvi. In some cases, it is also necessary to signal the exceeding of the high critical pressure Pcs. In addition, it is often required to signal the exceeding of the low critical pressure Pci and of the high critical pressure Pcs only, without considering the threshold Padvi (FIG. 1b).

Figure 2C:
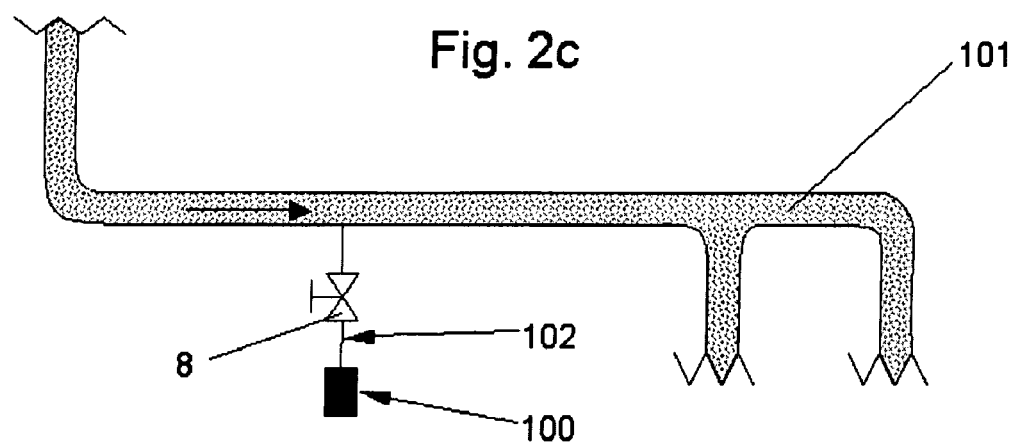

In FIGS. 2a, 2b, 2c a member 101 is shown, representing, in general, the room containing the fluid to be surveyed. In these figures some examples of use of the device 100 according to the present invention are shown.

FIG. 2a shows a bottle 101 connected to a device 100 through a self-closing valve 131 or a tap 8 capable of intercepting a branch 102, directly connected to the bottle 101 or to a duct joined to the bottle 101.

FIG. 2b shows a tire 101 having an inflation valve fitted with an internal automatic closure apparatus joined to the device 100 by means of a threaded connection.

FIG. 2c illustrates the device 100 connected to a duct. Tap 8 intercepts a branch 102 linked to said duct.

The tap 8 is used to close the branch 102 when the device 100 is not connected.

The mounting of the device 100 provides the following phases:
First, when the device 100 has not been mounted yet, the tap 8 is closed;
Then, the device 100 is applied to the branch 102;
The mounted device 100 allows the opening of the tap 8;
Now the device 100 is capable of operating since it is commuted to its second active or measuring condition.

The functioning of the device 100 is explained with reference to a first embodiment shown in FIG. 3. The other embodiments will be explained later.

Figure 3:
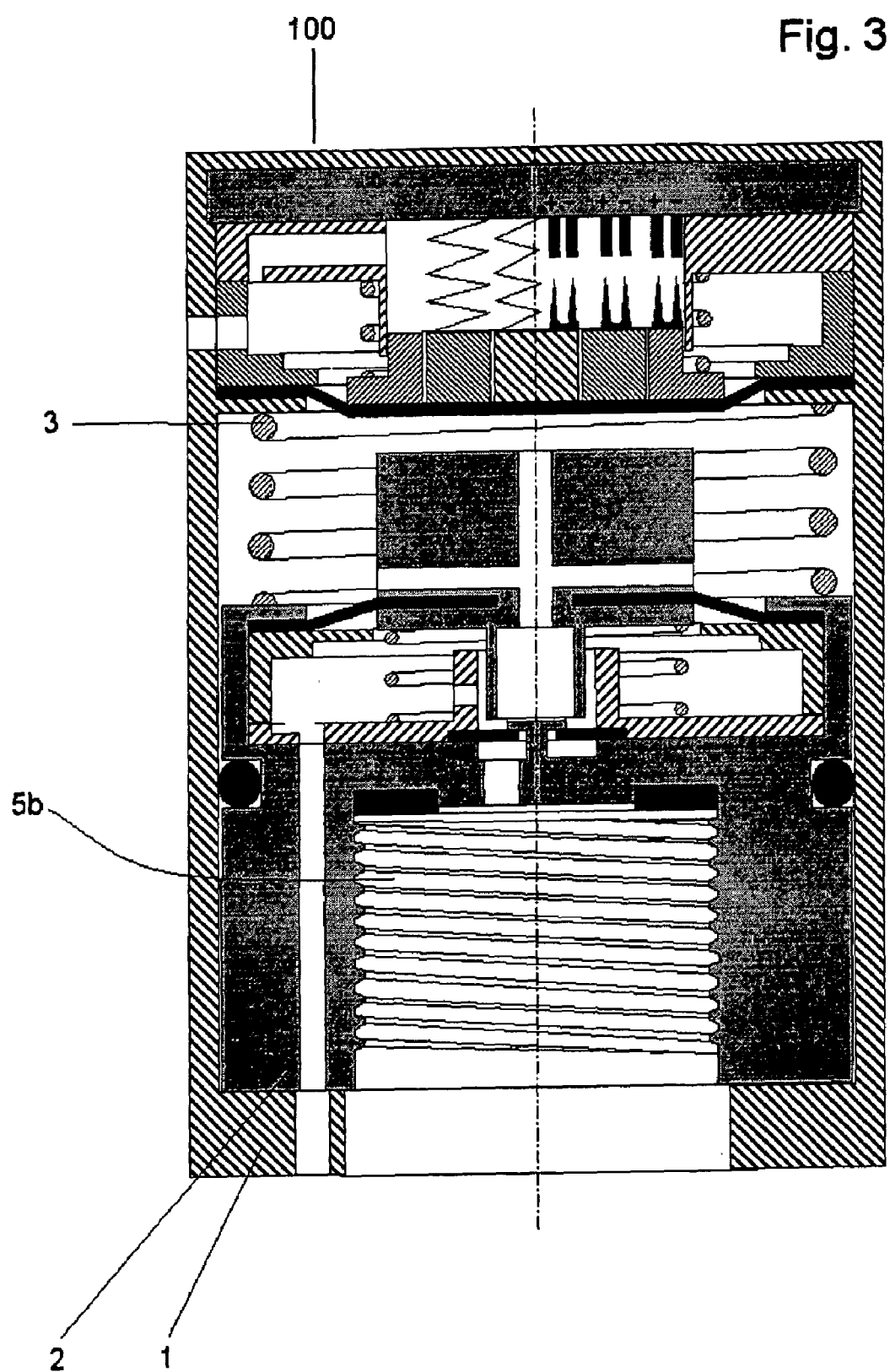
FIG. 3 shows the device according to the present invention still housed by the sale packaging.

In FIG. 3 the device 100 according to the present invention is illustrated still being in the sale packaging. An axial symmetric envelope 1 forms the external coating of the device 100. The envelope 1 is kept in the position distal with respect to a connecting body 2 by a counter spring 3.

The envelope 1 axially slides with respect to the body 2 in order to allow the commutation of the device 100 from a non-active to an active condition. The commutation of the device 100 is due to the action of an external force F.

The device 100 keeps its active condition if the relative pressure of the fluid is higher than a prefixed first threshold value Pci.

The envelope 1 is connected to the body 2 by means of a prismatic coupling (not shown in FIG. 3), allowing the envelope 1 to transmit a torque to the body 2.

Figure 4:
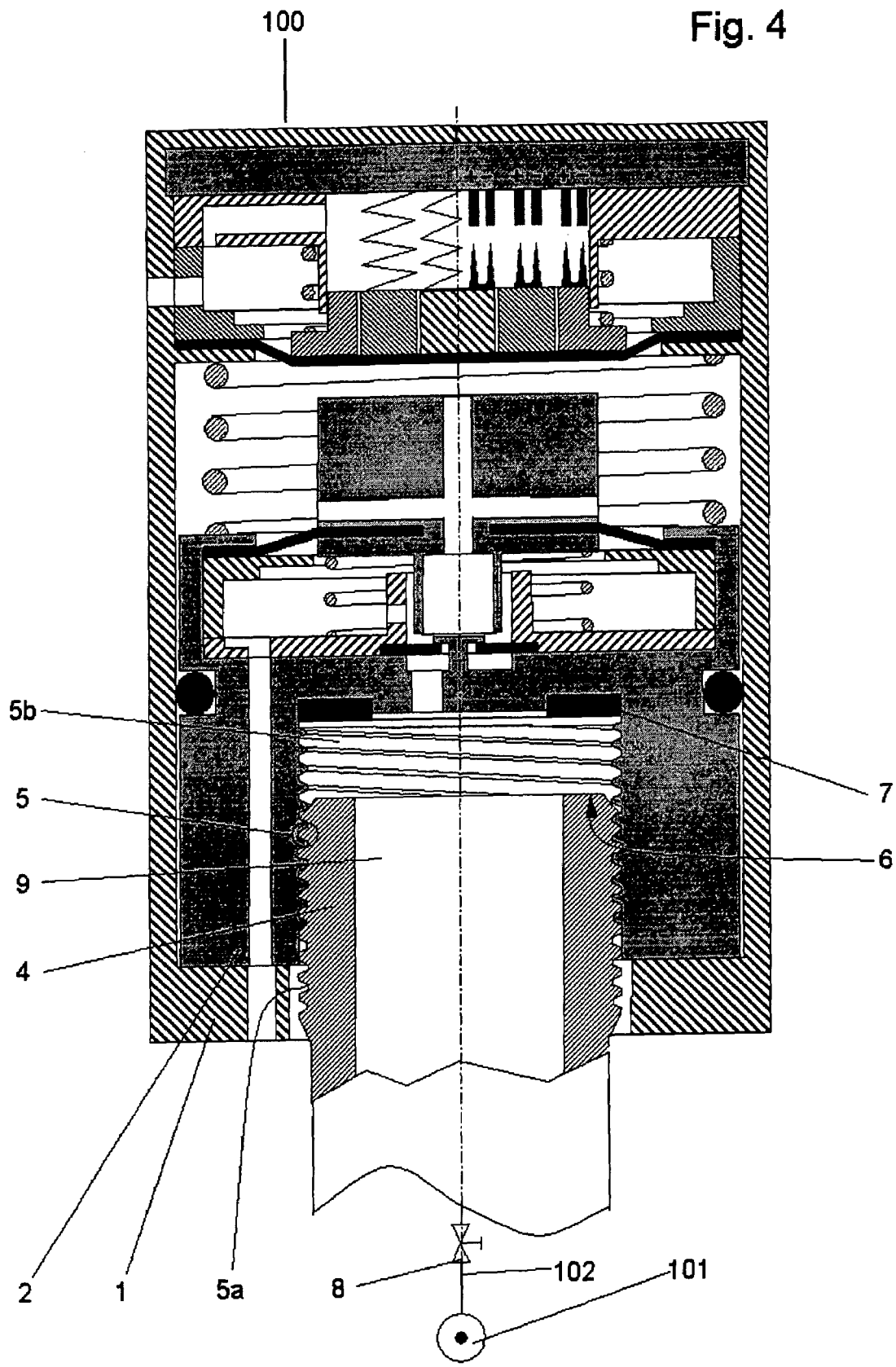
FIG. 4 shows an end of a proper branch connected to the environment where the fluid is found.

In FIG. 4 an end 4 of a proper branch 102 connected to the room 101 is illustrated, the fluid being housed in the room 101. The tap 8, when closed separates the chamber 9 of the end 4 from the room 101.

A known fixing member 5 connects the body 2 to the end 4 fitted with a male threading 5b for being fixed to the connecting body 2 having a female threading 5a. If a usual threading is used to fix the body 2 to the end 4, the installation of the device 100 begins from the screwing of the body 2. The envelope 1 is rotated up to obtain the pressed contact of the upper end 6 of the end 4 on the gasket 7 used to reach the seal of the coupling.

Figure 5:
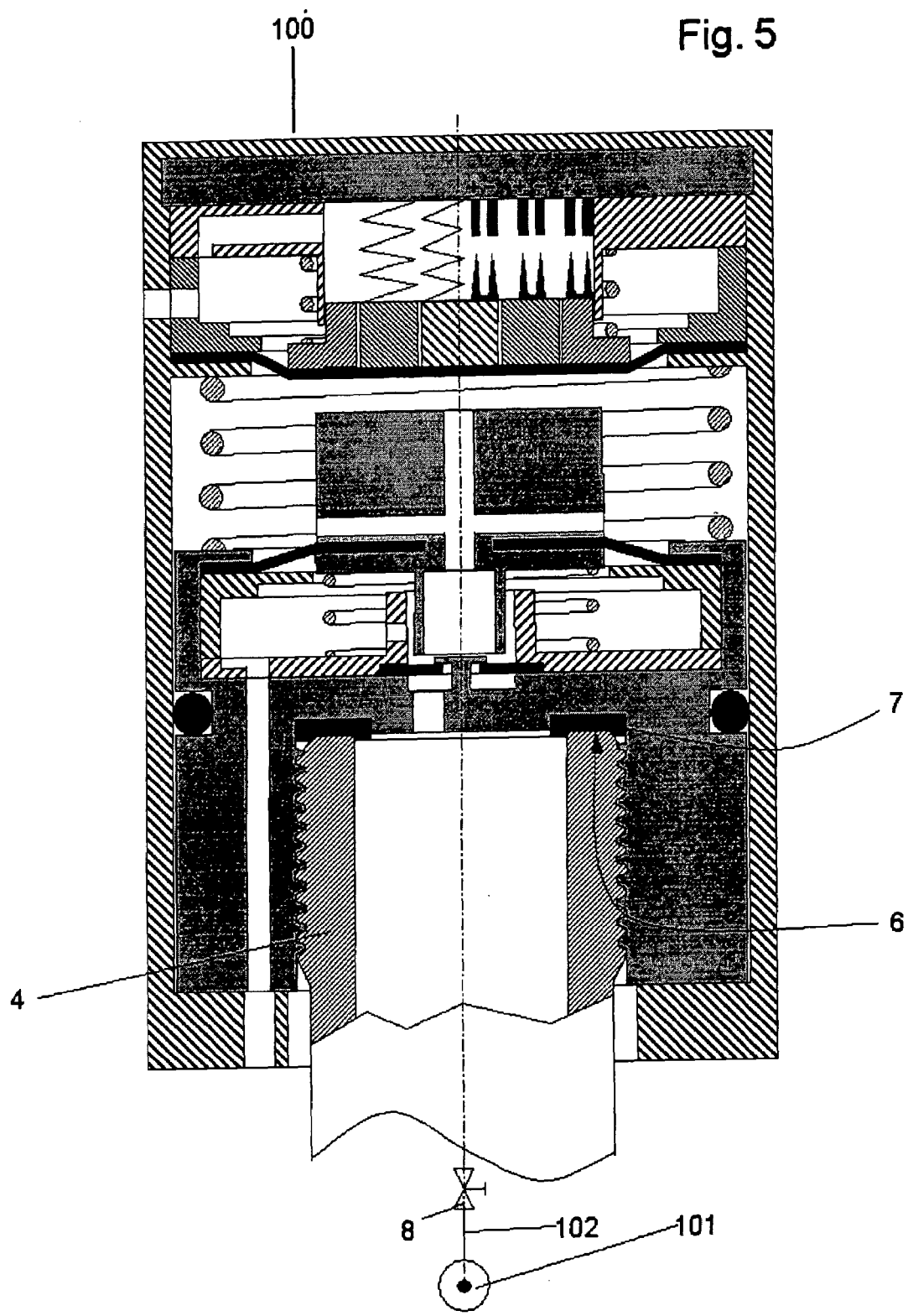
FIG. 5 illustrates the finished coupling of the end to a connecting body.

As in FIG. 5, the coupling of the end 4 to the body 2 is complete when the gasket 7 is completely pressed by the upper end 6 of the branch end 4. Now the device 100 is mounted on the end 4. The device 100 will be capable of surveying the fluid when it will be active because of its commutation from the non-active to the active condition, as will be explained later.

In FIGS. 6a and 6b the schema of a usual automatic inflation valve is represented as an example, said valve being usually closed.

FIG. 6a shows the automatic inflation valve closed. The valve comprises a body 103, which, when the valve is installed, is connected to the branch 102 communicating with the room 101 where the fluid is found. The end of the body 103, distal with respect to the branch 102, supports the end 4 defining the chamber 9, while the proximal end presents a chamber 109 connected to the branch 102. The internal part of the body 103 presents a guide for a rod 10.

A gasket 106 seals the rod 10 to the body 103 for preventing the passage of the fluid from the chamber 109 to the chamber 9. The rod 10 holds the gasket 106 that moves with the rod 10. Or a seat 105 holds the gasket 106, said seat 105 being fastened to the body 103, as shown in FIGS. 6a, 6b.

The spring 11, interposed between the upper head 10a of the rod 10 and an abutment 107 of the body 103, keeps the rod 10 in the first position distal with respect to the room 101. Said distal position is defined by the contact of the lower head 10b of the rod 10 with a limit stop 108 finding in the body 103.

When the rod 10 is in the position distal with respect to the room 101 (FIG. 6a), the gasket 106 seals the rod 10 to the body 103. The passage of the fluid from the chamber 109, connected to the branch 102, to the chamber 9, is, therefore, prevented.

FIG. 6b shows the self-closing valve 131 opened. The opening state of the self-closing valve 131 is due to the removing of the rod 10 from the distal position.

An external force F applied to the rod 10 causes the translation of the rod 10 to a second position proximal with respect to the room 101 bucking the reaction of the counter spring 11. The second proximal position of the rod 10 is defined by a translation of the rod 10 sufficient to cancel the seal of the gasket 106.

When the rod 10 is in the position proximal with respect to the room 101, the gasket 106 allows the chamber 109 to be connected to the chamber 9.

If the seat 105, provided in the body 103, holds the gasket 106, a plurality of axial recesses, obtained in the rod 10 immediately downstream of the sealing zone 112 with respect to the position of the gasket 106, cancel the seal of the gasket 106 and connect the chamber 109 to the chamber 9. If the rod 10 holds the gasket 106 (for example the gasket 106 rests on the wall 111 of the head 10b and seals the limit stop 108, when the rod is in its first distal position), the removing of the head 10b from the limit stop 108, owing to the translation of the rod 10, cancels the seal of the gasket 106 and connects the chamber 109 to the chamber 9.

Therefore, the fluid flows from the chamber 109 to the chamber 9. As soon as the action of the external force F is interrupted, the stress exercised by the spring 11 on the head 10a moves the rod 10 towards the distal position so that the connection of the chamber 109 to the chamber 9 is automatically interrupted.

Figure 7:
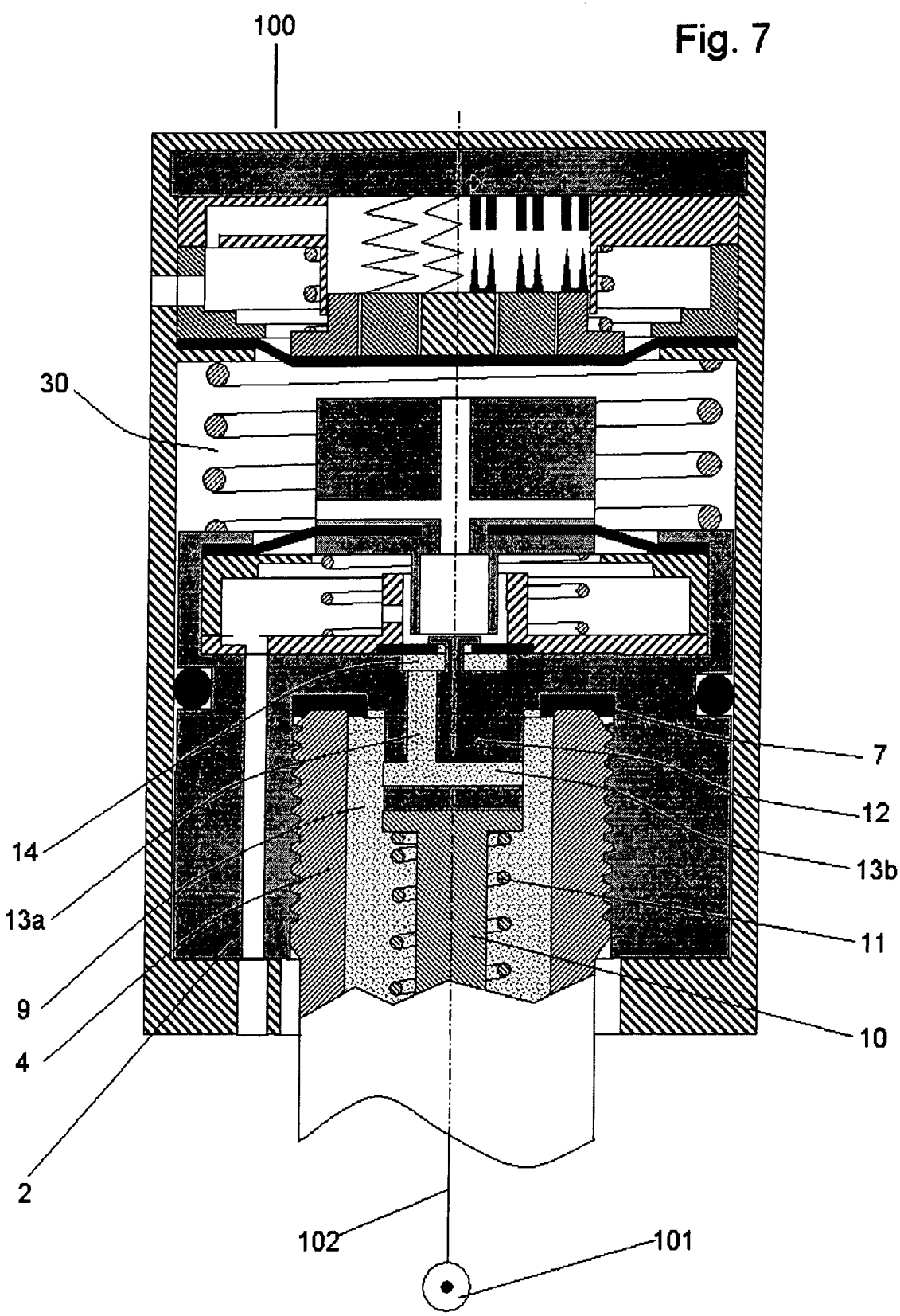
FIG. 7 shows the mounting of the device on an end fitted with an inflation valve, like that one of FIGS. 6a and 6b.

FIG. 7 shows the device 100 assembled on a branch end 4 fitted with a self-closing valve, as that one represented in FIGS. 6a, 6b.

A protuberance 12 integral with the body 2, realised in correspondence of the axis of the rod 10, opens the self-closing valve 131 during the assembly of the device 100 on the branch end 4. Therefore, in absence of the device 100, the environmental pressure acts in the chamber 9 downstream of the sealing seat of the self-closing valve 131, said chamber 9 being separated from the fluid, which is upstream of the sealing seat of the self-closing valve 131. On the contrary, when the device 100 is mounted, the chamber 9 is filled with the fluid at the pressure of the room 101.

This condition does not require the presence of the tap 8 on the branch 102 upstream of the end 4.

When the device 100 is installed and the gasket 7 is completely locked, the fluid invades the internal chamber 9 of the branch end 4, the duct 13a, 13b and the chamber 14 feeding the valve with three ways and two positions, obtained in the body 2. Said valve is usually closed.

Figure 8A:
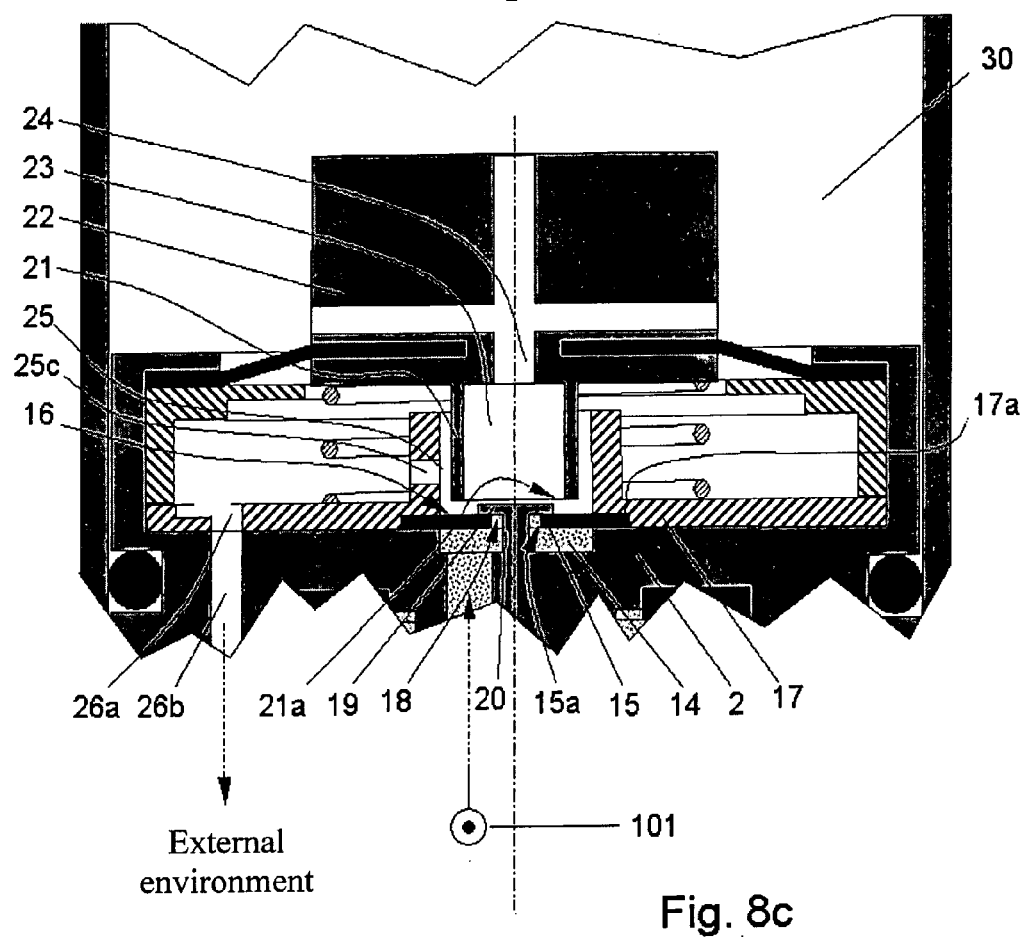
FIGS. 8a, 8b, and 8c represent a valve with three ways and two positions in a first condition.
Figure 8B:
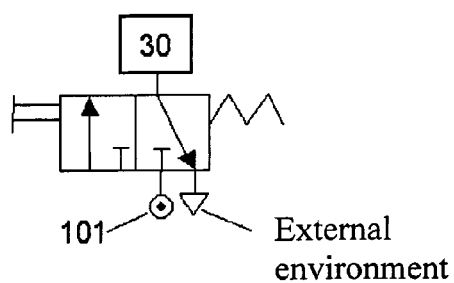

As shown in FIGS. 8a, 8b, the valve with three ways and two positions consists of a self-closing diaphragm 15 held by a seat 17a located between a first support 17 and the body 2. The seat 17a keeps the self-closing diaphragm 15 in the right position and seals the contacting surface provided between the first support, the body 2 and the self-closing diaphragm 15 for preventing the leaks of the fluid.

The self-closing diaphragm 15 presents a sealing surface 16 working by means of the contact with the edge 18 of an end 19 finding at the extremity of a pin 20 integral with the body 2. The pin 20 crosses a hole 15a of the self-closing diaphragm 15.

The valve with three ways and two positions commutes from a first to a second condition and vice-versa. A hollow rod 21 integral with a rigid member 22, guiding the deforming element, commutes the valve. The internal part of the hollow rod 21 presents a cavity 23 connected to a duct 24.

Figure 8C:
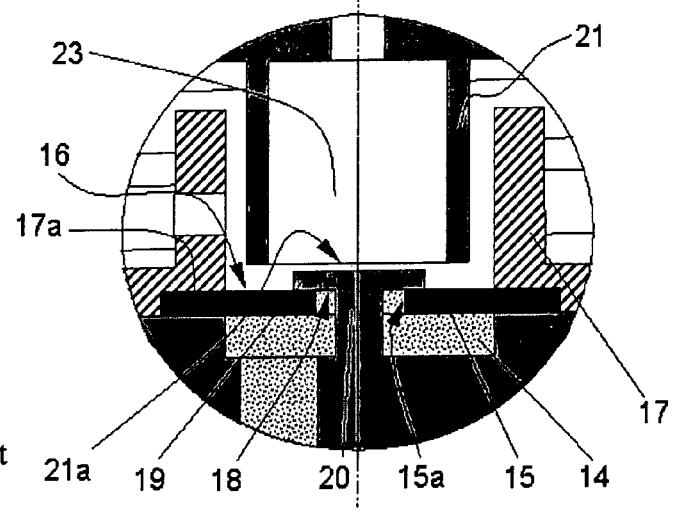

When the device 100 is in non-active condition, the valve with three ways and two positions is in a first condition (FIGS. 8a, 8b, 8c) defined by the distance between the rod 21 and self-closing diaphragm 15. The cavity 23 communicates with a chamber 25 connected to the external environment through the ducts 26a, 26b, 26c, obtained, respectively, in the support 17, the body 2 and the envelope 1.

FIG. 8a illustrates the schema ISO of the valve with three ways and two positions in said first condition.

Therefore, in said non-active condition the cavity 23 is connected to the chamber 25. The pressure of the external environment acts in the cavity 23 and chamber 25, while the surface 16 of the self-closing diaphragm 15 is in contact with the edge 18 of the end 19 at the end of the pin 20.

In these conditions, if the fluid to be surveyed is found in the chamber 14, it does not invade the cavity 23 and the chamber 25. The seal between the surface 16 of the self-closing diaphragm 15 and the edge 18 of the end 19 at the end of the pin 20 is automatic.

Therefore, the efficacy of the seal increases with the increasing of the relative pressure of the fluid in the chamber 14.

When the hollow rod 21 is in contact with the surface 16 of the diaphragm 15 and pushes the diaphragm 15 to obtain the translation of the surface 16 towards the chamber 14, the commutation to the second condition of the valve with three ways and two positions is reached.

In this second condition the contact between the edge 21a of the rod 21 and the surface 16 of the self-closing diaphragm 15 realizes a self-closing seal separating the cavity 23 from the chamber 25. On the contrary, the translation of the surface 16 towards the chamber 14 removes the surface 16 from the edge 18 of the end 19, interrupts the seal and connects the chamber 14 to the cavity 23. The fluid flows from the chamber 14 to the cavity 23 and from said cavity 23 to the duct 24.

The ISO scheme of the valve, represented in FIG. 8b in the first condition and in FIG. 9b in the second condition, after the above-mentioned commutation, explains the above description.

The chamber 25 consists of the volume 25a, external to the limit stop 56 integral with the first support 17, the volume 25b internal to the limit stop 56 and the duct 25c permanently connecting the external volume 25a to the internal volume 25b.

A first advantage of a commutation valve with three ways and two positions, realized as above described, is that a reaction stress of the sealing member bucking the very low action of the element causing the commutation is obtained by means of a self-closing diaphragm 15 with proper form and dimensions, A second advantage consists is that the commutation is reached by means of very short strokes of the member realising the commutation, as represented in FIG. 9a, from the hollow rod 21.

A third advantage is that, during the commutation phase of the valve from the first (FIG. 8b) to the second condition (FIG. 9b), the contact between the edge 21a of the hollow rod 21 and the surface 16 of the self-closing diaphragm 15 realizes a self-closing seal. The seal separates the cavity 23 from the chamber 25 before the translation of the surface 16 towards the chamber 14 interrupts the contact between the surface 16 and the edge 18 of the end 19, by connecting the chamber 14 to the cavity 23. In the same way, during the commutation phase of the valve from the second active (FIG. 9b) to the first non-active condition (FIG. 8b) the self-closing seal separating the cavity 23 from the chamber 25 is due to the contact between the edge 21a of the hollow rod 21 and the surface 16 of the self-closing diaphragm 15. The seal interrupts only after the new contact between the surface 16 and the edge 18 of the end 19. So doing, the direct connection of the chamber 14 (joined to the chamber 9) to the chamber 25, linked to the external environment, can never occur, even during the commutation transient of the valve, that is even during the commutation transient of the device 100 from the second active to the first non-active condition.

Figure 10:
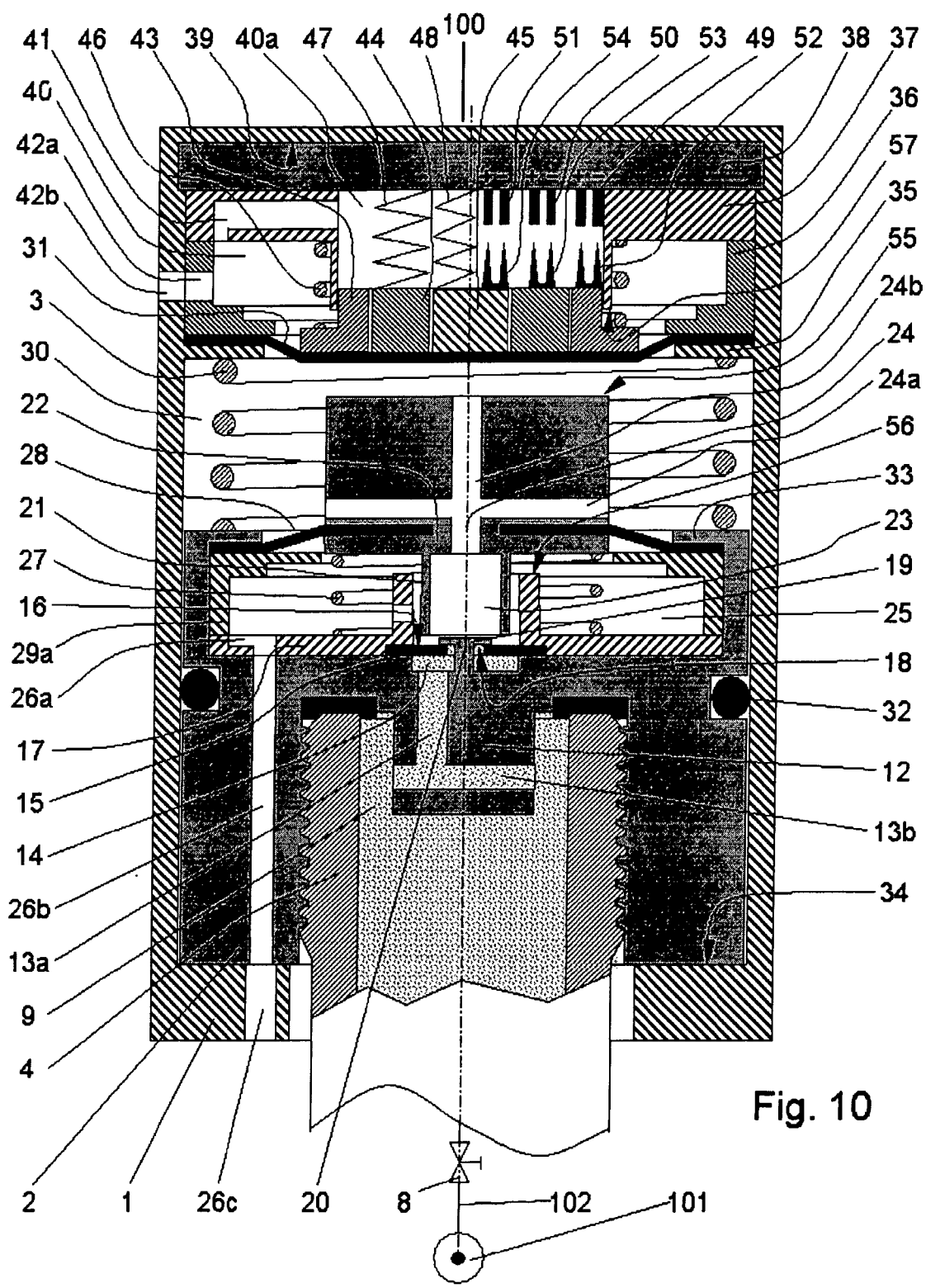
FIG. 10 shows the device still in the non-active condition.

As shown in FIG. 10, when the device 100 is in the non-active condition, the passage of the fluid from the chamber 9 of the end 4, through the ducts 13a, 13b and the chamber 14, towards the cavity 23 of the chamber 25, communicating with the external environment, is prevented if the valve with three ways and two positions is closed.

So doing it is not necessary to close the tap 8 (or the equivalent self-closing valve) when the device 100 is in the non-active condition.

The protuberance 12, also in case that the device 100 is applied to an end 4 without an automatic inflation valve, realizes a preferred embodiment, characterised by a higher full portability. In fact, if the device 100 is applied to an end 4 without an automatic inflation valve, the protuberance 12 does not cause any inconvenience and the device 100 properly works as in absence of the protuberance 12.

Said solution allows, however, the device 100 to be applied also on a end 4 with an automatic inflation valve, as sole embodiment for both the applications.

When the tap 8, or the self-closing valve 131, is opened, the fluid invades the internal chamber 9 of the end 4, the ducts 13a and 13b and the chamber 14 feeding the valve with three ways and two positions, usually closed and housed in the body 2.

FIG. 10 shows the device 100 installed and ready for use, but still in the first non-active condition. The non-active condition is characterised by the fact that the commutation valve with three ways and two positions is closed. In other words, the cavity 23 is connected to the chamber 25 and both cavity 23 and chamber 25 are joined to the external environment. Therefore the surface 16 of the self-closing diaphragm 15 is in contact with the edge 18 of the end 19 at the end of the pin 20.

In the first non-active condition, therefore, if the fluid is in the chamber 14, the fluid cannot invade the cavity 23 and the chamber 25.

When the device 100 is in the first non-active condition, rigid member 22, the hollow rod 21 is connected to, is kept in a first position distal with respect to the first support 17 by means of the push due to a first spring 27 interposed between the rigid member 22 and the first support 17.

In said condition the cavity 23 is surely connected to the chamber 25 that is connected to the external environment through the ducts 26a, 26b, 26c.

A first movable diaphragm 28 presents a central portion constrained to the rigid member 22 and a peripheral zone locked between the end 33 of the body 2 and a centering member 29 in order to get a seal. The centering member 29 rests on the first support 17 through a spacer 29a.

The chamber 25 is, therefore, delimited by the first support 17, the self-closing diaphragm 15, the end 19, the centering member 29, the first movable diaphragm 28 and the rigid member 22. The chamber 25 is permanently connected to the external environment through the ducts 26a, situated in the first support 17, 26b, situated in the body 2, and 26c, situated in the envelope 1.

The first movable diaphragm 28, the rigid member 22, the body 2, the envelope 1 and a second movable diaphragm 31 delimit a measuring chamber 30. The chamber 30 is located at the opposite side of the first movable diaphragm 28 with respect to the chamber 25.

A gasket 32, interposed between the body 2 and the envelope 1, assures the seal of the measuring chamber 30. The counter spring 3, located between the end 33 of the body 2 and a resting basis 35 integral with the envelope 1, tends to maintain the envelope 1 in a first position distal with respect to the end 4, that is in the position where an limit stop 34 of the envelope 1 is in contact with the body 2.

A portion of the rigid member 22 is housed in the chamber 25 and a portion in the measuring chamber 30. The duct 24 found in the rigid member 22, formed by the ducts 24a, 24b, assures in any condition the connection between the cavity 23 and the measuring chamber 30.

The second movable diaphragm 31, locked between the resting basis 35 integral with the envelope 1 and a spacer 36, seals the measuring chamber 30.

The spacer 36 rests on a second support 37 that is held by a basis 38. The spacer 36, the second support 37 and the basis 38 are radially referred to the envelope 1.

The second movable diaphragm 31, the spacer 36, the second support 37 and the basis 38 delimit a cavity 40. The basis 38 is locked to a wall 39 integral with the envelope 1. The basis 38 is a member capable of housing or supporting electric and electronic circuits and apparatuses processing and transmitting outside electromagnetic signals through relevant systems feeding energy, as in the prior art, and allowing the positioning, preferably on its surface delimiting the cavity 40, of electric contacts for opening and closing circuits by means of proper switch devices.

In a preferred embodiment of the device, the basis 38 comprises a printed circuit with a first side, delimiting the cavity 40, housing the electric contacts for the opening and closing of circuits through switches, and a second opposite side housing electric and/or electronic components and circuits.

The cavity 40, permanently connected to a cavity 40a through a duct 41 obtained in the second support 37, communicates with the external environment through a duct 42a obtained in the spacer 36, and a duct 42b obtained in the envelope 1.

Three sliders 43, 44 and 45 are housed in the cavity 40, said sliders being free to move. Preferably, said sliders have an axial symmetry and are coaxial.

A second spring 46 is interposed between the first slider 43 and the second support 37. In the first non-active condition of the device 100, when the pressure of the external environment acts in the cavity 23, the ducts 24, 24a and 24b and the measuring chamber 30, the second spring 46 keeps the first slider 43 pressed against the second movable diaphragm 31 and in a first position distal with respect to the second support 37.

A first elastic means 47 is interposed between the second slider 44 and the second support 37 or any portion axially locked with respect to the second support 37, as for example the basis 38. The first elastic means 47 keeps the second slider 44 pressed against the second movable diaphragm 31, in a position distal with respect to the basis 38.

A second elastic means 48 is interposed between the third slider 45 and the second support 37 or any portion axially locked with respect to the second support 37, as for example the basis 38. The second elastic means 48 keeps the third slider 45 pressed against the second movable diaphragm 31, in a position distal with respect to the basis 38.

The movement of the sliders 43, 44 and 45 occurs, respectively, by bucking the pushes due to the spring 46 and the elastic means 47 and 48. The bucking action causing the movement of the sliders 43, 44 and 45 is transmitted by means of the second movable diaphragm 31.

Three insulated electric contacts 49, 50 and 51 are integral with the basis 38.

A contact 52 connected to the movement of the first slider 43 acts as a switch on first electric contact 49 and causes its commutation (from opened to closed and vice-versa), when it is resting on the first electric contact 49 because of the translation of the first slider 43.

A contact 53 connected to the movement of the second slider 44 acts as a switch on second electric contact 50 and causes its commutation (from opened to closed and vice-versa), when it is resting on the second electric contact 50 because of the translation of the second slider 44.

A contact 54 connected to the movement of the third slider 44 acts as a switch on third electric contact 51 and causes its commutation (from opened to closed and vice-versa), when it is resting on the third electric contact 51 because of the translation of the third slider 45.

When the device 100 is in the first non-active condition, each of the three switches, consisting of the three couples contact 49-contact 52, contact 50-contact 53, contact 51-contact 54, can assume one of the two conditions: open or closed.

Each of the three above switches acts on an electric circuit with electronic components connected to the basis 38 for modifying the condition and activating some functions. Preferably the three switches are opened when the device 100 is found in the first non-active condition.

Figure 11:
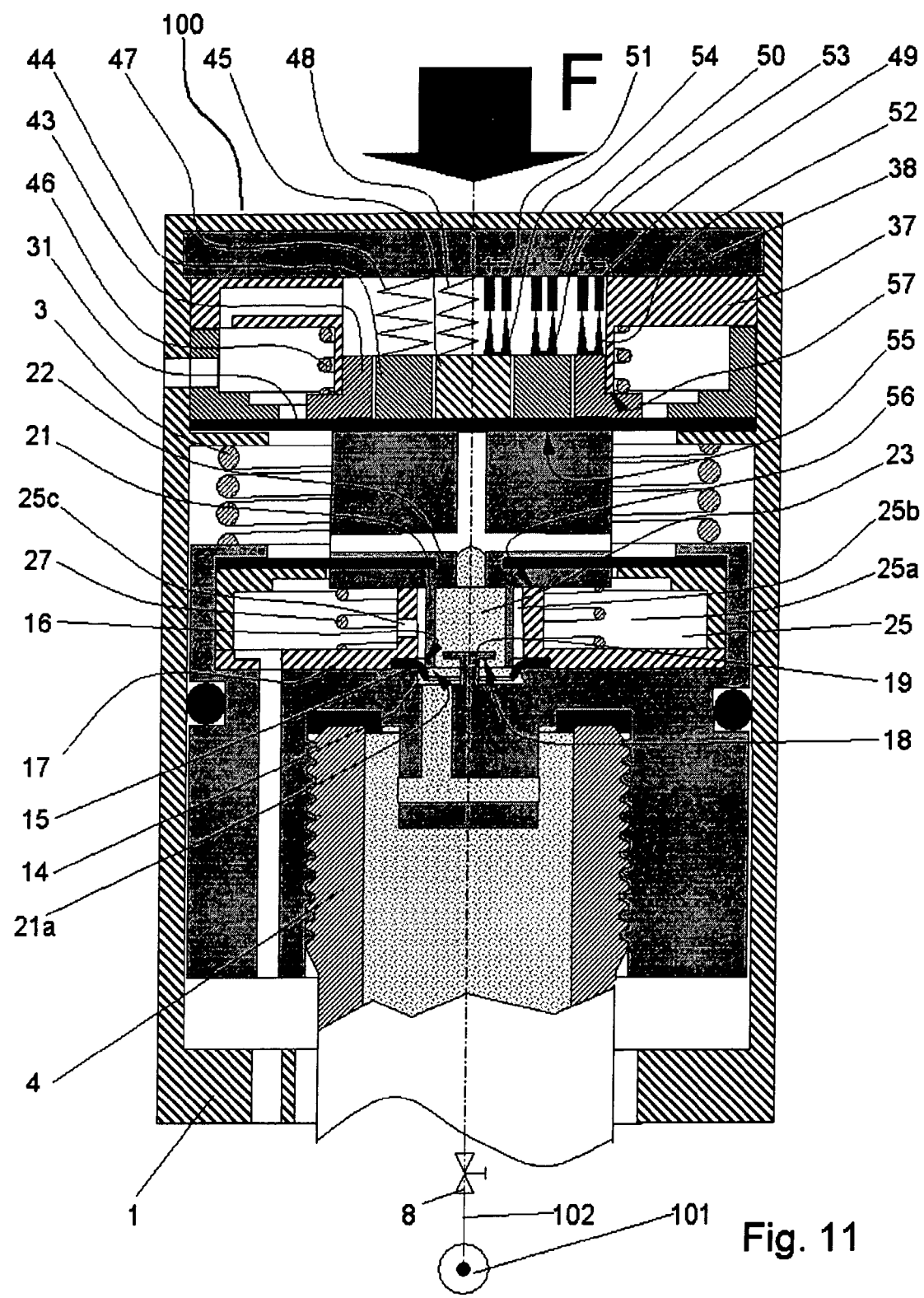
FIG. 11 explains how the commutation of the device from the not-active condition to the active condition occurs.

FIG. 11 illustrates as the operation of commutation from the first non-active condition to the second active condition of device 100 occurs. Said commutation is due to the axial translation of the envelope 1 from the first distal position to a second position proximal with respect to the end 4. The translation is obtained by applying a force F on the envelope 1 sufficient to gain the elastic reaction of the counter spring 3, of the first spring 27 and of the second spring 46.

The translation of the envelope 1 due to the force F at first causes the approach of the second movable diaphragm 31 to the end 55 of the rigid member 22, by contrasting the action only of the counter spring 3.

When the end 55 of the rigid member 22 is in contact with the second movable diaphragm 31, the successive action of the force F contrasts also the action of the first spring 27 and of the second spring 46, and causes at the same time:

a) the displacement of the rigid member 22, contrasting the action of the first spring 27, from its first distal position to a second position proximal with respect to the first support 17, said second being defined by the contact of the rigid member 22 with the limit stop 56 located in the first support 17;

b) the displacement of the first slider 43, contrasting the action of the second spring 46, from its first distal position to a second position proximal with respect to the second support 37, said second being defined by the contact of the first slider 43 with the limit stop 56 located in the second support 37; in said second proximal position the element 52 connected to the movement of the first slider 43 rests on the first electric contact 49 and causes the commutation of the first switch;

c) the displacement of the second slider 44, contrasting the action of the first elastic means 47, from its first distal position to a second position proximal with respect to the basis 38, defined by the contact of the contact 53, connected to the movement of the second slider 44, with the second electric contact 50 causing the commutation of the second switch;

d) the displacement of the third slider 45, contrasting the action of the first elastic means 48, from its first distal position to a second position proximal with respect to the basis 38, defined by the contact of the contact 54, connected to the movement of the third slider 45, with the third electric contact 51 causing the commutation of the third switch;

When the rigid member 22 is found in the position proximal with respect to the first support 17, the edge 21a of the hollow rod 21 acts on the surface 16 of the self-closing diaphragm 15 and causes the commutation of the valve with three ways and two positions.

The seal between the edge 21a of the hollow rod 21 and the surface 16 of the self-closing diaphragm 15 separates the cavity 23 from the chamber 25, while the translation of the surface 16 towards the chamber 14 removes the surface 16 from the edge 18 of the end 19, by stopping the seal connecting the chamber 14 to the cavity 23.

Figure 12:
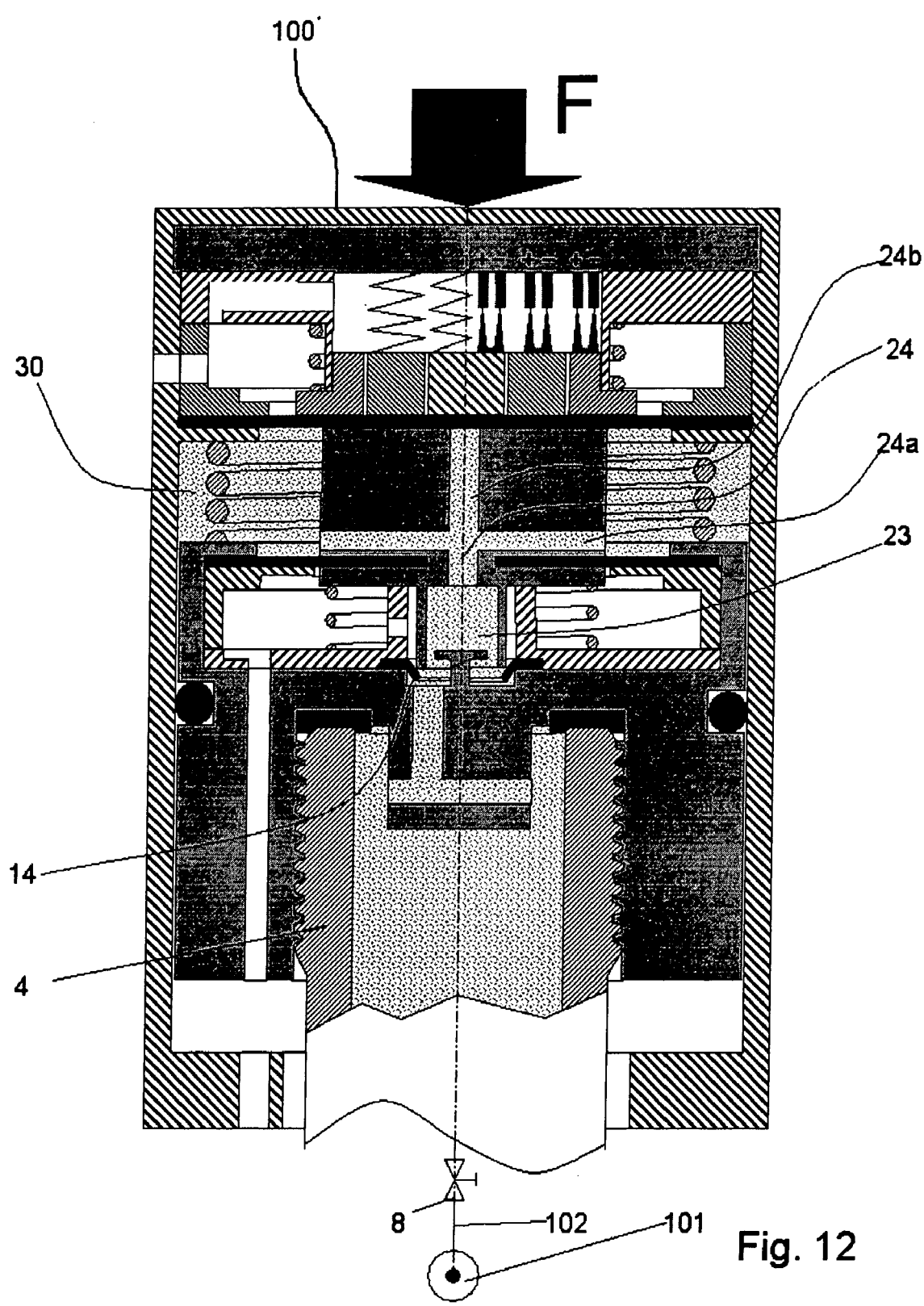
FIG. 12 illustrates the beginning of the filling of a measuring chamber of the device by the fluid.

As shown in FIG. 12, the fluid flows back from the chamber 14 to the cavity 23 and, from here, to the duct 24 and, through the ducts 24a and 24b, it fills the measuring chamber 30.

In this configuration the chamber 14 feeding the valve with three ways and two positions communicates with the hollow 20, the ducts 24, 24a and 24b, and the chamber 30, and all are filled with the fluid to be surveyed.

Figure 13:
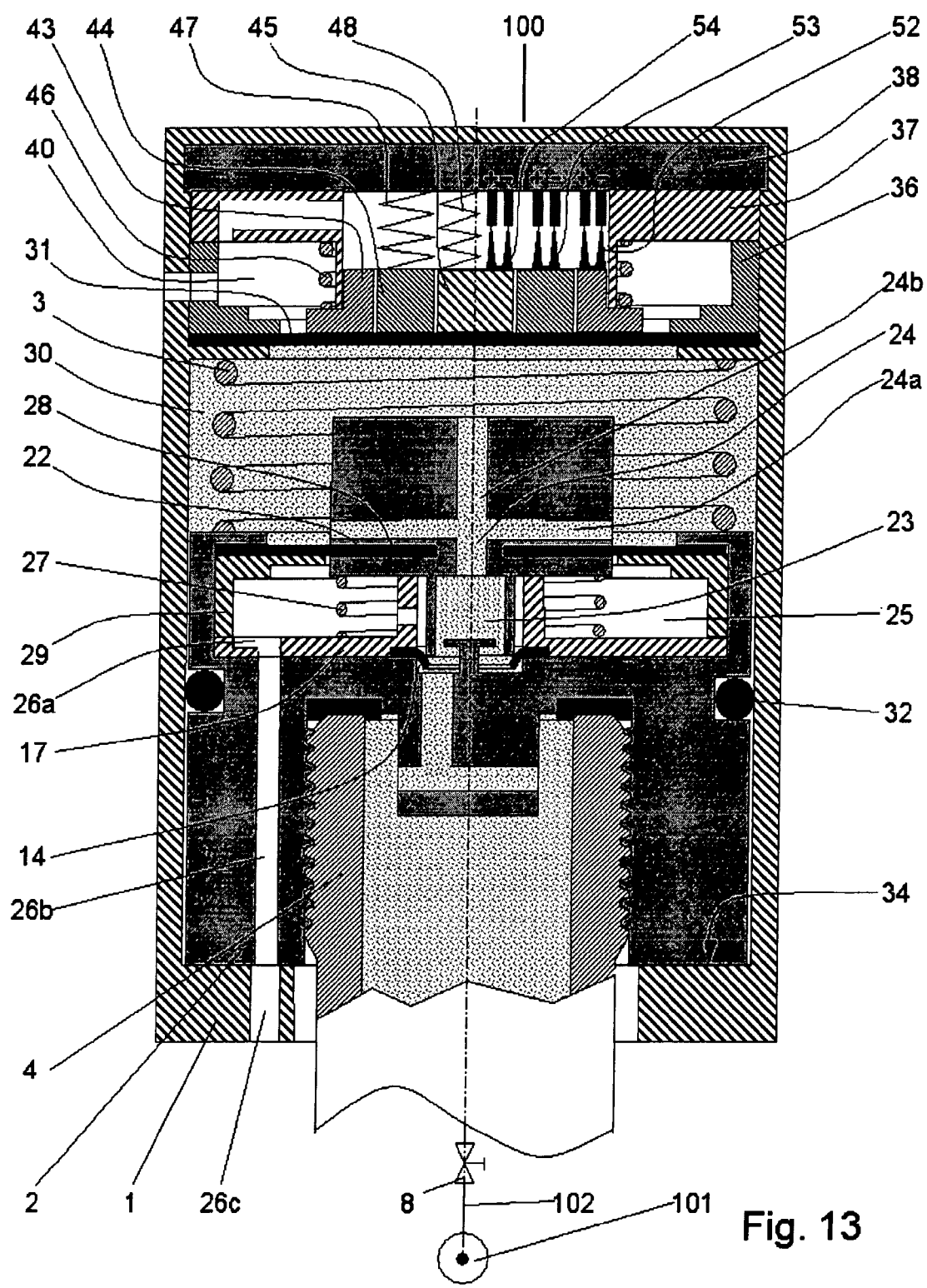
FIG. 13 shows the measuring chamber of the device completely filled by the fluid.

In FIG. 13 the final function of the F force is indicated. When the external action of the force F ends, the envelope 1 translates towards the position distal with respect to the end 4, that is to the position where the limit stop 34 of the envelope 1 is found in contact with the body 2. The translation is due to the stress of the counter spring 3 and of the resultant thrust of the relative pressure of the fluid in the measuring chamber 30 multiplied by the surface of section of the measuring chamber 30 perpendicular to the axis of translation, corresponding to the seal section of the gasket 32.

During the translation of the envelope 1 towards the position distal with respect to the end 4, the volume of the measuring chamber 30 increases, since the body 2 remains fixed and integral with the end 4.

Until when the valve with three ways and two positions is kept opened by the rigid member 22, a proper flow rate of the fluid through the valve, from the chamber 14 through the cavity 23 and the duct 24, assure the pressure of the fluid in the measuring chamber 30 is kept right during the entire translation phase.

The relative pressure of the fluid in the measuring chamber 30 acts, at the same time, on the first movable diaphragm 28 and second movable diaphragm 31.

The first movable diaphragm 28 transmits to the rigid member 22 a push that tends to maintain it in the position proximal with respect to the first support 17, contrasting the elastic reaction of the first spring 27. This push is given by the product of the relative pressure of the fluid in the measuring chamber 30 multiplied by the active surface of the first movable diaphragm 28, since the pressure of the external environment, which is in the chamber 25, acts on the opposite side of the first movable diaphragm 28

The section perpendicular to the axis of translation of the rigid member 22 defines the active surface of the first movable diaphragm 28, externally delimited by the corresponding section perpendicular to the axis of the centering member 29.

If the relative pressure of the fluid in the measuring chamber 30 is higher than a first pre-established threshold value of relative pressure Pci, the push transmitted by the first movable diaphragm 28 to the rigid member 22 is sufficient to contrast the reaction of the first spring 27, and to maintain the rigid member 22 in the position proximal with respect to the first support 17. The device 100 remains in the second active condition. That mains that the valve with three ways and two positions is opened and the connection of the chamber 14 to the measuring chamber 30 is kept through the cavity 23 and the ducts 24, 24a, 24b, while the camber 25 communicates with the external environment through the ducts 26a, 26b and 26c.

If the relative pressure of the fluid in the measuring chamber 30 is higher than the third pre-established threshold value of relative pressure Padvi, the second movable diaphragm 31 transmits a push to the first slider 43 for maintaining the slider 43 in the second position proximal with respect to the second support 37, contrasting the elastic reaction of the second spring 46. The product of the relative pressure of the fluid in the measuring chamber 30 multiplied by the active surface of the second movable diaphragm 31 with respect to the first slider 43 causes this push, since the pressure of external environment existing in the cavity 40 acts on the opposite side of the second movable diaphragm 31.

The section of the first slider 43 perpendicular to its axis of translation defines the active surface of the second movable diaphragm 31 with respect to the first slider 43. This is the section equivalent to the contact surface between the first slider 43 and the second movable diaphragm 31. The corresponding section perpendicular to the axis of the spacer 36 delimits externally the translation, while the section perpendicular to the axis of the second slider 44 delimits internally the translation.

The active surface of the second movable diaphragm 31 with respect to the first slider 43 is defined by the section of the first slider 43 perpendicular to its axis of translation (section equivalent to the contact surface between the first slider 43 and the second movable diaphragm 31). The corresponding section perpendicular to the axis of the spacer 36 delimits externally the translation, while the section perpendicular to the axis of the second slider 44 delimits internally the translation.

The second movable diaphragm transmits also to the second slider 44 a push which tends to maintain it in the second position proximal with respect to the basis 38, contrasting the reaction of the first elastic means 47. This push is given by the product of the relative pressure of the fluid in the measuring chamber 30 multiplied by the active surface of the second movable diaphragm 31 with respect to the second slider 44, since the pressure of external environment existing in the cavity 40 acts on the opposite side of the second movable diaphragm 31.

The active surface of the second movable diaphragm 31 with respect to the second slider 44 is defined by the section of the second slider 44 perpendicular to its axis of translation (section equivalent to the contact surface between the second slider 44 and the second movable diaphragm 31). The translation is delimited externally by the corresponding section perpendicular to the axis of the first slider 43, and internally by the section perpendicular to the axis of the third slider 45.

Finally, if the relative pressure of the fluid in the measuring chamber 30 is higher than the second pre-established threshold value Pcs of relative pressure, the second movable diaphragm 31 transmits also to the third slider 45 a push which keeps it in the second position proximal with respect to the basis 48, contrasting the reaction of the second elastic means 48.

This push is given by the product of the relative pressure of the fluid in the measuring chamber 30 multiplied by the active surface of the second movable diaphragm 31 with respect to the third slider 45, since the pressure of the external environment existing in the cavity 40 acts on the opposite side of the second movable diaphragm 31.

The active surface of the second movable diaphragm 31 with respect to the third slider 45 is defined by the section of the third slider 45 perpendicular to its axis of translation (section equivalent to the contact surface between the third slider 45 and the second movable diaphragm 31), which is externally delimited by the corresponding section perpendicular to the same axis of the second slider 44.

The pushes acted by the second spring 46 on the first slider 43, the first elastic means 47 on the second slider 44 and the second elastic means on the third slider 45 and the planing of the relevant areas of the active surfaces of the second movable diaphragm 31 with respect to the first slider 43, the second slider 44 and the third slider 45 are so chosen, that the passage of the three sliders 43, 44, 45 form the relevant second proximal positions to the first positions distal with respect to the second support 37 or the basis 38 takes place for different and pre-established of the relative pressure of the fluid in the measuring chamber 30, according to a pre-established sequence.

Starting from a value of relative pressure chosen so that all the three sliders 43, 44, 45 are found in the position proximal with respect to the second support 37 and the basis 38 because of the push of the second movable diaphragm 31, contrasting, respectively, the springs 46, 47 and 48 (in this position the tree elements 52, 53, 54, connected to the three sliders 43, 44 and 45, are in a condition commuted with respect to the condition that they had before the commutation from the first non-active condition to the second active condition), the progressive decreasing of the relative pressure of the fluid in the measuring chamber 30 will cause the following events:

a) when the relative pressure in the measuring chamber 30 reaches the second pre-established threshold value Pcs, the passage of the third slider 45 to the position distal with respect to the basis 38 occurs because of the push of the second elastic means 54, with consequent return of the contact 54, connected to it, in the condition that it had before the commutation from the non-active condition to the active condition;

b) later it will cause, for a pre-established value of relative pressure Padvi equal to the third threshold value of relative pressure, the passage of the first slider 43 to its first position distal with respect to the second support 37, because of the push of the second spring 46, with the consequent return of the elastic contact 52, connected to said support 37, in the condition that it had before the commutation from the first non-active condition to the second active condition;

c) finally, it will cause, for a value of relative pressure very lower than the first pre-established threshold value Pci of relative pressure (that is, for a value of relative pressure comprised between the pressure of the external environment and the first pre-established threshold value Pci, but lower than Pci), the passage of the second slider 44 to the first position distal with respect to the basis 38, because of the reaction of the first elastic means 47, with consequent return of the contact 53, connected to said means 47, in the condition that it had before the commutation from the first non-active condition to the second active condition.

If immediately after executing the external action of commutation from the non-active condition to the active condition, that is immediately after the end of the action of the external force F on the envelope 1, the relative pressure of the fluid in the measuring chamber 30 has a value higher than a pre-established threshold value Pcs, all the three sliders 43, 44, 45 are in the relevant position proximal with respect to the second support 37 and the basis 38, because of the push of the second movable diaphragm 31 acting on said three sliders 43, 44, 45, and the three elements 52, 53 and 54 connected to the three sliders 43, 44, 45 are all commuted with respect to the condition that they had before the commutation of device 100 from the non-active condition to the active condition.

The same configuration of the three sliders 43, 44, 45 and three elements 52, 53, 54, connected to said sliders 43, 44, 45, occurs also, when the relative pressure of the fluid in the measuring chamber 30, also finding initially at a value lower than the second pre-established threshold value Pcs, increases until reaching and eventually exceeding the second pre-established threshold value Pcs, (by obtaining the commutation of the switch, consisting of the couple contact 51-contact 54, to the condition opposite to that the switch has when the device 100 is found in the first non-active condition).

The same configuration of the three sliders 43, 44, 45 and three elements 52, 53, 54, connected to said sliders 43, 44, 45, occurs also, when the relative pressure of the fluid in the measuring chamber 30, also finding initially at a value lower than the third pre-established threshold value Padvi, but higher than the first pre-established threshold value Pci, progressively increases at first until reaching the third pre-established threshold value Padvi, (by obtaining the commutation of the switch, consisting of the couple contact 49-contact 52, to the condition opposite to that the switch has when the device 100 is found in the first non-active condition), and increases ulteriorly until reaching and eventually exceeding the second predetermined threshold value of relative pressure Pcs (obtaining the commutation of the switch consisting of contact 51-contact 54 to the condition opposite to that the switch assumes when the device 100 is in the non-active condition).

Until the relative pressure of the fluid in the measuring chamber is higher that the first pre-established threshold value Pci, the configurations of the switch consisting of the couple contact 49-contact 52 and of the switch consisting of the couple contact 51-contact 54 depend on the value of the relative pressure in the measuring chamber 30. Said switches commute from the condition that they assume when the device 100 is in the first non-active condition to the opposite condition exclusively in function of the value of the relative pressure in the measuring chamber 30.

When the relative pressure in the measuring chamber 30 decreases until reaching the first pre-established threshold value Pci, the commutation of the device 100 from the active condition to the non-active condition occurs (by obtaining the commutation of the switch consisting of the couple contact 50-contact 53 to the condition that it has when the device 100 is in the non-active condition), and the restore of the second active condition, if the pressure of the fluid newly becomes higher than the pre-established threshold value Pci occurs only as consequence of the external action of the force F.

Figure 14:
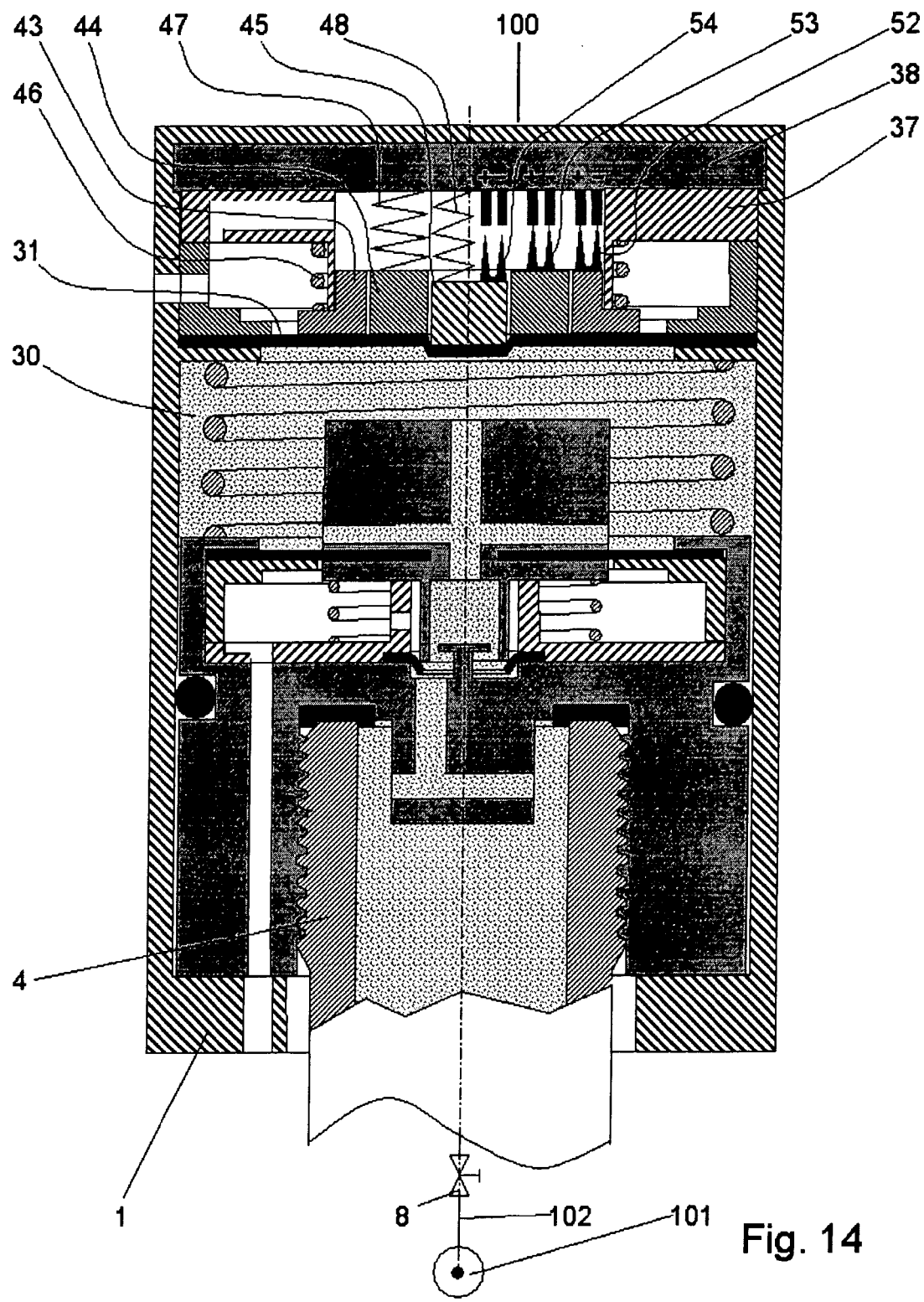
FIG. 14 illustrates a first working condition of the device with the measuring chamber filled by the fluid.

FIG. 14 shows that, if immediately after the completing of the external action of commutation from the non-active condition to the active condition, that is immediately after the end of the external action of the force F on the envelope 1, the relative pressure of the fluid has a value higher than the third pre-established threshold value Padvi, but lower than the second pre-established threshold value Pcs, the third slider 45 is in the position distal with respect to the basis 38 because of the prevailing of the reaction of the second elastic means 48 on the push effected by the second movable diaphragm 31 on the third slider 45, while the other sliders 43, 44 maintain, respectively, the proximal position with respect to the second support 37 and the basis 38, because of the push effected on said sliders 43, 44 by the second movable diaphragm 31 which prevails, respectively, on the elastic reaction of the second spring 46 and the first elastic means 47.

The element connected to the third slider 45 is in the condition usually assumed when the device 100 is in the non-active condition, while the two elements 52, 53, connected to the sliders 43, 44, are found in the condition commuted with respect to the condition that they have when the device 100 is in the non-active condition.

The same configuration of the three sliders 43, 44 and 45 and of the three elements 52, 53 and 54, to they respectively connected, occurs also in the case that the relative pressure of the fluid, contained in the measuring chamber 30 initially, that is immediately after the effecting of the external action of commutation from the non-active condition to the active condition, has a value higher than the second pre-established threshold value Pcs of relative pressure, and in a successive time only it decreases until reaching than the second pre-established threshold value Pcs of relative pressure.

In this case, when the relative pressure in the measuring chamber 30 reaches the second pre-established threshold value Pcs, the reaction of the second elastic means 48 prevails on the push of the second movable diaphragm 31 on the third slider 45 which translates from a position proximal with respect to the basis 38, by causing at the same time the return of the contact 54, connected to the third slider 45, to the condition usually assumed when the device 100 is in the first non-active condition.

Figure 15:
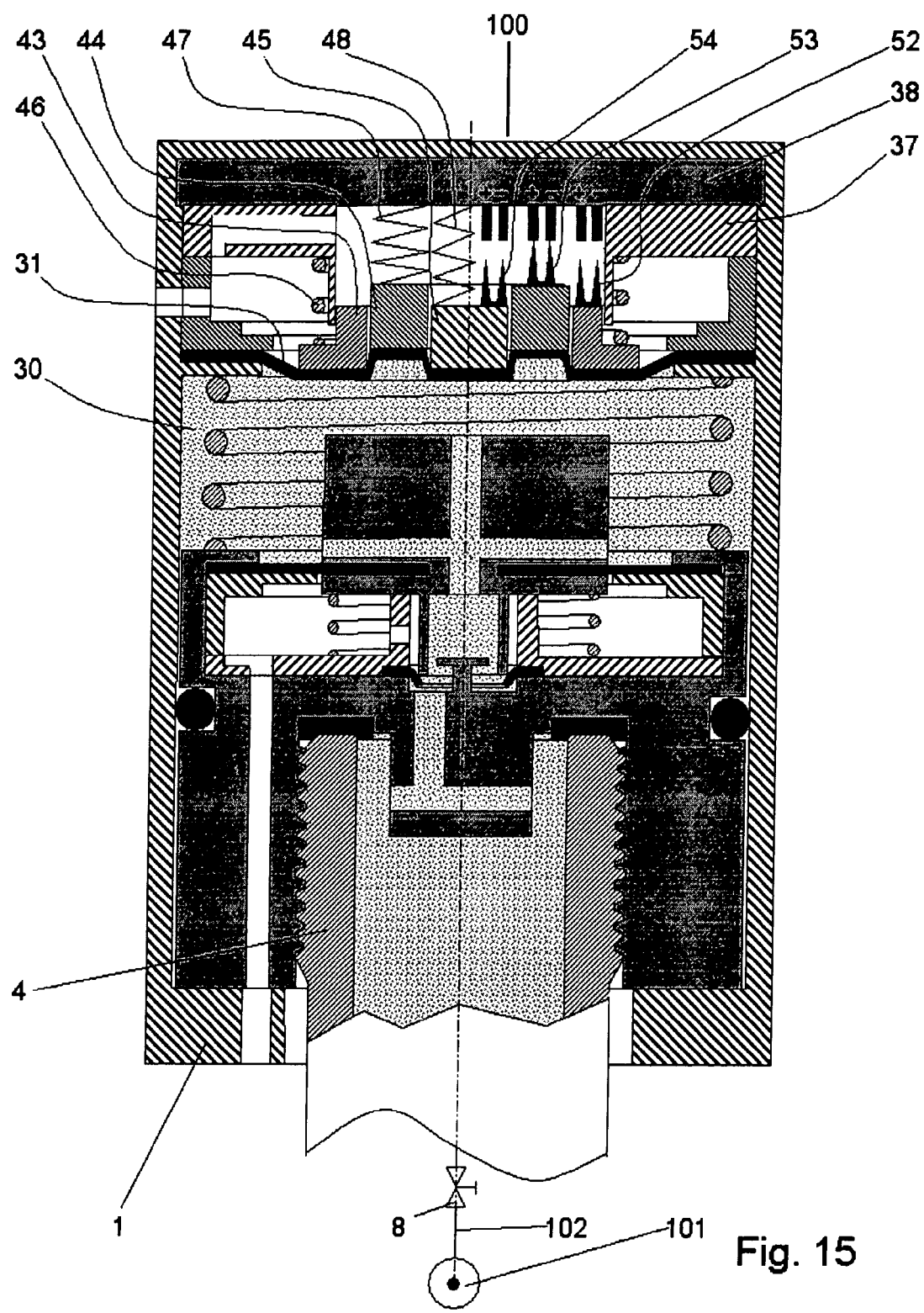
FIG. 15 shows a second working condition of the device.

In FIG. 15 is explained that if immediately after the effecting of the external action of commutation from the non-active condition to the active condition, that is immediately after the end of the external action of the force F on the envelope 1, the relative pressure of the fluid to be surveyed contained in the measuring chamber 30 has a value higher than a first pre-established threshold value Padvi, the first slider 43 is in the first position distal with respect to the second support 37, because of the prevailing of the elastic reaction of the second spring 46 on the push effected by the second movable diaphragm 31 on the first slider 43, and the contact 52, connected to the first slider 43 is in the condition usually assumed, when the device 100 is in the non-active condition. In this condition the third slider 45 is in the first position distal with respect to the basis 38, because of the prevailing of the reaction of the second elastic means 48 on the push effected by the second movable diaphragm 31 on the third slider 45. The contact 54 connected to the third slider 45 is in the condition usually assumed when the device 100 is in the first non-active condition, while the slider 44 is in the second position proximal with respect to the basis 38, because of the prevailing of the push effected by the second movable diaphragm 31 on the second slider 44 on the reaction of the first elastic means 47. The contact 53, connected to the second slider 44 is in the condition commuted with respect to the normal condition assumed when the device 100 is in the first non-active condition.

The same configuration of the three sliders 43, 44 and 45 and of the three elements 52, 53 and 54, respectively connected to the sliders 43, 44 and 45, happens also in the case that the relative pressure of the fluid contained in the measuring chamber 30 initially, that is immediately after the executing of the external action of commutation from the first non-active condition to the second active condition, has a value higher than a third pre-established threshold value Padvi, and only in a successive time the relative pressure decreases until reaching the third pre-established threshold value Padvi.

In this case, when the relative pressure in the measuring chamber 30 reaches the third pre-established threshold value Padvi, the reaction of the second spring 46 prevails on the push effected by the second movable diaphragm 31 on the first slider 43, which slides from a second proximal position to a first position distal with respect to the basis 38, by causing at the same time the return of the contact 52, connected to the first slider 43, in the condition usually assumed when the device 100 is in the non-active condition. The same configuration of the three sliders 43, 44 and 45 and of the three elements 52, 53 and 54, connected to the sliders 43, 44 and 45, happens also in the case that the relative pressure of the fluid contained in the measuring chamber 30 initially, that is immediately after the executing of the external action of commutation from the first non-active condition to the second active condition, has a value higher than a second pre-established threshold value Pcs, and only in a successive time the relative pressure decreases until reaching at first a second pre-established threshold value Pcs, (with the consequent translation of the third slider 45 towards the first position distal with respect to the third slider 37) and later a third second pre-established threshold value Padvi of relative pressure.

Figure 16:
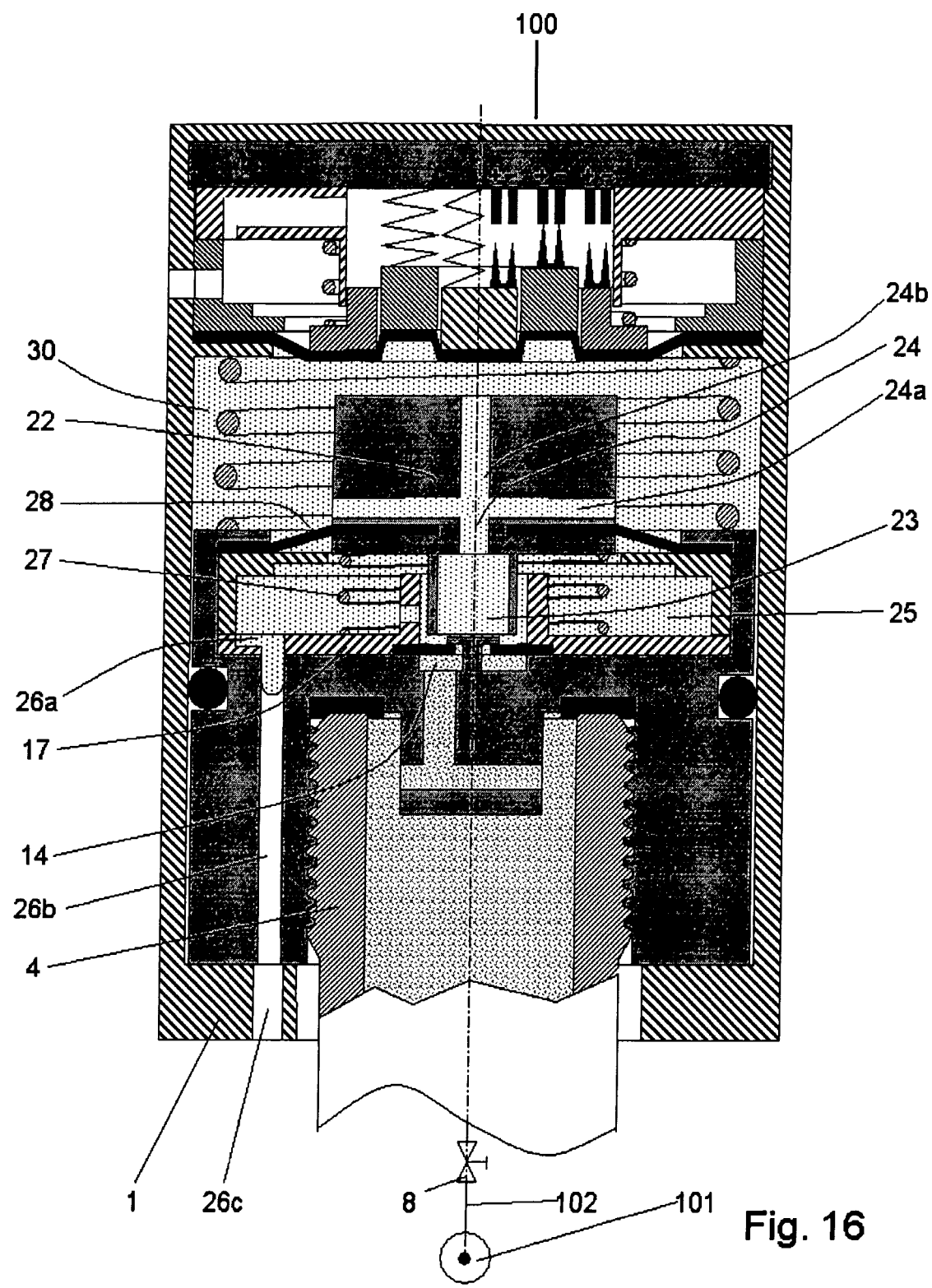
FIG. 16 shows a third working condition of the device.

FIG. 16 demonstrates that, if immediately after the effecting of the external action of commutation from the non-active condition to the active condition, that is immediately after the end of the external action of the force F on the envelope 1, the relative pressure of the fluid in the measuring chamber 30 is lower than the first pre-established threshold value Pci, the push transmitted by the first movable diaphragm 28 to the rigid member 22 is not sufficient to contrast the reaction of the first spring 27. In this case the rigid member 22 is pushed by the reaction of the first spring 27 until its position distal with respect to the first support 17, the valve with three ways and two positions commutes in the closure position. The connection of the chamber 14 to the measuring chamber 30 interrupts. In this configuration the connection of the chamber 14 to the cavity 23 ends, and the measuring chamber 30 is connected with the external environment through the ducts 24, 24a, 24b, the cavity 23, the chamber 25 and the ducts 26a, 26b and 26c.

In such a way the fluid contained in the measuring chamber 30 flows outside and the pressure in the measuring chamber 30 decreases until the value of the external environment.

Figure 17:
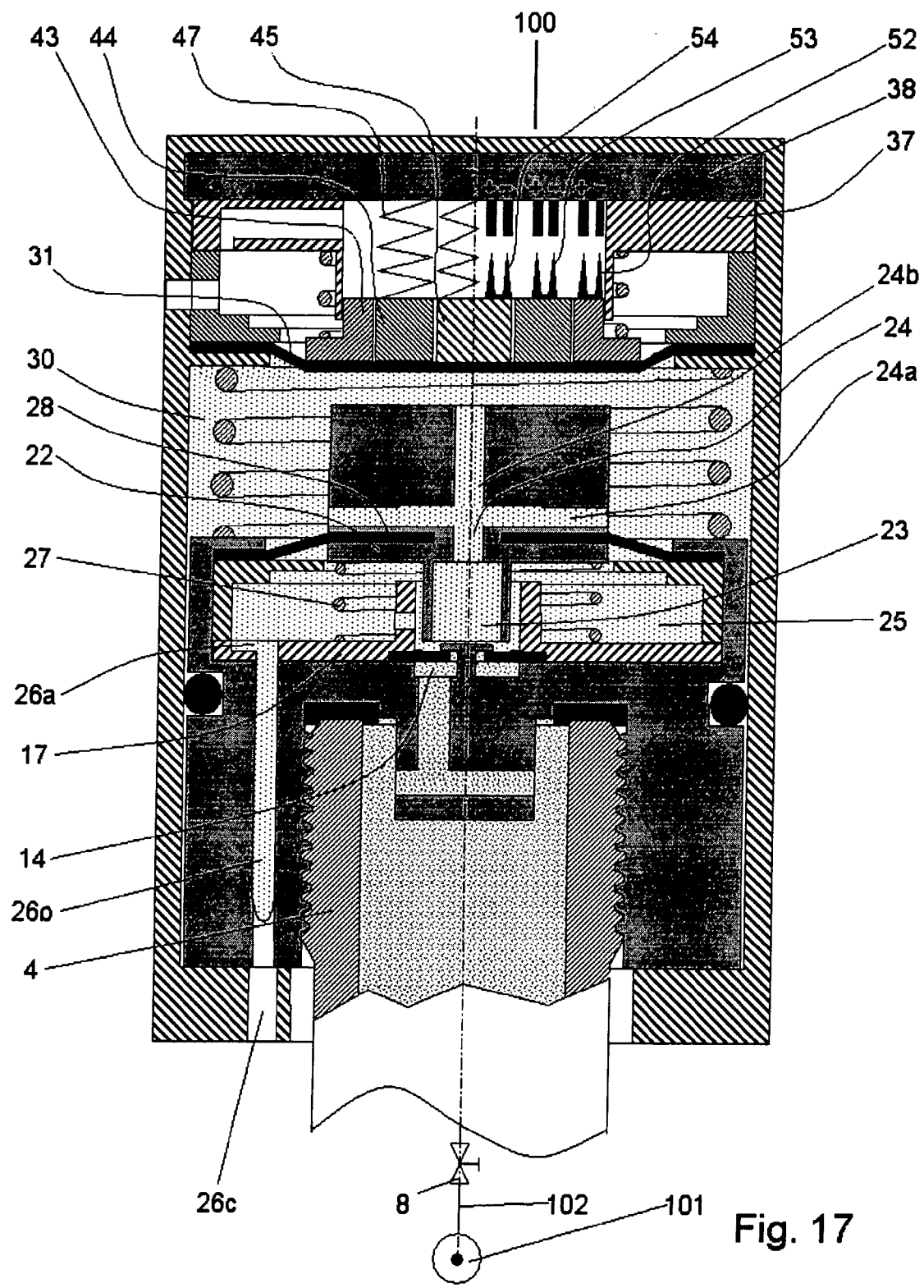
FIG. 17 shows a fourth working condition of the device.

FIG. 17 demonstrates that when the relative pressure of the fluid contained in the measuring chamber 30 reaches a value very lower than a first pre-established threshold value Pci, (that is, a value of relative pressure comprised between the pressure of the external environment and the first pre-established threshold value Pci, but lower than said value Pci), so that the push acted by the second movable diaphragm 31 on the second slider 45 is lower than the reaction of the first elastic means 47, the second slider 44 translates until the first position distal with respect to the basis 38, because of the first elastic means 47, with consequent return of the contact 53, connected to said elastic means 47, in the condition antecedent the operation of commutation of the device 100 from the non-active to the active condition.

The same configuration of the three sliders 43, 44 and 45 and of the three elements 52, 53 and 54, respectively connected to the sliders 43, 44 and 45, occurs also in the case that the relative pressure of the fluid contained in the measuring chamber 30, at the beginning, that is immediately after the effecting of the external action of commutation from the non-active to the active condition, has a value higher than a first pre-established threshold value Pci of relative pressure and in a successive time only the relative pressure decreases until reaching the first pre-established threshold value Pci.

In this case, when the relative pressure in the measuring chamber 30 reaches the first pre-established threshold value Pci, the rigid member 22 is pushed by the reaction of the first spring 27 until its position distal with respect to the first support 17, the valve with three ways and two positions commutes in the closure condition. The connection of the chamber 14 to the measuring chamber 30 interrupts, said chamber 30 being connected to the external environment through the ducts 24, 24a, 24b, the cavity 23, the chamber 25 and the ducts 26a, 26b and 26c.

In such a way, the fluid contained in the measuring chamber 30 flows towards the external environment. The relative pressure in the measuring chamber 30 decreases until the reaction of the first elastic means 47 prevails on the push effected by the second movable diaphragm 31 on the second slider 44. Said slider 44 translates from a proximal position to a position distal with respect to the basis 38. For that reason the return of the contact 53, connected to the second slider 44, to the usual condition occurs. Said usual condition takes place when the device 100 is in the non-active condition.

The same configuration of the three sliders 43, 44, 45 and the three elements 52, 53, 54, respectively connected to the sliders 43, 44, 45, occurs also in the case that the relative pressure of the fluid contained in the measuring chamber 30, at the beginning, that is immediately after the effecting of the external action of commutation from the non-active condition to the active condition, has a value higher than a pre-established threshold value Padvi of relative pressure, and in a successive time only said relative pressure decreases until at first reaching the third pre-established threshold value Padvi (with the consequent translation of the first slider 43 towards the position distal) with respect to the second support 37), and later the first pre-established threshold value Pci. In this case, when the relative pressure in the measuring chamber 30 reaches later the first pre-established threshold value Pci, the push transmitted by the first movable diaphragm 28 to the rigid member 22 is not sufficient to contrast the reaction of the first spring 27. The rigid member 22 is pushed by the reaction of the first spring 27 until its first position distal with respect to the first support 17. The valve with three ways and two positions commutes in closure position and the connection of the chamber 14 to the measuring chamber 30 is interrupted, and every fluid leak from the chamber 14 towards the chamber 25 or the cavity 23 stops.

The measuring chamber 30 is connected to the external environment through the ducts 24, 24a, 24b, the cavity 23, the chamber 25 and the ducts 26a, 26b, 26c. The fluid contained in the measuring chamber 30 flows towards the external environment and its pressure decreases until the value of the external environment.

When the relative pressure of the fluid flowing from the measuring chamber 30 reaches a value chosen so that the push acted by the second movable diaphragm 31 on the second slider 44 becomes lower than the reaction of the first elastic means 47, the second slider translates until the position distal with respect to the basis 38 because of the reaction of the first elastic means 47, with consequent return of the contact 53, connected to the first elastic means 47, in the condition that it had before the commutation from the non-active to the active condition.

The same configuration of the three sliders 43, 44, 45 and three elements 52, 53, 54, respectively connected to said sliders 43, 44, 45, finally occurs in the case that the pressure relative of the fluid contained in the measuring chamber 30 is initially, that is immediately after the effecting of the external action of commutation from the non-active to the active condition, at a value higher than a second pre-established threshold value Pcs, and only in a successive time decreases until at first reaching a third pre-established threshold value Padvi, (with the consequent translation of the first slider 43 towards the position distal with respect to the second support 37) and later a first pre-established threshold value Pci of relative pressure.

Figure 18:
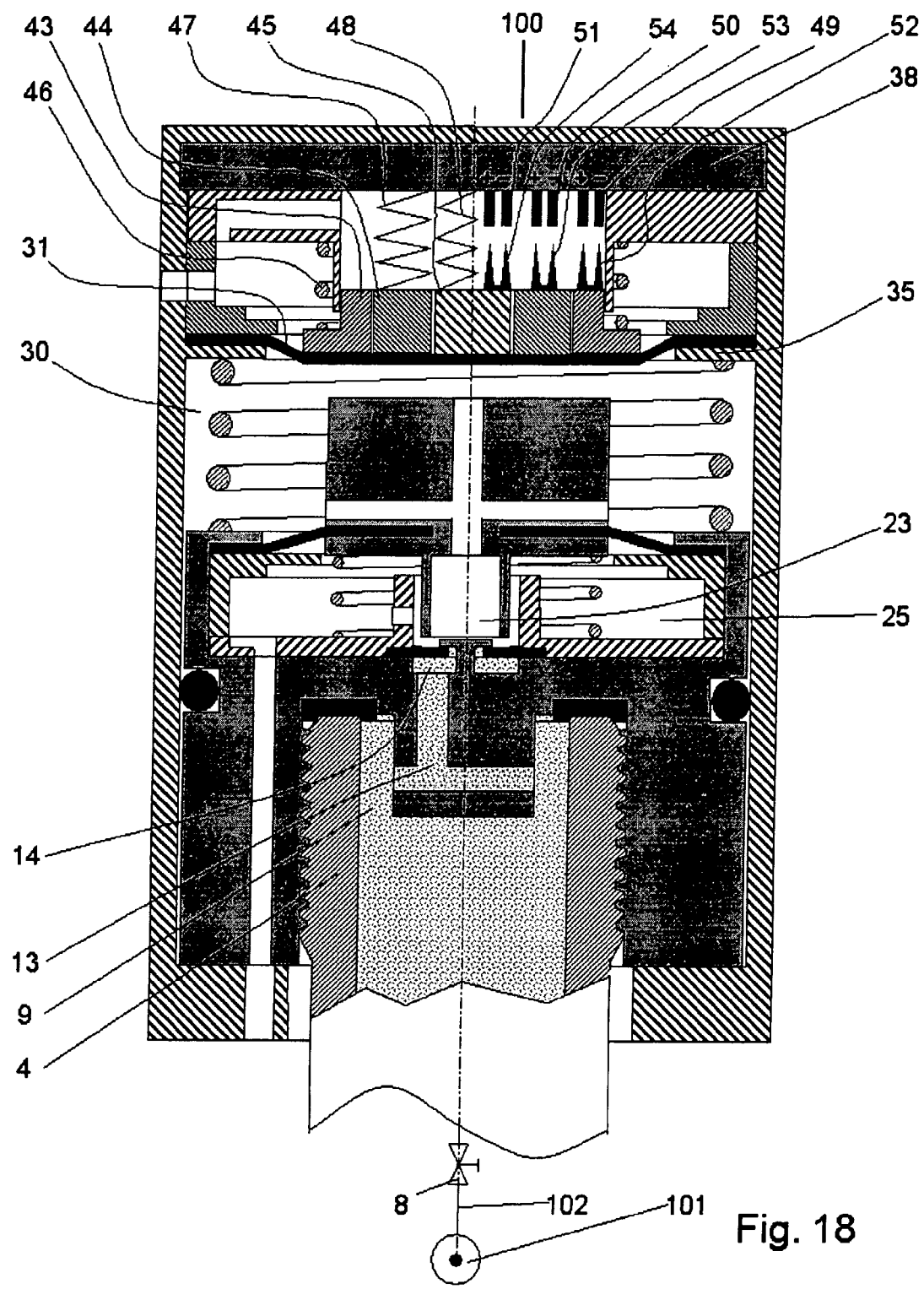
FIG. 18 demonstrates as the device is behaved after the outflow of the fluid from the measuring chamber to the external environment.

FIG. 18 shows how, at the end of the fluid outflow from the measuring chamber 30 towards the external environment, the configuration of the device 100 is identical to the configuration of the device 100 before the commutation from the non-active to the active condition (see FIG. 10).

When the device 100 is in the non-active condition, the leak of the fluid in the chamber 9 of the end 4 through the duct 13 and the chamber 14 towards the cavity 23 and the chamber 25 connected to the environment is prevented by the closure of the valve with three ways and two positions.

So doing it is not necessary to close the tap 8 (or the automatic inflating valve) when the device 100 is in the non-active condition.

The already disclosed feature of the valve with three ways and two positions, allowing to always avoid the connection of the chamber 14 to the chamber 25, (that is the chamber 9 to the environment) also during the commutation transient of the valve with three ways and two positions, that is also during the commutation transient of the device 100 from the active to the non-active condition (and vice-versa) assures that the fluid volume releasing in the environment when the commutation of the device 100 from the active to the non-active condition (and vice-versa) occurs cannot, therefore, never be higher than the sum of the volumes of the measuring chamber 30, the ducts 24 and the cavity 23.

The signals advising the exceeding of the three prefixed threshold values Pci, Pcs and Padvi of relative pressure are processed and transmitted by the electronic device integral with the basis 38 according to the condition of the three elements 52, 53 and 54 respectively connected to the three sliders 43, 44 and 45.

The signal advising the exceeding of the higher second threshold value Pcs of relative pressure is emitted by the device 100 when the switch, consisting of the couple contact 51-contact 54, commutes to the condition opposite to the one that the switch has when the device 100 is in the non-active condition. The emission of the signal advising the exceeding of the higher second threshold value Pcs of relative pressure is prevented when the switch, consisting of the couple contact 51-contact 54, commutes in the condition that it has when the device 100 is in the non-active condition.

The signal advising the exceeding of the lower third prefixed threshold value Padvi of relative pressure is emitted when the switch, consisting of the couple contact 49-contact 52, commutes to the condition that it has when the device 100 is in the first non-active condition. The emission of the signal advising the exceeding of the lower third prefixed threshold value Padvi of relative pressure is prevented when the switch, consisting of the couple contact 49-contact 52, commutes to the condition opposite to the one that the switch has when the device 100 is in the first non-active condition.

The signal advising the exceeding of the lower first prefixed threshold value Pci of relative pressure is emitted when the switch, consisting of the couple contact 50-contact 53, commutes to the condition that it has when the device 100 is in the first non-active condition. The emission of the signal advising the exceeding of the lower first prefixed threshold value Pci of relative pressure is prevented when the switch, consisting of the couple contact 50-contact 53, commutes to the condition opposite to the one that the switch has when the device 100 is in the first non-active condition.

The condition of the three elements 52, 53 and 54, respectively connected to the three sliders 43, 44 and 45, only depends on the instantaneous value of the relative pressure of the fluid in the measuring chamber 30, the active surfaces of the three sliders 43, 44 and 45 in contact with the second movable diaphragm 38 and the reactions of the spring 46 and the elastic means 47 and 48, and it absolutely does not depend on the position or movement of other internal parts of the device 100.

Therefore, the emission of the signals advising the exceeding of the three prefixed threshold values of relative pressure exclusively depends on the instantaneous value of the relative pressure of the fluid in the measuring chamber 30.

Figure 19:
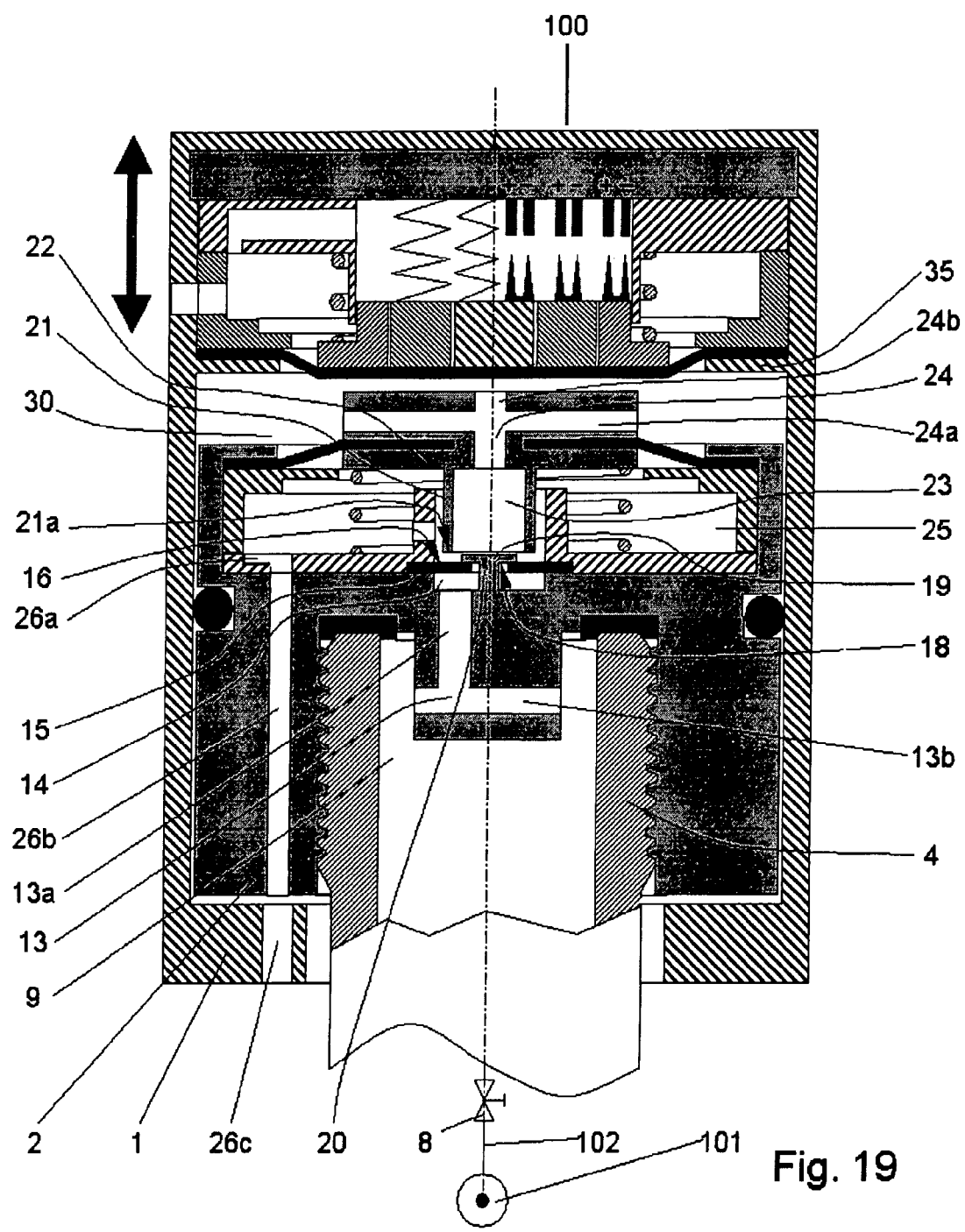
FIG. 19 shows a second embodiment of the device in a non-active condition.

FIG. 19 shows a second embodiment of the device 100 providing the removal of the counter spring 3 interposed between the body 2 and the supporting basis 35 integral with the envelope 1, for reducing the full axial dimensions of the device 100.

In the non-active condition of the device 100, the edge 21a of the hollow rod 21 of the rigid member 22 is not in contact with the self-closing diaphragm 15. The measuring chamber 30 is connected to the environment through the ducts 24, 24a, 24b, the cavity 23, the chamber 25 and the ducts 26a, 26b, 26c. The surface 16 of the self-closing diaphragm 15 is in contact with the edge 18 of the end 19 at the end of the pin 20.

In the non-active condition of the device 100, also in case the fluid is in the chamber 14, it will cannot invade the cavity 23 and the chamber 25 because of the hermetic seal between the surface 16 of the self-closing diaphragm 15 and the edge 18 of the end 19. Therefore, in this embodiment, in the non-active condition the envelope 1 axially translates with respect to the body 2, the translation occurring aside from the fluid is or not in the chamber 14, the ducts 13, 13a, 13b and the chamber 9.

Figure 20:
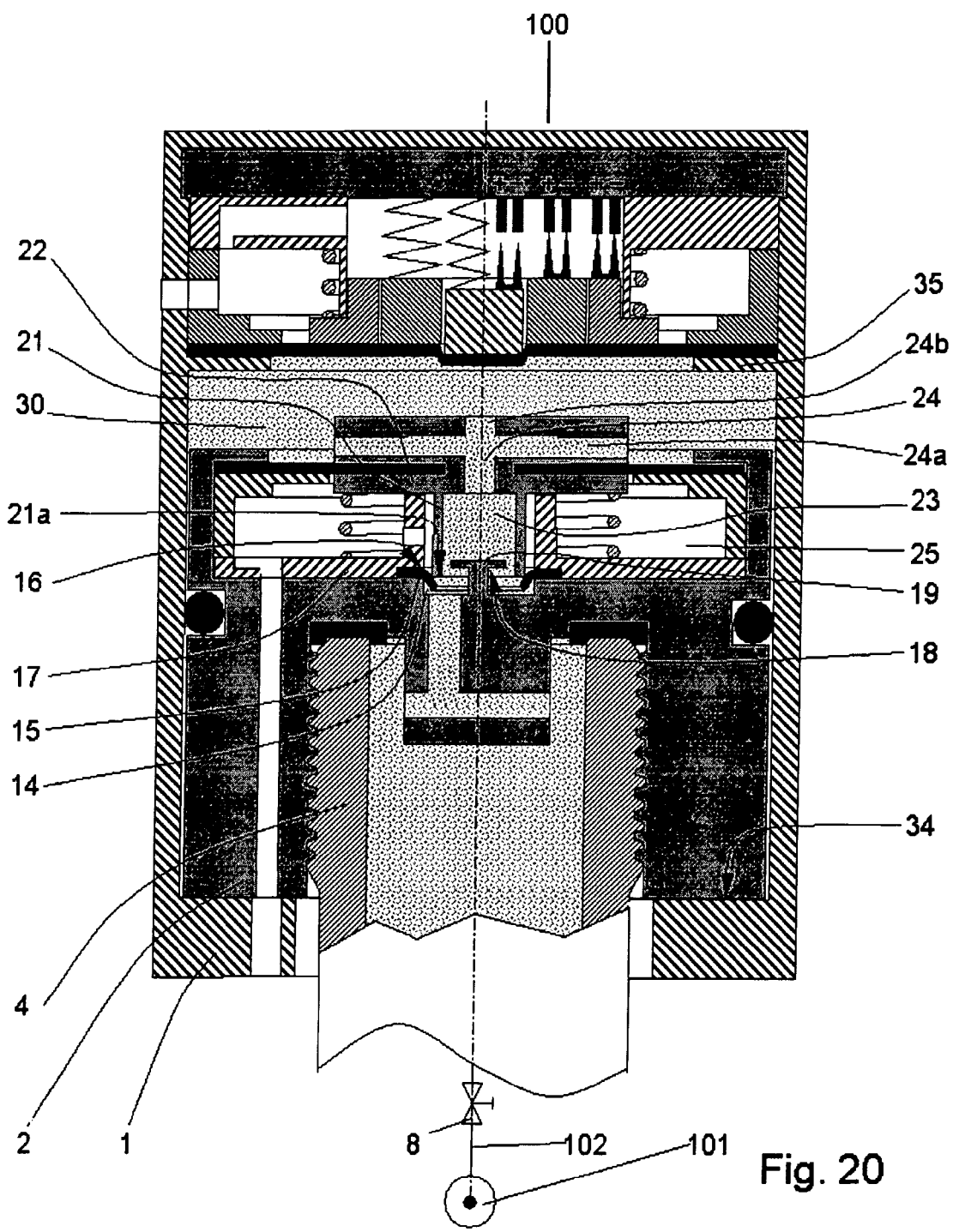
FIG. 20 represents the embodiment of FIG. 19 with the device in an active condition.

In FIG. 20, the active condition of the device 100 is defined when the rigid member 22 is in the position proximal with respect to the first support 17, and, therefore, the edge 21a of the hollow rod 21 acts on the surface 16 of the self-closing diaphragm 15 causing the commutation of the valve with three ways and two positions.

The seal between the edge 21a of the hollow rod 21 and the surface 16 of the self-closing diaphragm 15 separates the cavity 23 from the chamber 25, while the translation of the surface 16 towards the chamber 14 causes the interruption of the contact between the surface 16 and the edge 18 of the end 19, so that the seal stops and the chamber 14 communicates with the cavity 23 and the fluid can invade the measuring chamber 30 through the ducts 24, 24a, 24b.

Therefore, in the embodiment without the counter spring 3 interposed between the body 2 and the supporting basis 35 integral with the envelope 1, when the device 100 is in the active condition, the envelope 1 is kept in the position distal with respect to the end 4, that is in the position where the limit stop 34 of the envelope 1 is in contact with the body 2, by the push of the relative pressure of the fluid inside the measuring chamber 30.

When the device 100 is in the non-active condition, that is when in the measuring chamber 30 any compressed fluid exists, the envelope 1 is free to axially move with respect to the end 4 since there is no push capable of maintaining the envelope 1 in the position distal with respect to the end 4.

Figure 21:
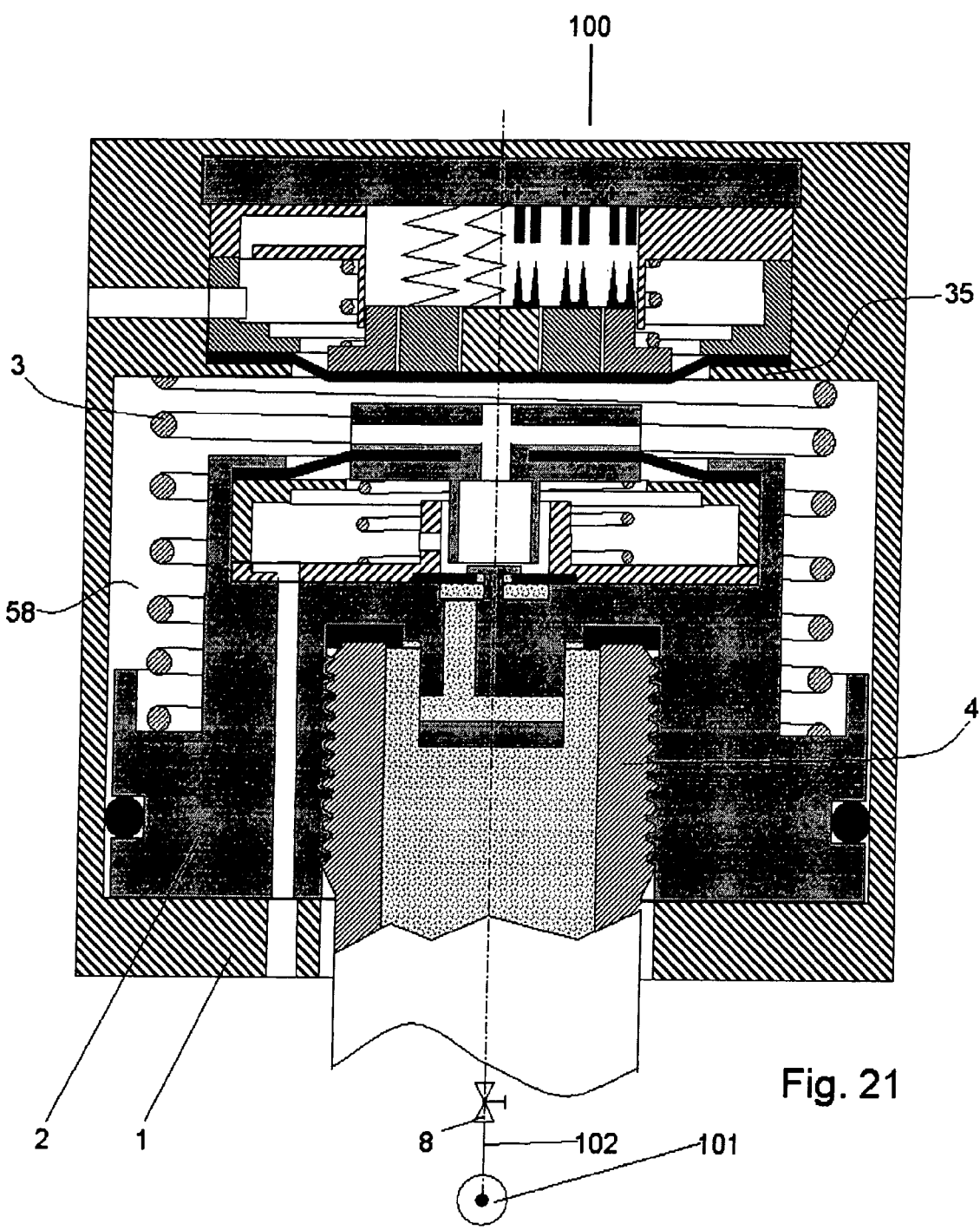
FIG. 21 represents a third embodiment of the device.

FIG. 21 shows a third embodiment of the device 100 allowing to keep on providing the advantage consisting of the shortening of the total length of the device 100 and, at the same time, to maintain the counter spring 3 interposed between the body 2 and the supporting basis 35 integral with the envelope 1. In order to keep the same radial dimensions of the first deforming diaphragm, the required space to house the counter spring 3 is found in an interspace 58 which is obtained by increasing the radial dimensions of the envelope 1.

A device 100 is realised presenting all the features of the first disclosed embodiment but with a total shorter length and a longer radial dimension.

A fourth embodiment of the device 100 is represented in FIG. 20. This embodiment provides the use of Belleville washers 59 and 60 instead, respectively, of the first spring 27 and the second spring 46 for acting the required reaction respectively on the rigid member 22 and the first slider 43. This kind of springs is properly suitable for being used in the suggested position since their features allow to limit the axial dimensions, above all with regard to the dimensions required by the usual helical springs.

Figure 23:
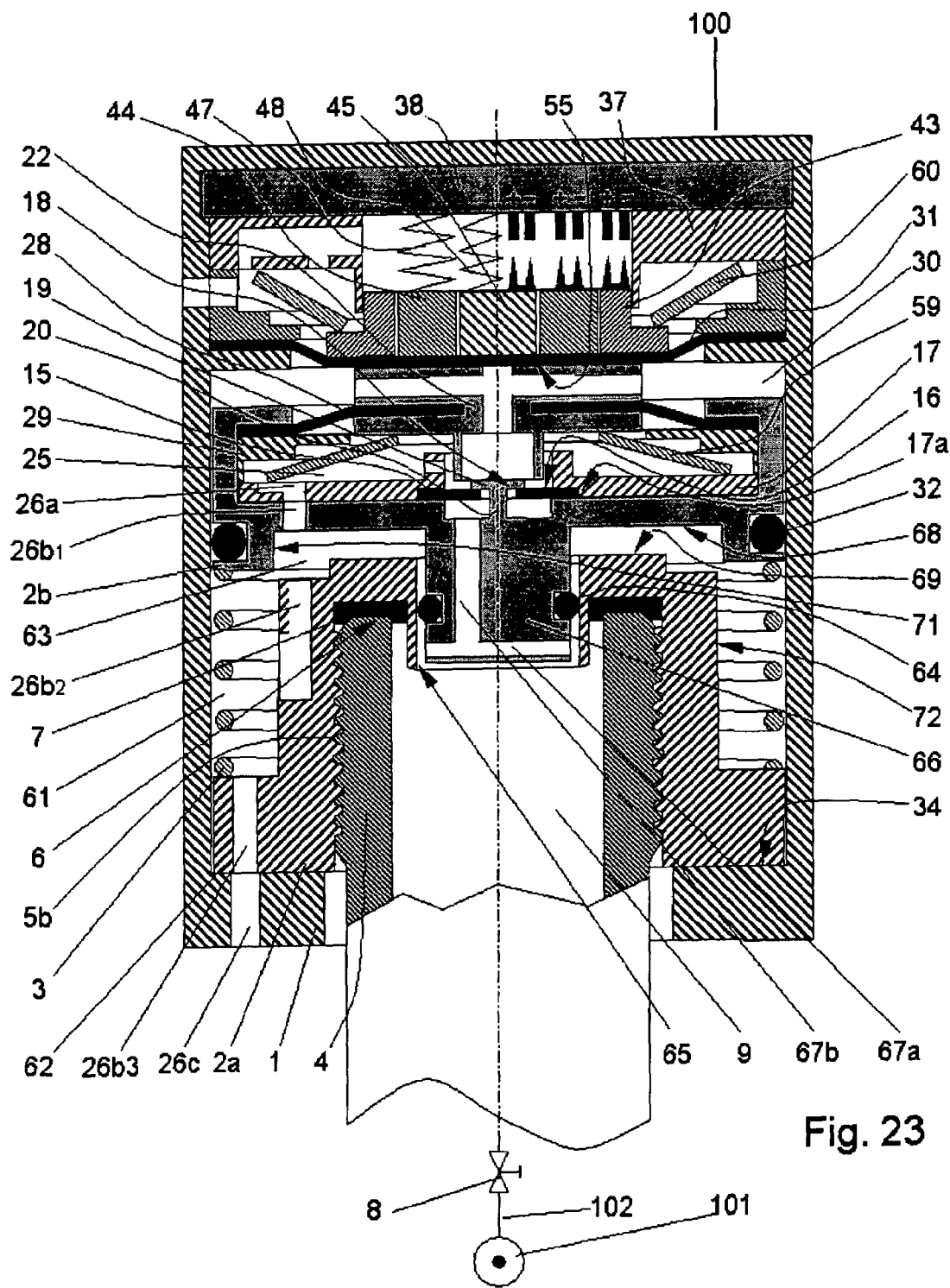
FIG. 23 represents a fifth embodiment of the device in the non-active condition.

A fifth embodiment of the device 100 is shown in FIG. 23. The purpose of this embodiment is the maximum reduction of the axial and radial dimensions. This embodiment keeps on providing the advantage of the minimum total length of the device 100 and, at the same time, to assure the action of the counter spring 3 on the envelope 1 in order to maintain the position of the envelope 1 distal with respect to the end 4 when the device 100 is in the first non-active condition (that is when there is not the compressed fluid in the measuring chamber 30) without increasing the radial dimensions of the device 100, as expected in the above mentioned third embodiment. Advantageously, this fifth embodiment provides also the use of Belleville washers 59 and 60 instead, respectively; of the first spring 27 and the second spring 46, in order to reach the maximum reduction of the axial dimensions.

In order to reach this purpose the embodiment provides the separation of the body 2 in two portions. A first portion 2a is fixed and used to fix the device 100 to the end 4, while a second portion 2b is movable and free to axially translate with respect to the first fixed portion 2a and the envelope 1.

In the first fixed portion 2a of the body 2 the following members are housed:
a) the apparatus 5b for connecting to the end 4;
b) the gasket 7 for the seal between the first fixed portion 2a of the body 2 and the upper end 6 of the end 4;
c) the end 62;
d) the prismatic connection with the envelope 1.

In the second movable portion 2b of the body 2 the following members are housed:
e) the first support 17;
f) the valve with three ways and two positions, including the self-closing diaphragm 15 housed in a proper seat 17a, found in the first support 17. The seat 17a keeps the self-closing diaphragm 15 in position on the second movable portion 2b of the body 2, reaching also the seal for the fluid leaks along the contact surface among the first support 17, the second movable portion 2b of the body 2 and the self-closing diaphragm 15;
g) the pin 20 with end 19 and relevant edge 18 for reaching the seal with the surface 16 of the self-closing diaphragm 15;
h) the centering member 29;
i) the first movable diaphragm 28, with the central zone integral with the rigid member 22, and the peripheral zone locked for reaching the seal between the second movable portion 2b of the body 2 and the centering member 29, resting on the first support 17;
j) the chamber 25, delimited by the first support 17, the self-closing diaphragm 15, the end 19, the first centering member 29, the first movable diaphragm 28 and the rigid member 22;
k) the first spring 59 interposed between the first support 17 and the rigid member 22;
l) the gasket 32 acting the seal of the measuring chamber 30.

The chamber 25 is always connected to the environment through the duct 26a, found in the first support 17, the duct 26b1, found in the second movable portion 2b of the body 2, the chamber 63 separating the first fixed portion 2a of the body 2 from the second movable portion 2b and connected to the environment through the duct 26b2, found in the first fixed portion 2a of the body 2, the interspace 61, radially found in the second movable portion 2b of the body 2 for housing the counter spring 3, the duct 26b3, found in the first fixed portion 2a of the body 2 and the duct 26c, found in the envelope 1.

The gasket 32, interposed between the second movable portion 2b of the body 2 and the envelope 1, assures the seal of the measuring chamber 30. The second movable portion 2b of the body 2 axially translates with respect to the first fixed portion 2a of the body 2 and the envelope 1. The envelope 1 axially translates either with respect to the second movable portion 2b of the body 2 and the first fixed portion 2a of the body 2.

In order to assure the hermetic seal of the chamber 9 and prevent fluid leaks it is necessary to reach a seal between the chamber 9 and the chamber 63. The seal between the fixed portion 2a and the movable portion 2b of the body 2 must act in any axial position of the second movable portion 2b of the body 2 in its translation with respect to the first fixed portion 2a.

A cavity 65 found in the fixed portion 2a of the body 2 presents a protuberance 66, integral with the second movable portion 2b of the body 2. A gasket 64 is interposed between the cavity 65 and the protuberance 66 to assure the seal against fluid leaks between the chamber 9 and the chamber 63 through the meatus between the first fixed portion 2a and the second movable portion 2b of the body 2. The gasket 64 is indifferently housed both in the first fixed portion 2a and in the second movable portion 2b of the body 2.

The counter spring 3 is housed in an interspace 61, found between the housing of the gasket 32 which is, in this fifth embodiment, found in the second movable portion 2b of the body 2, and the end 62 of the body 2 which is, in this fifth embodiment, integral with the first fixed portion 2a of the body 2.

In this manner, the interspace 61 regards radial dimensions already partially occupied by the housing of the gasket 32, and otherwise not used. Therefore, it is not necessary to increase the dimensions of the device 100 that keeps also the minimum radial dimension.

The counter spring, interposed between the second movable portion 2b and the first fixed portion 2a of the body 2, acts on the second movable portion 2b with an elastic reaction that pushes it towards a position distal with respect to the first fixed portion 2a. The distal position of the second movable portion 2b with respect to the first fixed portion 2a of the body 2 is defined, when the device 100 is in the non-active condition, by the contact between the end 55 of the rigid member 22 and the second movable diaphragm 31 and by the consequent equilibrium. The equilibrium occurs when the envelope reaches the position distal with respect to the end 4 (that is, in the position where the limit stop 34 of the envelope 1 is in contact with the first fixed portion 2a of the body 2). In this case the push of the counter spring 3 and the reaction of the first spring 59, acting on the rigid member 22, are in equilibrium. The first spring 59 acts against the second spring 60, acting on the first slider 43, the first elastic means 47, acting on the second slider 44, and the second elastic means 48, acting on the third slider 45.

The action of the counter spring 3 on the envelope 1 occurs since the push of the counter spring 3 on the second movable portion 2b of the body 2 is transferred, through the contact with the end 55 of the rigid member 22, to the second movable diaphragm 31. The second movable diaphragm 31, through the three sliders 43, 44, 45 and the relevant counter springs and elastic means 60, 47, 48, transmits the push to the second support 37 and the basis 38, which transmit the same push to the envelope 1.

In such a way, the spring 3 indirectly acts on the envelope 1, by using the possibility of axial translation given to the second movable portion 2b of the body 2, and keeps the envelope 1 in the distal position with respect to the end 4 also in absence of compressed fluid inside the measuring chamber 30.

The contact between the end 55 of the rigid member 22 and the second movable diaphragm 31 remains stable the entire time that the device 100 is in the non-active condition and the contact force can be calibrated by gauging the push of the counter spring 3 when the second movable portion 2b of the body 2 is in the distal position with respect to the first fixed portion 2a.

Figure 24:
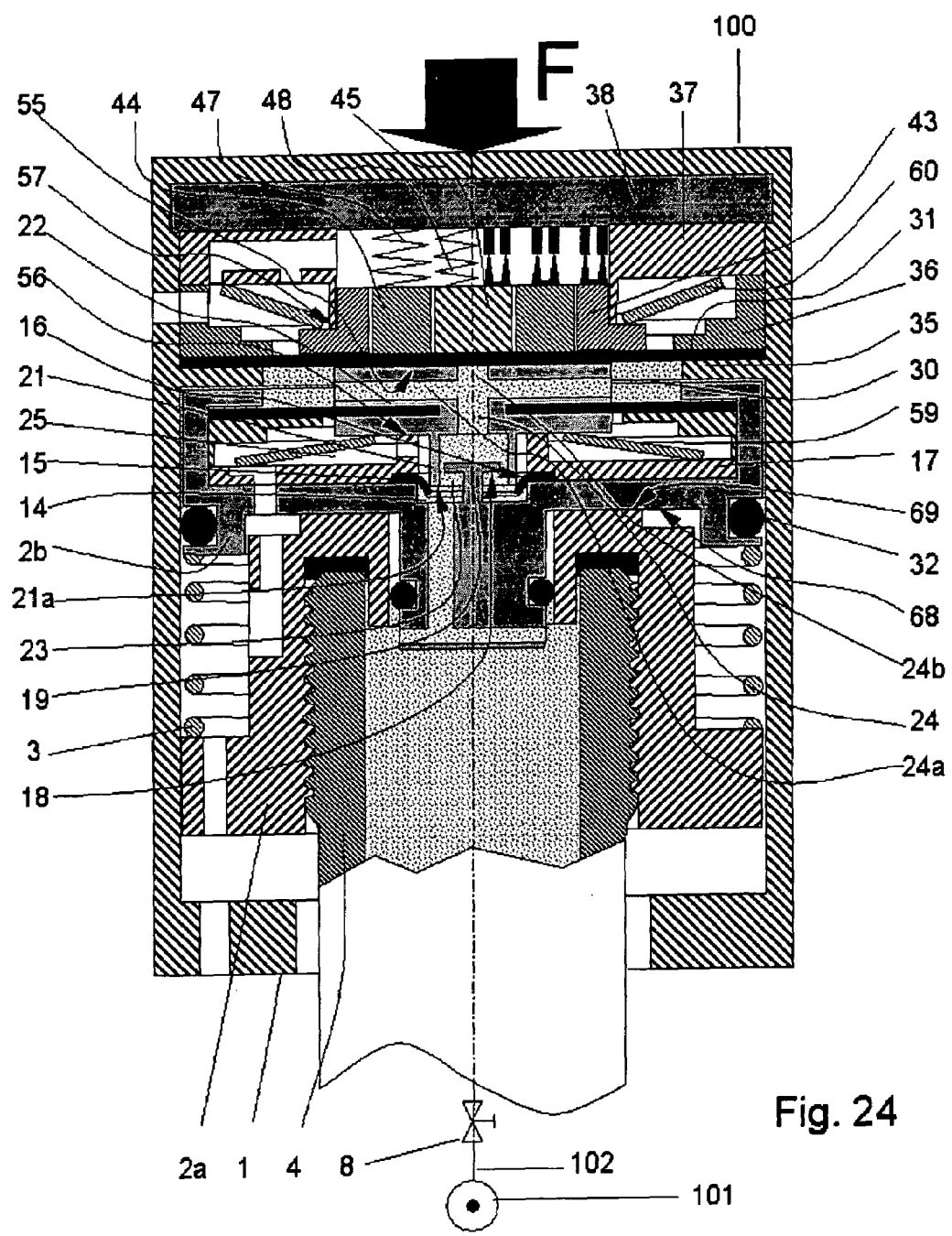
FIG. 24 represents the embodiment of FIG. 23 with the device in the active condition.

FIG. 24 demonstrates that a proximal position of the second movable portion 2b of the body 2 with respect to the first fixed portion 2a is defined by the contact between the wall 68, integral with the second movable portion 2b, and the wall 69, integral with the first fixed portion 2a. The second movable portion 2b is moved towards the position proximal with respect to the first fixed portion 2a during the commutation from the non-active to the active condition.

The external force F acts axially and causes the translation of the envelope 1 from the distal to the proximal position with respect to the end 4. The translation of the envelope 1 causes the translation of the basis 38, the second support 37, the spacer 36, and the group consisting of the three sliders 43, 44, 45, the springs and elastic means 60, 47, 48, the second movable diaphragm 31, and the supporting basis 35, integral with the envelope 1.

The second movable diaphragm 31 transmits the reaction of the springs and elastic means 60, 47, 48 to the end 55 of the rigid member 22, the springs and elastic means 60, 47, 48 being compressed because of the action of the external force F. Said elastic reaction is equilibrated instant for instant by the reaction of the first spring 59, which, in its turn, is transmitted by the first support 17 to the second movable portion 2b of the body 2, and is equilibrated by the reaction of the counter spring 3.

For this reason, the action of the external force F causes the contact between the rigid member 22 and the limit stop 56 located in the second support 37 (this occurs when the external force F reaches the value or the of the elastic reaction acted by the first spring 59 on the rigid member 22, when said rigid member 22 is found in the proximal position with respect to the first support 17). The external force F also causes the contact between the first slider 43 and a limit stop 57 located on the second support 37 (this occurs when the external force F reaches the value or the of the elastic reaction acted by the second spring 60 on the first slider 43, when said slider 43 is found in the proximal position with respect to the second support 37). Finally, the external force F causes the contact between the wall 68, integral with the second movable portion 2b of the body 2, when the second movable portion 2b reaches the position proximal with respect to the first fixed portion 2a. In this position the greatest compression of the counter spring 3 is reached.

The second movable portion 2b of the body 2 keeps the proximal position with respect to the first fixed portion 2a until the device 100 is in the active condition since the push, due to the relative pressure of the fluid contained in the measuring chamber 30, multiplied by the surface of the section perpendicular to the axis of said chamber 30 (equivalent to the section perpendicular to the axis of the movable portion 2b of the body 2 in correspondence with the seal realised by the gasket 32 with respect to the envelope 1) is sufficient to win the reaction of the counter spring 3, until said relative pressure is higher or equal to the second pre-established threshold value Pcs.

Until the second movable portion 2b of the body 2 is found in the proximal position with respect to the first fixed portion 2a, that is until the wall 68, integral with the second movable portion 2b of the body 2, the operating conditions of the device 100 are analogous to those of the device 100 consisting of a single piece, as shown in FIG. 3 and following.

The motion of the rigid member 22 towards the proximal position with respect to the first support 17 during the commutation from first non-active to second active condition, that is while the external force F is active, carries the hollow rod 21, integral with the rigid member 22, in contact with the surface of the self-closing diaphragm 15. The acting push is sufficient to obtain the translation of the surface 16 towards the chamber 14 in order to commute the valve with three ways and two positions.

The contact between the edge 21a of the hollow rod 21 and the surface 16 of the self closing diaphragm 21 effects a seal separating the cavity 23 from the chamber 25, while the translation of the surface 16 towards the chamber 14 causes the interruption of the contact between the surface 16 and the edge 18 of the end 19. In this manner, the seal is avoided and the chamber 14 is connected to the cavity 23.

Therefore, the fluid flows from the chamber 14 to the cavity 23, and form here, to the duct 24. Finally, the fluid crosses the branches 24a and 24b, and fills the measuring chamber 30.

In this configuration, the chamber 14, feeding the valve with three ways and two positions, is connected to the cavity 23, the ducts 24, 24a, 24b, and the measuring chamber 30, all filled with the fluid.

Figure 25:
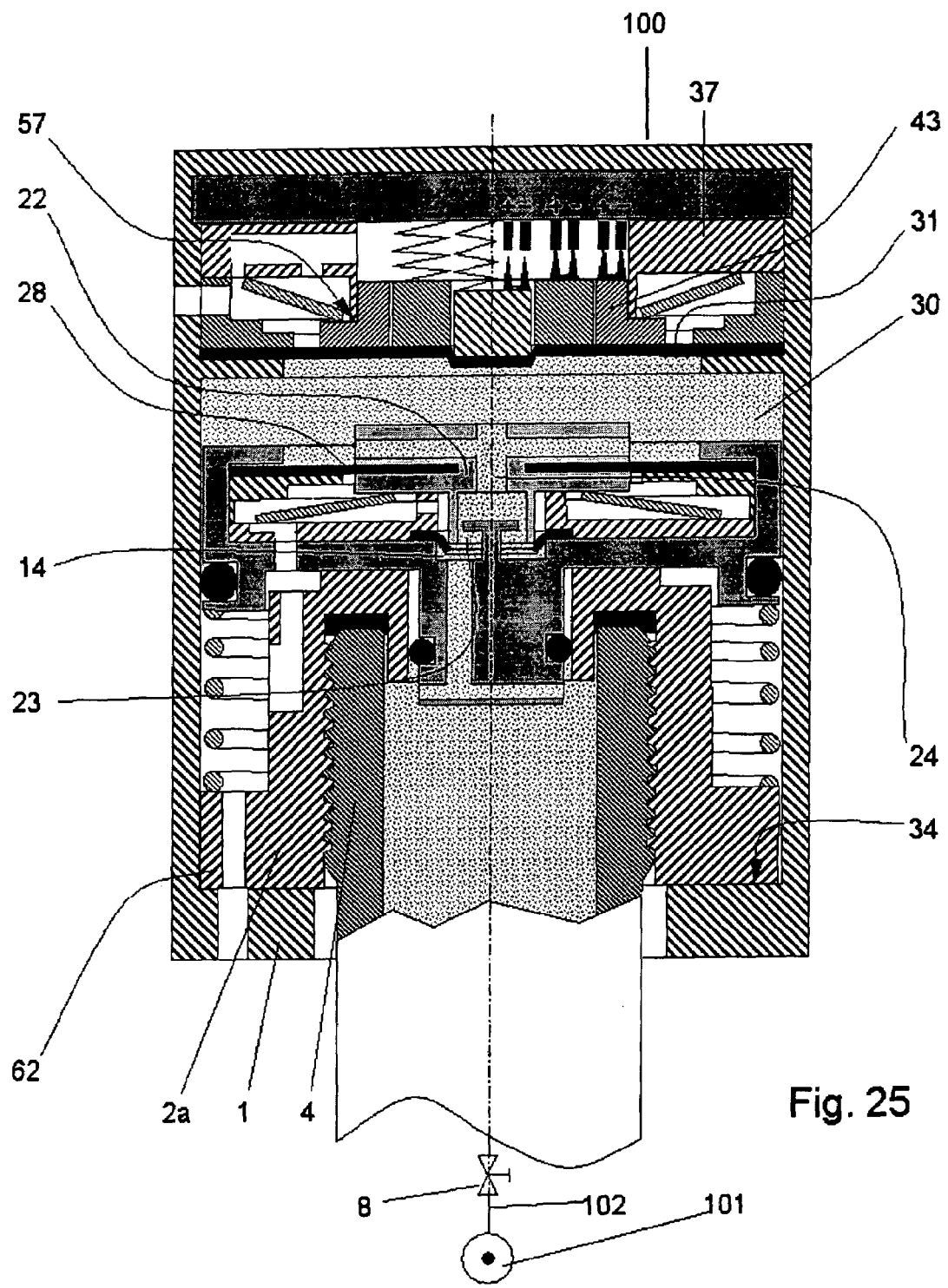
FIG. 25 shows the device of FIGS. 23 and 24 at the end of the commutation phase.

FIG. 25 demonstrates that, at the end of the commutation from the non-active to the active condition, the external action of the force F stops. At the same time, the envelope 1 translates towards the distal position with respect to the end 4, that is in the position where the limit stop 34 of the envelope 1 is in contact with the end 62 of the first fixed portion 2a of the body 2. This translation is due to the resultant thrust of the relative pressure of the fluid in the measuring chamber 30 multiplied by the surface of the section perpendicular to the axis of translation of the measuring chamber 30. This section is equivalent to the section perpendicular to the axis of the movable portion 2b of the body 2 in correspondence with the seal realised by the gasket 32 with respect to the envelope 1.

FIG. 25 shows the configuration of the device according to this preferred embodiment when the envelope 1 reaches the distal position with respect to the end 4 at the end of the commutation from the non-active to the active condition. In this condition the relative pressure of the fluid in the measuring chamber 30 has a value lower than the second pre-established threshold value Pcs, and higher than the third pre-established threshold value Padvi of relative pressure.

During the translation of the envelope 1 towards the distal position with respect to the end 4, the volume of the measuring chamber 30 increases since the movable portion 2b remains in the proximal position with respect to the fixed portion 2a of the body 2, integral with the end 4.

Until the pressure conditions exist according to which the device 100 remains in the active condition, that is until the relative pressure of the fluid in the measuring chamber 30 is higher or equal to the first pre-established threshold value Pci, the valve with three ways and two positions is kept opened by the rigid member 22. A suitable fluid flow rate through the valve with three ways and two positions, from the chamber 14 through the cavity 23 and the channel 24, assures the maintenance of fluid the relative pressure in the measuring chamber 30 during all the phase of translation.

The effect of the relative pressure of the fluid in the measuring chamber 30 on the first movable diaphragm 28 and the second movable diaphragm 31 remains the same one already earlier described. The device 100 is capable of finding and signalling the exceeding of three pre-established threshold values Pcs, Pci and Padvi with the modalities already described.

Figure 26:
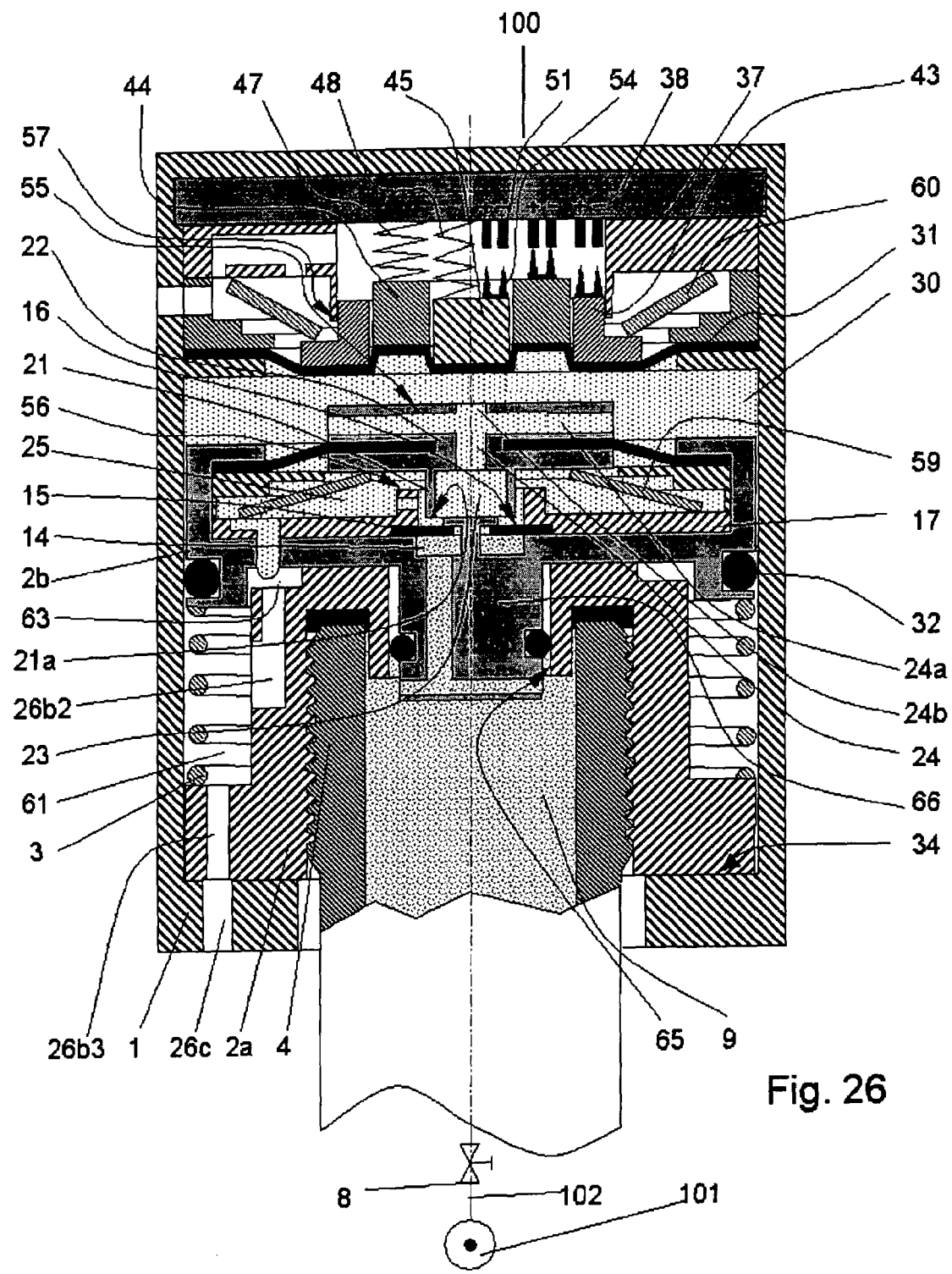
FIG. 26 shows the device of FIGS. 23, 24 and 25 when the relative pressure of the fluid in the measuring chamber is lower than a pre-established threshold value.

FIG. 26 shows how, to assure, in the passage from the active to the non-active condition of the device 100, the free stroke of the rigid member 22 to the proximal to the distal position with respect to the first support 17, under the action of the first spring 59, and the free axial stroke of the sliders 43, 44, 45 from their proximal position to their distal position with respect to the second support 37 and the basis 38, under the action, respectively, of the second spring 60, the first elastic means 47 and the second elastic means 48, it is necessary that, when the conditions of the fluid pressure for the commutation from the active to the non-active condition of the device 100 inside the measuring chamber 30 occur, that is when the relative pressure of the fluid in the measuring chamber 30 decreases under the first pre-established threshold value Pci, also being still the second movable portion 2b in the position proximal with respect to the first fixed portion 2a of the body 2, the end 55 of the rigid member 22 is not in contact with the second movable diaphragm 31, that is the presence of a port between the end 55 and the second movable diaphragm 31 is assured.

This condition assures the free translation of the rigid member 22 towards the distal position with respect to the first support 17, and the consequent closure of the valve with three ways and two positions. The disjunction of the edge 21a of the hollow rod 21 from the surface 16 of the self-closing diaphragm 15 and the consequent opening of the connection of the chamber 25, communicating with the environment, to the measuring chamber 30 through the ducts 24, 24a, 24b and the cavity 23 occur after that the surface 16 of the self-closing diaphragm 15 has gone in contact with the edge 18 of the end 19, interrupting the communication between the chamber 14 and the cavity 23. This assures that the chamber 14 is never connected to the chamber 25 that is with the environment.

In order to assure that this condition occurs, it is necessary to assign a sufficient translation stroke to the second movable portion 2b of the body 2 with respect to the first fixed portion 2a. In FIG. 26, said stroke corresponds to the distance between the end 55 of the rigid member 22 and the second movable diaphragm 31.

When the conditions for commuting the device 100 from the active to the non-active condition, that is when the relative pressure of the fluid in the measuring chamber 30 decreases under of the first pre-established threshold value Pci, said fluid flows towards the environment because of the commutation to the closure of the valve with three ways and two positions, and in particular of the disjunction of the edge 21a of the hollow rod 21 from the surface 16 of the self-closing diaphragm 15 and of the consequent opening of the connection of the chamber 25, communicating with the environment, to the measuring chamber 30 through the ducts 24, 24a, 24b and the cavity 23. Because of the flowing from the measuring chamber 30, the pressure in said chamber 30 decreases until the value of the environmental pressure. When the decreasing relative pressure in the measuring chamber 30 reaches a value lower than that one, which acting on the section perpendicular to the axis of the second movable portion 2b of the body 2 in correspondence of the seal realised by the gasket 32 with respect to the envelope 1, it generates a push equal and contrary to the elastic reaction of the counter spring the 3. Said elastic reaction prevails on the push due to the relative pressure in the measuring chamber 30. Therefore, the second movable portion 2b translates until reaching the distal position with respect to the first fixed portion 2a of the body 2.

For this reason, the device 100 returns in the configuration shown in FIG. 23. The translation of the second movable portion 2b of the body 2, due to the push of the counter spring 3, ends when the second movable portion 2b reaches the distal position, with the envelope 1 in its distal position with respect to the end 4 (that is in the position where the limit stop 34 of the envelope 1 is in contact with the first fixed portion 2a of the body 2) and with the contact between the end 55 of the rigid member 22 and the second diaphragm 31, in conditions of equilibrium between the push of the counter spring 3 and the reaction of the first spring 29, acting on the rigid member 22, in contrast with the second spring 60, acting on the first slider 43, the first elastic means 47, acting on the second slider 44, and the second elastic means 48, acting on the third slider 45.

The first spring 59, the second spring 60 and the second elastic means 48, because of their features and elastic reactions, are responsible of the sending of signals indicating, respectively, the exceeding of the first pre-established threshold Pci, the second pre-established threshold Pcs, and the third pre-established threshold Padvi of relative pressure.

The exceeding of any three thresholds is identified by means of the breach of the equilibrium of the forces acting, respectively, on the rigid member 22, the first slider 43 and the third slider 45.

When the device 100 is in the active condition and the relative pressure of the fluid in the measuring chamber 30 is higher than the first pre-established threshold value Pci, the condition of equilibrium of the self-rigid member 22 corresponds to its proximal position with respect to the first support 17. The self-rigid member 22 is kept constantly in the position proximal with respect to the first support 17 the entire time that the relative pressure of the fluid in the measuring chamber 30 is higher than the first pre-established threshold value Pci. The position proximal to the first support 17 is defined by the contact between the self-rigid member 22 and the limit stop 56 located in the first support 17.

The entire time that the relative pressure of the fluid in the measuring chamber 30 is higher than the first pre-established threshold value Pci, the position of the rigid member 22 with respect to the first support 17 remains constant. Therefore, the entire time that the relative pressure of the fluid in the measuring chamber 30 is higher than the first pre-established threshold value Pci, the compression of the first spring 59 remains constant.

The reaction balancing the push acting on the rigid member 22, due to the action of the relative pressure of the fluid in the measuring chamber 30, multiplied by the active surface of the first movable diaphragm 28, is given by the sum of the reaction of the first spring 59 with the constraint reaction of the limit stop 56 located in the first support 17.

The constraint reaction of the limit stop 56 assumes any value necessary for balancing the difference of positive sign between the push acting on the rigid member 22, due to the action of the relative pressure of the fluid in the measuring chamber 30 multiplied by the active surface of the first movable diaphragm 28 and the reaction of the first spring 59 compressed by the rigid member 22 in the constant position defined by the position proximal with respect to the first support 17.

Therefore, the rigid member 22 is in static equilibrium in its position proximal with respect to the first support 17 the entire time that the relative pressure of the fluid in the measuring chamber 30 is higher than the first pre-established threshold value Pci.

The static equilibrium of the rigid member 22 is interrupted when the relative pressure of the fluid in the measuring chamber 30 decreases until values lower than the first pre-established threshold value Pci. The elastic reaction of the first spring 59 prevails on the push acting on the rigid member 22 because of the pressure in the measuring chamber 30. For this reason the rigid member 22 translates towards the position distal with respect to the first support 17.

If the first spring 59 consists of materials capable of changing the elastic feature in function of the absolute temperature $T_a$, for example bimetallic materials, the elastic reaction of the first spring 59 on the rigid member 22, when the rigid member 22 is found in the position proximal with respect to the first support 17, changes in function of the absolute temperature $T_a$.

The entity of the changing in the elastic reaction with the temperature depends on the kind of material used for realising the first spring 59.

The changing in the elastic reaction of the first spring 59 on the rigid member 22 causes the changing in the value of the first pre-established threshold value Pci in function of the absolute temperature $T_a$. In steady conditions, that is in conditions of thermal equilibrium of the device 100 with respect to the environment, the absolute temperature $T_a$ of the material of the first spring 59 has a value equal to the value of the environmental absolute temperature $T_a$.

When the device is in the active condition and the relative pressure of the fluid the measuring chamber 30 is higher than higher than the third pre-established threshold value Padvi, the condition of equilibrium of the first slider 43 corresponds to its position proximal with respect to the second support 37. The first slider 43 keeps stable in the second position proximal with respect to second support 37 the entire time that the relative pressure of the fluid in the measuring chamber 30 is higher the third pre-established threshold value Padvi. The second position of the first slider 43 proximal with respect to the second support 37 is defined by the contact between the first slider 43 and the limit stop 57 located on the second support 37.

The entire time that the relative pressure of the fluid in the measuring chamber 30 is higher the third pre-established threshold value Padvi, the position of the first slider 43 with respect to the second support 37 remains constant. Therefore, the entire time that the relative pressure of the fluid in the measuring chamber 30 is higher the third pre-established threshold value Padvi, the compression of the second spring 60 remains constant.

The reaction balancing the push acting on the first slider 43, due to the action of the relative pressure of the fluid in the measuring chamber 30 multiplied by the active surface of the second movable diaphragm 31 with respect to the first slider 43, is given by the sum of the elastic reaction of the second spring 60 with the constraint reaction of the limit stop 57 located in the second support 37.

The constraint reaction of the limit stop 57 takes any value necessary for balancing the difference of positive sign between the push acting on the first slider 43. Said difference is due to the action of the relative pressure of the fluid in the measuring chamber 30 multiplied by the active surface of the second movable diaphragm 31 with respect to the first slider 43 and the elastic reaction of the second spring 60. The first slider 43 compresses the spring 60 in the constant position defined by its position proximal with respect to the second support 37.

Therefore, the first slider 43 is in static equilibrium in the position proximal with respect to the second support 37 the entire time that the relative pressure of the fluid in the measuring chamber 30 is higher the third pre-established threshold value Padvi. The elastic reaction of the second spring 60 prevails on the push acting on the first slider 43 because of the pressure of the fluid in the measuring chamber 30. For this reason, the first slider 43 translates towards the position distal with respect to the second support 37.

If the second spring 60 consists of materials capable of changing the elastic feature in function of the absolute temperature $T_a$, for example bimetallic materials, the elastic reaction of the second spring 60 on the first slider 43, when said slider 43 is in the position proximal with respect to the second support 37, changes in function of the absolute temperature $T_a$. The entity of the changing in the elastic reaction with the temperature depends on the kind of material used for the realising the second spring 60. The changing in the elastic reaction of the second spring 60 on the first slider 43 causes the changing in the value of the third pre-established threshold value Padvi of relative pressure in function of the absolute temperature Ta. In steady conditions, that is in conditions of thermal equilibrium of the device 100 with respect to the environment, the absolute temperature Ta of the material of the second spring 60 has a value equal to the value Tea of the environmental absolute temperature.

When the device 100 is in the active condition and the relative pressure of the fluid in the measuring chamber 30 is higher than the second pre-established threshold value Pcs, the condition of equilibrium of the third slider 45 corresponds to its position proximal with respect to the basis 38. The third slider 43 keeps stable in the position proximal with respect to second basis 38 the entire time that the relative pressure of the fluid in the measuring chamber 30 is higher the third pre-established threshold value Pcs.

The position of the third slider 45 proximal with respect to the basis 38 is defined by the contact between the contact 54, connected to the movement of the third slider 45 against the third electric contact 51, to cause the commutation of the third switch consisting of the couple contact 51-contact 54.

For all time that the relative pressure of the fluid in the measuring chamber 30 is higher than the second pre-established threshold value Pcs, the position of the third slider 45 with respect to the basis 38 remains constant. Therefore, for all time that the relative pressure of the fluid in the measuring chamber 30 is higher than the second pre-established threshold value Pcs, also the compression of the second elastic means 48 remains constant.

The reaction balancing the push acting on the third slider 45, due to the action of the relative pressure of the fluid in the measuring chamber 30 multiplied by the active surface of the second movable diaphragm 31 with respect to the third slider 45, is given by the sum of the elastic reaction of the second elastic means 48 with the constraint reaction of the contact between the contact 54 connected to the movement of the third slider 45 against the third electric contact 51 connected to the movement of the basis 38. The constraint reaction of the contact between the contact 54 connected to the movement of the third slider 45 against the third electric contact connected to the movement of the basis 38 assumes any value necessary for balancing the difference of positive sign between the push acting on the third slider 45, due to the action of the relative pressure of the fluid in the measuring chamber 30 multiplied by the active surface of the second movable diaphragm 31 with respect to the third slider 45, and the elastic reaction of the second elastic means 48 compressed by the third slider 45 in the constant position defined by its position proximal with respect to the basis 38.

Therefore, the third slider 45 is in static equilibrium in its position proximal with respect to the basis 38 for all time that the relative pressure of the fluid in the measuring chamber 30 higher than the second pre-established threshold value Pcs.

The static equilibrium of the third slider 45 is interrupted when the relative pressure of the fluid in the measuring chamber 30 decrease under values lower than the second pre-established threshold value Pcs. The elastic reaction of the second elastic means 48 prevails on the push acting on the third slider 45 because of the pressure of the fluid in the measuring chamber 30, and the third slider 45 translates towards its first position distal with respect to the basis 38.

If the second elastic means 48 consists of materials capable of changing its elastic feature in function of the absolute temperature Ta, for example bimetallic materials, the elastic reaction of the second elastic means 48 on the third slider 45, when said slider 45 is in the position proximal with respect to the basis 38, changes in function of the absolute temperature $T_a$. The entity of the changing in the elastic reaction with the temperature depends on the kind of material used for the realising the second elastic means 48.

The changing of the elastic reaction of the second elastic means 48 on the third slider 45 causes the changing of the value of the second pre-established threshold Pcs of relative pressure in function of the absolute temperature $T_a$. In steady conditions, that is in conditions of thermal equilibrium of the device 100 with respect to the environment, the absolute temperature Ta of the material of the second elastic means 48 has a value equal to the value Tea of the environmental absolute temperature.

In the configuration of FIG. 23 that the device 100 reaches because of the passage from the active to the non-active condition, the end 55 of the rigid member 22 is always in contact with the second movable diaphragm 31, and the force acting on the contact is equal to the elastic reaction of the counter spring 3 on the second movable portion 2b of the body 2, when the second portion 2b is in its position distal with respect to the first fixed portion 2a.

In this condition, the elastic reaction of the counter spring 3 is in equilibrium, furthermore, also with the elastic reaction of the first spring 59, which is compressed. As a result, the rigid member 22 is found in a position intermediate between its distal position and its position proximal with respect to the first support 17.

According to the elastic features of the springs 3, 59, the intermediate position reached by the rigid member 22 allows the edge 21a of the hollow rod 21 to contact the surface 16 of the self-closing diaphragm 15 also on the non-active condition, by causing the commutation into opening of the valve with three ways and two positions.

However, because of the above disclosed reason, that is during the commutation of the valve with three ways and two positions from the first condition (FIG. 8b) to the second condition (FIG. 9b) the contact between the edge 21a of the hollow rod 21 and the surface 16 of the self-closing diaphragm 15 reaches the hermetic seal, separating the cavity 23 with respect to the chamber 25, before the translation of the surface 16 towards the chamber 14 causes the interruption of the contact between the surface 16 and the edge 18 of the end 19 connecting the chamber 14 to the cavity 23, and at the same way, during the commutation of the valve from the second condition (FIG. 9b) to the first condition (FIG. 8b) the hermetic seal separating the cavity 23 with respect to the chamber 25 obtained by contacting the edge 21a of the hollow rod 21 with the surface 16 of the self-closing diaphragm stops only after the restore of the contact and the seal between the surface 16 and the edge 18 of the end 19, it is impossible the direct connection of the chamber 14 (communicating with the chamber 9) to the chamber 25 (communicating with the external environment).

So doing the feature of the device 100 of the autonomous closure of the chamber 9 is assured and, therefore, of the room 101 containing the fluid, with respect to the external environment also in the fifth embodiment of the device 100 suitable for minimising the axial and radial dimensions by sharing the body 2 in two parts.

Figure 27:
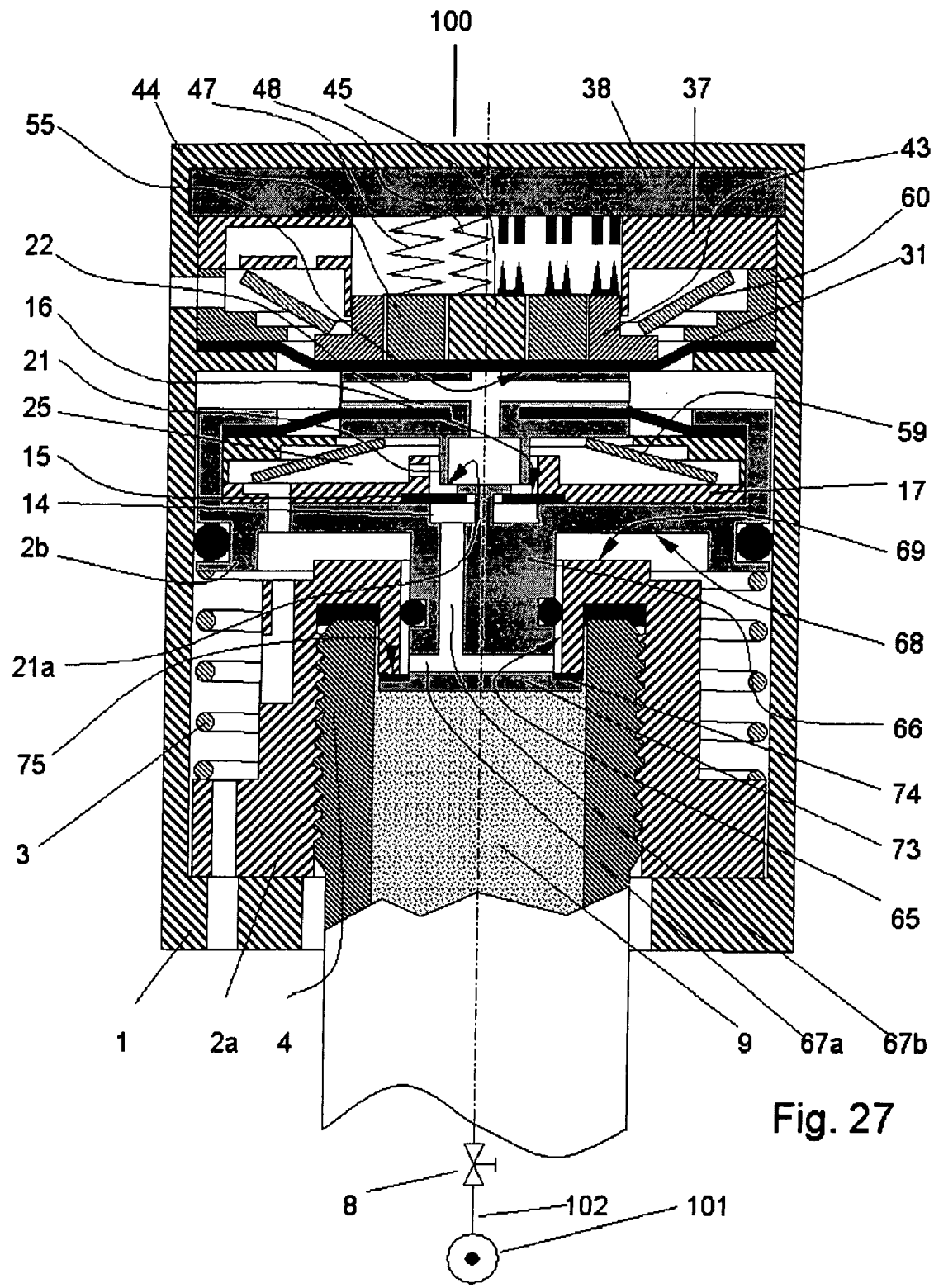
FIG. 27 represents a sixth embodiment of the device in the non-active condition.

In the sixth embodiment, coming from the fifth embodiment shown in FIG. 27, a flange 73 is realised at the end of the protuberance 66, integral with the second movable portion 2b of the body 2. A gasket 74 is interposed between the flange 73 and the end 75, integral with the fixed portion 2a of the body 2 (used as housing of the cavity 65 in which the protuberance 66 axially translates). The gasket 74 generates a seal between the flange 73 and the end 75.

In this embodiment, the distal position of the second movable portion 2b with respect to the first fixed portion 2a of the body 2 is defined by the limit stop of the flange 73, through the gasket 74, against the end 75.

The axial translation stroke of the second movable portion 2b with respect to the first fixed portion 2a of the body 2 is delimited by the axial extension of the meatus located between the wall 68, integral with the second movable portion 2b, and the wall 69, integral with the first fixed portion 2a. Both ends of the stroke are defined in the distal position by the contact between the flange 73 with the wall 68 and the wall 69.

When the device 100 is in the non-active condition, the reaction of the counter spring 3 partially discharges on the contact between the gasket 74, pushed by the flange 73, and the end 75. The resting reaction of the counter spring 3, discharges again, through the spring 59, the rigid member 22, the second movable diaphragm 31, the sliders 43, 44 and 45, the springs and elastic means 60, 47 and 48, the second support 37 and the basis 38 on the envelope 1 for maintaining said envelope 1 in its position distal with respect to the end 4.

The portion of the reaction of the counter spring 3, partially discharging on the contact between the gasket 74 and the end 75, causes the hermetic seal of the chamber 9. This condition stops the connection of the chamber 14 feeding the valve with three ways and two positions and the chamber 9, since the ducts 67a, 67b are located at the opposite side of the gasket 74 with respect to the flange 73.

Therefore, when the device 100 is in the non-active condition and the second movable portion 2b of the body 2 has reached its position distal with respect to the first movable portion 2a, any fluid leak from the chamber 9 towards the external environment is prevented by the gasket 74 between the flange 73 and the end 75. The gasket 74 is a self-closing seal.

This solution, disclosing a new hermetic seal between the chamber 9 (connected to the room 101 containing the fluid to be surveyed) and the external environment, increases the safety level of the autonomous closure feature offered by the device 100 in the fifth embodiment, used for minimising the axial and radial dimensions by sharing the body 2 in two parts.

Figure 28:
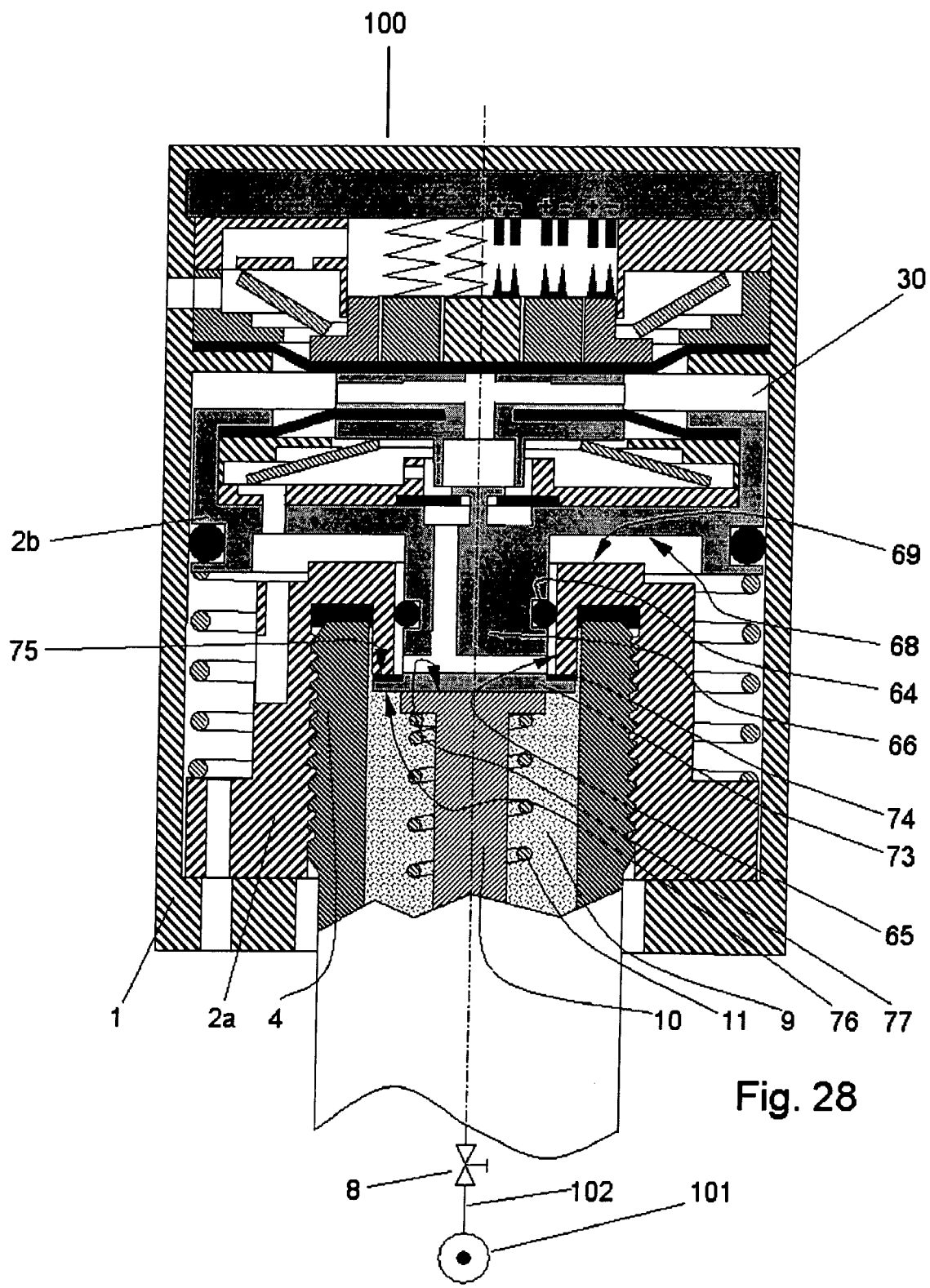
FIG. 28 shows the device of FIG. 27 at the end of the translation of a movable portion.

In FIG. 28 the device 100 is applied to a end 4 fitted with a self-closing valve, as shown in FIG. 7 in case a device 100 with a body 2 of just one portion. The spring 11 of the self-closing valve 131 moves the rod 10 towards its position distal with respect to the room 101 containing the fluid.

In order to reach the commutation of the device 100 from the non-active to the active condition, it is necessary that the chamber 9 is connected to the room 101 containing the fluid. Therefore, it is necessary that the self-closing valve 131 is open.

In order to open the self-closing valve 131 it is necessary to act on the rod 10 with a push F sufficient to axially translate said rod 10 until a position proximal with respect to the room 101 containing the fluid; in this position the self-closing valve 131 is open and connects the chamber 9 to the room 101 containing the fluid.

The self-closing valve 131 has to be kept open for, at least, all the period the device 100, installed on the end 4, is in the active condition (this condition where disclosed in FIG. 7 with regard to the protuberance 12) since, without this condition, the connection of the chamber 9 to the room 101 containing the fluid and, consequently, the relative pressure of the fluid in the measuring chamber 30, it is no more the same existing in the room 101 containing the fluid.

In order to reach this result it is necessary to assure, also in the preferred embodiment providing the sharing of the body 2 in two parts (a first fixed portion 2a for fixing the device 100 on the end 4 and a second movable portion 2b free to axially translate either with respect to the first fixed portion 2a and with respect to the envelope 1), the presence of an apparatus analogous to the protuberance 12 of the FIG. 7. This apparatus causes the translation of the rod 10 towards the position proximal with respect to the room 101 containing the fluid, by contrasting the reaction of the spring 11, when the device 100 is installed on the end 4 or, at least, from the beginning of the commutation process from the non-active to the active condition and for all the period when the device 100 is in the active condition.

When the device 100 is in the active condition, the second movable portion 2b is in the position proximal with respect to the first fixed portion 2a of the body 2, with the wall 68 integral with the second movable portion 2b in contact with the wall 69 integral with the first fixed portion 2a of the body 2. In said condition, the behaviour of the device 100 is the same of the one occurring when the body 2 consists of just one portion.

The protuberance 66 integral with the second movable portion 2b of the body 2, has an axial length sufficient to assure at least the closure of the chamber 9 with respect to the chamber 63 for any axial position of the second movable portion 2b of the body 2 during its relative motion with respect to the first fixed portion 2a, by causing the seal with respect to the cavity 65 by means of the gasket 64.

The axial length of the protuberance 66 is chosen to assure the end 76 of the protuberance 66 acts on the end 77 of the rod 10 and keeps it in the position proximal with respect to the room 101 containing the fluid, at least when the device 100 is in the active condition.

If the axial length of the chamber 66, according to the axial position of the end 77 of the rod 10 in the position distal with respect to the room 101 containing the fluid is such that, when the device 100 is applied on the end 4 and is in the non-active condition, the end 76 of the protuberance 66 is in contact with the end 77 of the rod 10 to maintain the rod 10 in the position proximal with respect to the room 101, the chamber 9 is connected to the room 101, that is the self-closing valve 131 is open, for all the period the device 100 is applied to the end 4.

Figure 29:
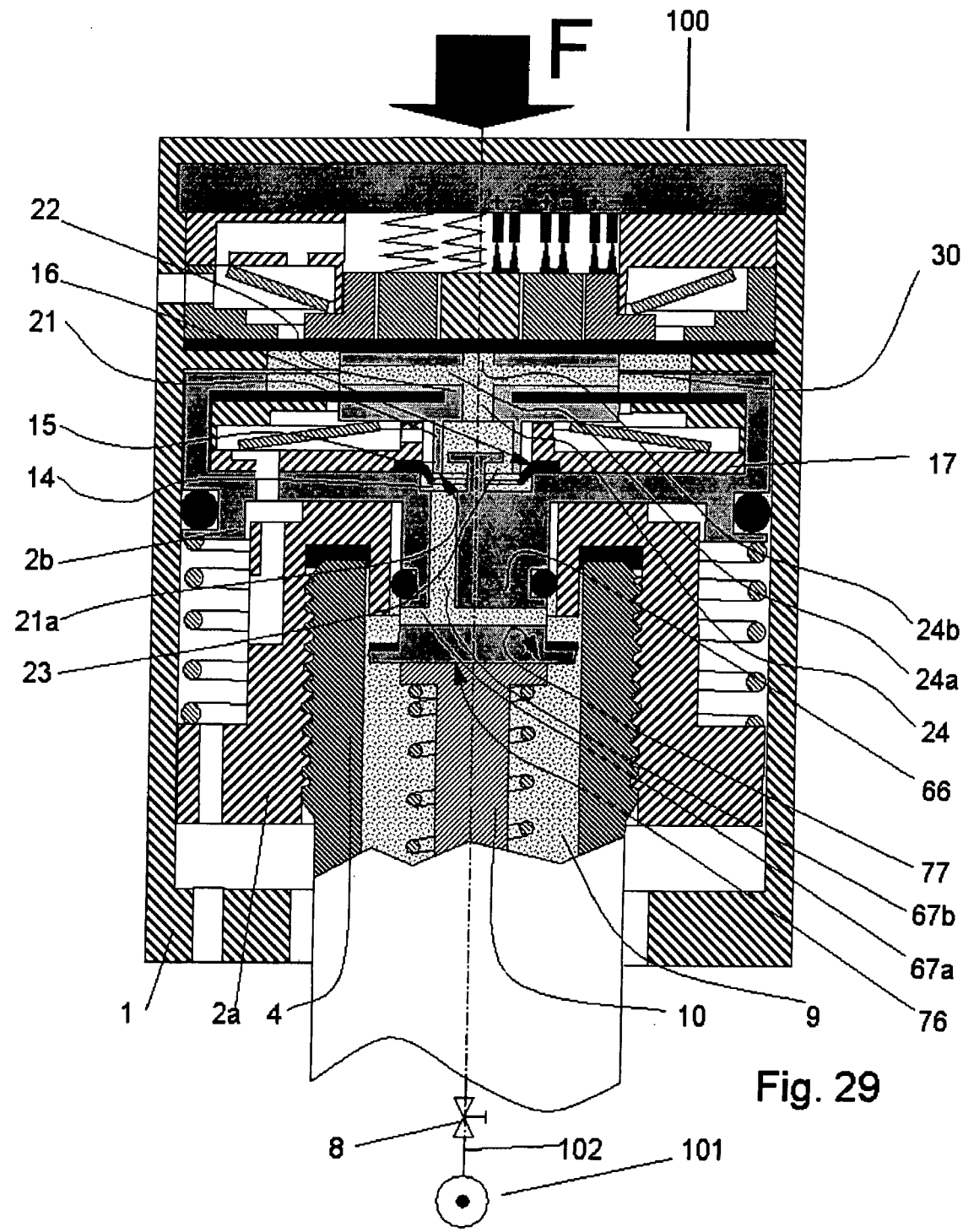
FIG. 29 illustrates an embodiment suitable to apply the device in the non-active condition to an end of an inflation valve.

Also in the embodiment of FIG. 29, suitable for applying the device 100 to a end 4 fitted with a self-closing valve 131, the commutation from the non-active to the active condition, as well as the functioning and commutation from the active to the non-active condition occur according to the above mentioned modalities.

The commutation from the non-active to the active condition is reached by applying an external force F to the envelope 1. This force F causes the translation of the envelope 1 from the distal position to the position proximal with respect to the end 4, and the translation of the second movable portion 2b from the distal position to the position proximal with respect to the first fixed portion 2a of the body 2. Moreover, the external force F causes the translation of the rigid member 22 from the distal position to the position proximal with respect to the first support 17.

The result is the commutation towards the opening of the valve with three ways and two positions due to the contact between the edge 21a of the hollow rod 21 and the surface 16 of the self-closing diaphragm 15. The chamber 14 is connected to the cavity 23 and, through the ducts 24, 24a and 24b, to the measuring chamber 30.

If, when the device 100 is installed on the end 4 fitted with the inflation valve (therefore, also before the application of the external force F to the envelope 1 to realise the commutation from the non-active to the active condition), the axial length of the chamber 66 according to the axial position of the end 77 of the rod 10 in the position distal with respect to the room 101, is such that the end 76 of the protuberance 66 is in contact with the end 77 of the rod 10 and keeps the rod 10 in the position proximal with respect to the room 101, the self-closing valve 131 is always open, and the chamber 9 is connected to the room 101, when the device 100 is installed on the end 4.

The translation of the second movable portion 2b from the distal position to the position proximal with respect to the first fixed portion 2a of the body 2, due to the application of the external force F, causes the subsequent translation of the rod 10 in a position proximal with respect to the room 101.

The self-closing valve 131 is always open and keeps the connection between the chamber 9 and the room 101. The fluid reaches the chamber 14 from the chamber 9 through the ducts 67a, 67b located in the protuberance 66, and from the chamber 14 reaches the measuring chamber 30.

Figure 30:
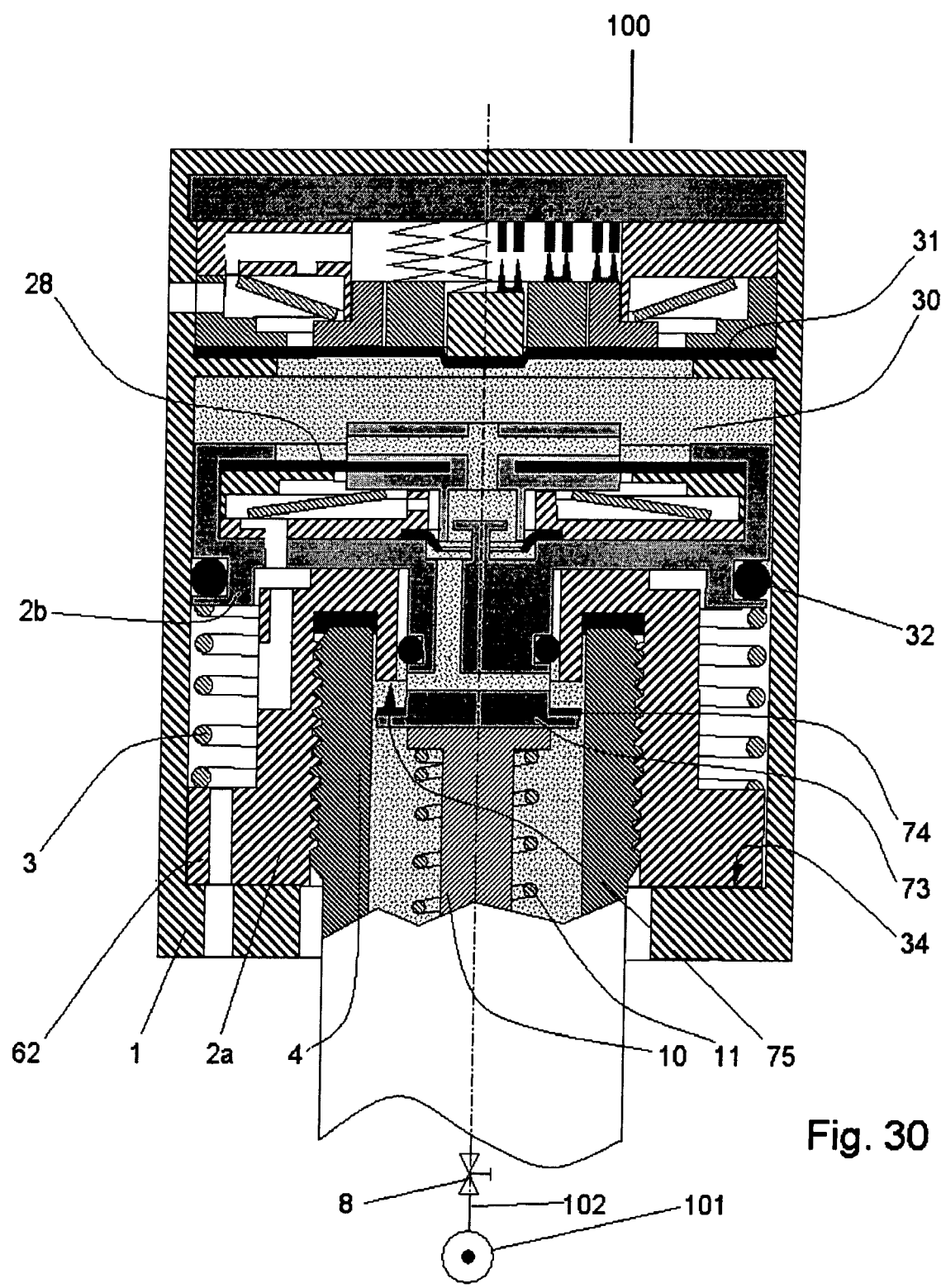
FIG. 30 illustrates the embodiment of FIG. 29 with the device in the active condition.

At the end of the filling of the measuring chamber 30 by the fluid, when the external force F is released, the envelope 1 translates towards its position distal with respect to the end 4 (that is in the position where the limit stop 34 of the envelope 1 is in contact with the end 62 of the fixed portion 2a of the body 2) under the action of the resulting trust of the relative pressure of the fluid in the measuring chamber 30 multiplied by the surface of the section of the measuring chamber 30 perpendicular to the translation axis. FIG. 30 shows the configuration of the device 100 according to this embodiment, when the envelope 1 has reached the position distal with respect to the end 4, and the relative pressure of the fluid in the measuring chamber 30 has a value lower than the second pre-established threshold value Pcs and higher than the third pre-established threshold value Padvi.

The effect of the relative pressure of the fluid in the measuring chamber 30 on the first movable diaphragm 28 and on the second movable diaphragm 31 is the same one as previously disclosed, and the device 100 is capable of detecting and signalling the exceeding of three pre-established thresholds values Pcs, Pci and Padvi according to the above mentioned modalities.

Until the relative pressure of the fluid in the measuring chamber 30 is higher or equal to the first pre-established threshold value Pci, that is until the device 100 is in the active condition, the second movable portion 2b is in the position proximal with respect to the first fixed portion 2a of the body 2 under the action of the force due to the relative pressure of the fluid in the measuring chamber 30 multiplied by the surface of the section of the measuring chamber 30 perpendicular to the translation axis. This surface corresponds to the sealing section of the gasket 32. Said force, due to the relative pressure of the fluid in the measuring chamber 30, prevails on the total reaction given by the sum of the reactions of the counter spring 3 and the spring 11.

Therefore, until the device 100 is in the active condition, the rod 10 of the self-closing valve 131 is in the position proximal with respect to the room 101 and the self-closing valve 131 is open.

When the relative pressure of the fluid in the measuring chamber 30 is lower than the first pre-established threshold value Pci, that is when the device 100 passes from the active to the non-active condition, the valve with three ways and two positions commutes the closure configuration and the measuring chamber 30 is connected to the external environment, as above described. The flow of the fluid from the measuring chamber 30 towards the external environment causes the decreasing of the relative pressure in the measuring chamber 30 until the force due to the relative pressure multiplied by the surface of the section of the measuring chamber 30 perpendicular to the translation axis is no more capable of contrasting the total reaction of the counter spring 3 and the spring 11.

The second movable portion 2b of the body 2 translates towards the position distal with respect to the first fixed portion 2a because of the reaction of the counter spring 3 and the spring 11. At the end of the translation of the second movable portion 2b of the body 2 the configuration reached by the device 100 is shown in FIG. 28. Any fluid leak from the housing is prevented by the closure of the gasket 74 between the flange 73 and the end 75.

Figure 31:
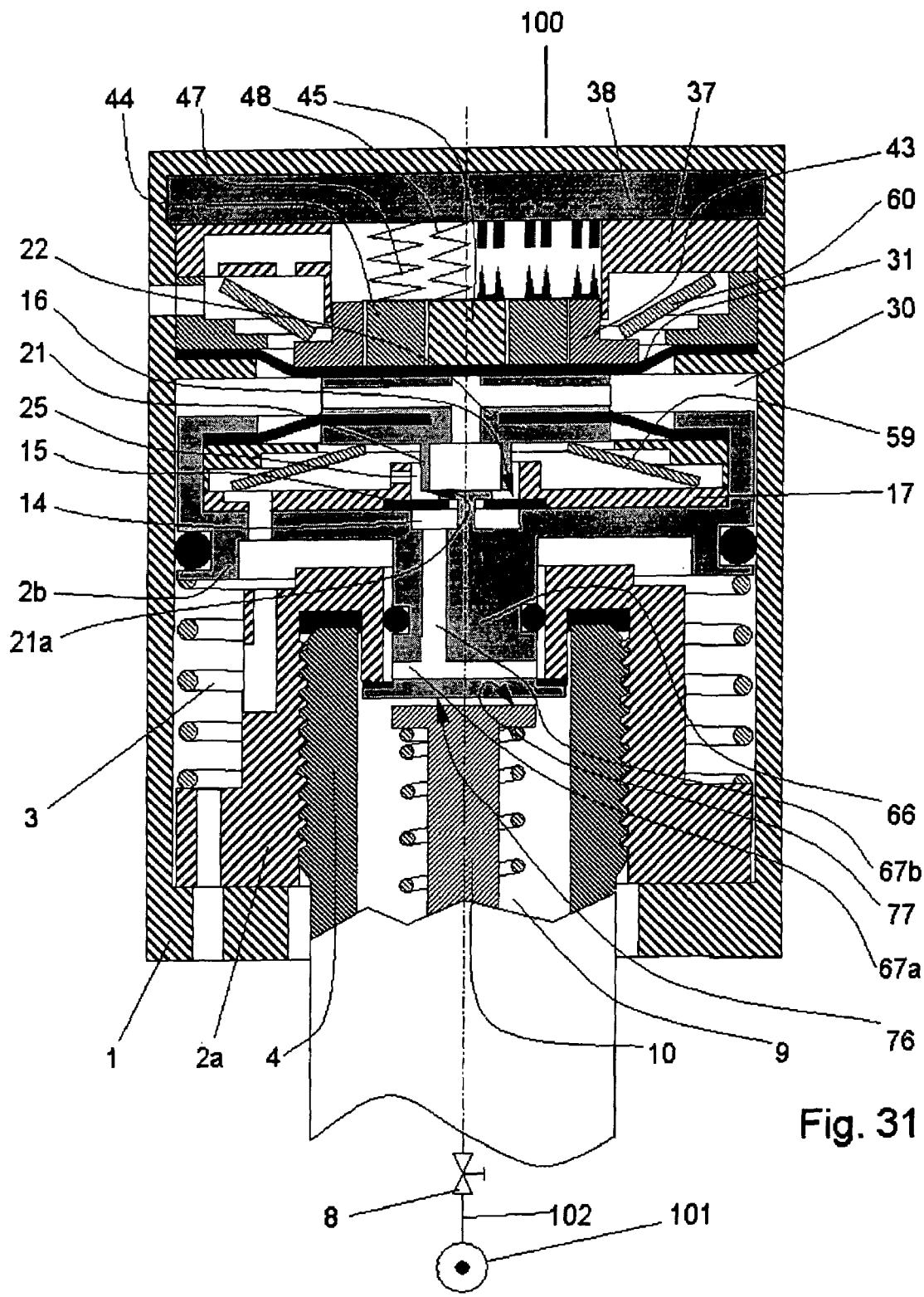
FIG. 31 demonstrates that, when the device is mounted on the end and is in the non-active condition, the end of a protuberance is not in contact with the end of the rod of the inflation valve.

Because of the different morphologies of the inflation valves and the form tolerances preventing the right relative positioning of the end 77 of the rod 10 with respect to the end 76 of the protuberance 66, when the device 100 is installed on the end 4 and is in the non-active condition, the end 76 of the protuberance 66 does not touch the end 77 of the rod 10 (FIG. 31).

When the device 100 in the non-active condition and the second movable portion 2b is in the position distal with respect to the first fixed portion 2a of the body 2, the end 76 of the protuberance 66 is not in contact with the end 77 of the rod 10, wherein the rod 10 is in the position distal with respect to the room 101, the self-closing valve 131 is closed and the connection of the chamber to the room 101 is interrupted.

This configuration of the rod 10 causes the same effect of the tap 8 in closing position and prevents any fluid leak independently from the condition of the valve with three ways and two positions (in particular independently from the possible contact between the edge 21a of the hollow rod 21 and the surface 16 of the self-closing diaphragm 15) because of the push of the counter spring 3 on the second movable portion 2b of the body 2 and, consequently, on the rigid member 22, the first spring 59 through the reaction of the second movable diaphragm 31, of the three sliders 43, 44, 45, the springs and elastic means 60, 47, 48, the second support 37, the basis 38 and the envelope 1.

For the commutation of the device 100 from the non-active to the active condition, it is necessary that the chamber 9 is connected to the room 101, which is it is necessary that the self-closing valve 131 is open. The self-closing valve 131 must be open in the moment where the commutation from the non-active to the active condition occurs. The self-closing valve 131 must remain open at least for all time that the device 100 is in the active condition, since, if this situation does not exist, the connection between the chamber 9 and the room 101, consequently, the relative pressure of the fluid in the measuring chamber 30 is non the same of the room 101.

To open the self-closing valve 131 it is necessary to act on the rod 10 with a push F, sufficient to axially translate the rod 10 until a position proximal with respect to the room 101. In this position the self-closing valve 131 is open and connects the chamber 9 to the room 101.

Figure 32:
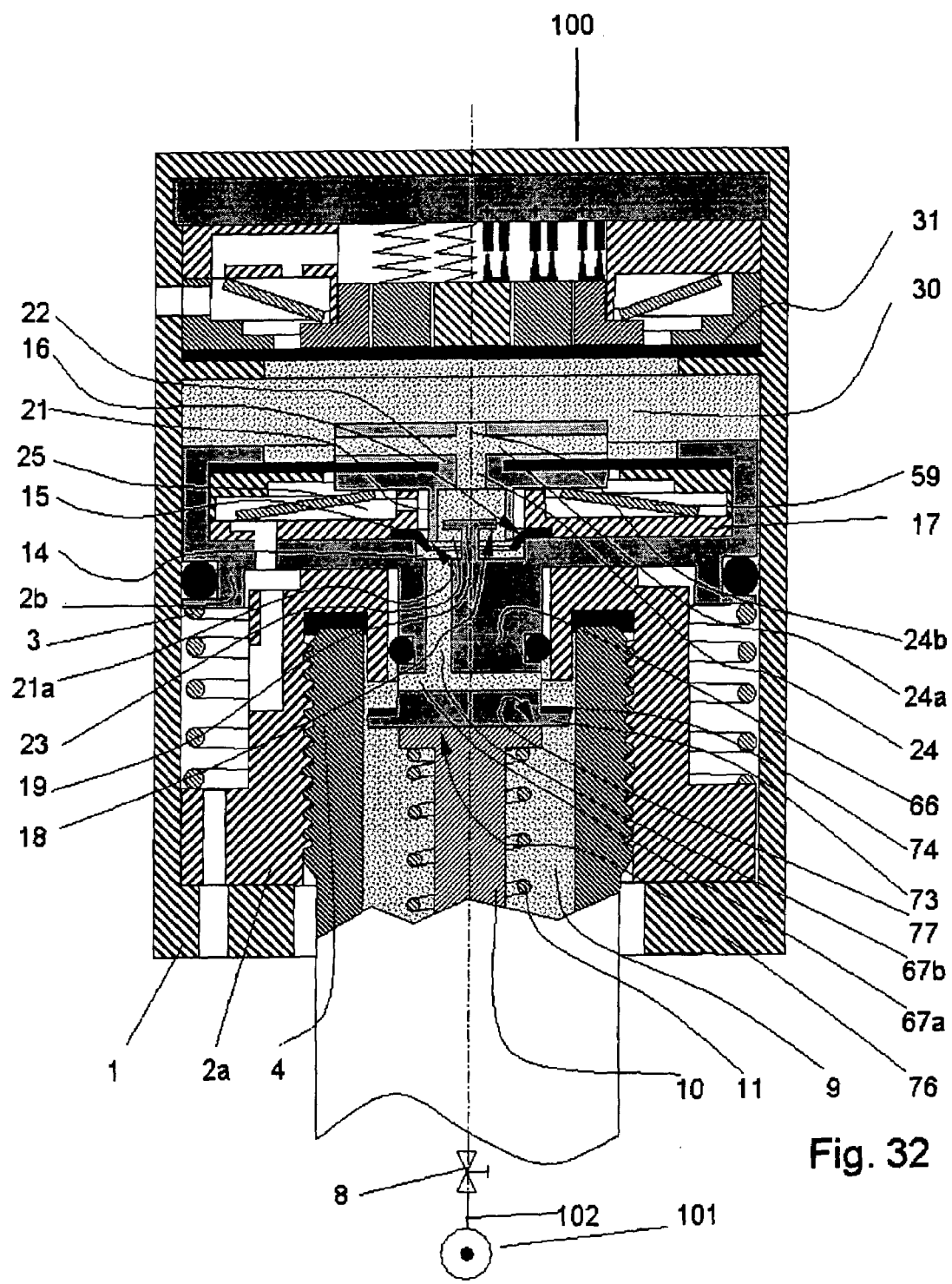
FIG. 32 explains how the commutation of the device of FIGS. 29 and 30 from the non-active to the active condition occurs.

FIG. 32 discloses the commutation of the device 100 from the non-active to the active condition. The commutation occurs by means of the external force F acting on the envelope 1. The force F causes the translation of the envelope 1 from the distal position to the position proximal with respect to the end 4 and the translation of the second movable portion 2b from the distal position to the position proximal with respect to the first fixed portion 2a of the body 2.

The application of the external force F causes also the translation of the rigid member 22 from the distal position to the position proximal with respect to the first support 17. The consequence of this application is the commutation in aperture of the valve with three ways and two positions due to the contact between the edge 21a of the hollow rod 21 and the surface 16 of the self-closing diaphragm 15. The chamber 14 is connected to the hollow 9 and, through the ducts 24, 24a, 24b, to the measuring chamber 30.

The translation of the second movable portion 2b from the distal position to the position proximal with respect to the foxed portion 2a of the body 2, due to the application of the external force F, causes at first the contact between the end 76 of the protuberance 66 and the end 77 of the rod 10, and subsequently the translation of the rod 10 towards the position proximal with respect to the room 101. In this way the opening of the self-closing valve 131 and the connection of the chamber 9 to the room 101 are obtained.

The fluid reaches the chamber 14 from the chamber 9 thorough the ducts 67a, 67b in the protuberance 66. The rigid member 22 is found in the position proximal with respect to the first support 17. The contact between the edge 21a of the hollow rod 21 of the self-closing diaphragm 15 separates the cavity 23 from the chamber 25, and causes and causes the translation of the surface 16 towards the chamber 14, by interrupting the contact between the surface 16 and the edge 18 of the end 19, and connecting the chamber 14 to the cavity 23. The fluid flows back from the chamber 14 to the cavity 23, and from here, to the ducts 24, 24a, 24b, until reaching the measuring chamber 30.

This configuration is kept until the device 100 is in the active condition.

When the relative pressure of the fluid in the measuring chamber 30 reaches a value lower than a first threshold value Pci, that is when the device 100 passes from the active to non-active condition, the valve with three ways and two position commutes in the closure configuration. The measuring chamber 30 is connected to the external environment, as above described. The fluid flow form the measuring chamber 30 towards the external environment causes a decreasing of the relative pressure in the measuring chamber 30, until the force due to the same relative pressure multiplied by the surface of the section of the measuring chamber 30 perpendicular to the axis of translation is not more capable of contrasting the total reaction of the counter spring 3 and the spring 11.

The second movable portion 2b translates towards the position distal with respect to the first fixed portion 2a of the body 2, under the reaction of the counter spring 3. The reaction of the spring 11 adds to the reaction of the counter spring 3, easing the translation of the second movable portion 2b, until the end 76 of the protuberance 66 is in contact with the end 77 of the rod 10.

When the contact between the end 76 of the protuberance 66 and the end 77 of the rod 10 ends, the self-closing valve 131 is closed. At the end of the translation of the second movable portion 2b of the body 2, the configuration reached by the device 100 is shown in FIG. 3.

The rigid member 22 is always in contact with the second movable diaphragm 31, and the force due to the contact is equal to the reaction of the counter spring 3 on the second movable portion 2b when said portion is found in the position distal with respect to the first fixed portion 2a of the body 2.

In this condition, the reaction of the counter spring 3 is in equilibrium, among other things, also with the reaction of the first spring 59, which is compressed. For this reason, the rigid member 22 is in a position intermediate between the position distal and the position proximal with respect to the first support 17.

According to the elastic features of the springs 3 and 59, the intermediate position reached by the rigid member 22 could be so chosen that the edge 21a of the hollow rod 21 comes in contact with the surface 16 of the self-closing diaphragm 15 also in the non-active condition, by causing the commutation in aperture of the valve with three ways and two positions.

However, thanks to the fact already disclosed that, during the commutation of the valve with three ways and two positions from the first (FIG. 8b) to the second condition (FIG. 9b), the contact between the edge 21a of the hollow rod 21 and the surface 16 of the self-closing diaphragm 15 realizes the hermetic seal, separating the cavity 23 from the chamber 25, before the translation of the surface 16 towards the chamber 14 causes the interruption of the contact between the surface 16 and the edge 18 of the end 19, connecting the chamber 14 to the cavity 23. In an analogous way, during the commutation of the valve from the second condition (FIG. 9b) to the first condition (FIG. 8b) the hermetic seal, separating the cavity 23 with respect to the chamber 25 due to the contact between the edge 21a of the hollow rod 21 and the surface 16 of the self-closing 15 diaphragm interrupts only after the new contact and seal between the surface 16 and the edge 18 of the end 19, does exits the possibility of a direct connection between the chamber 14 (connected to the chamber 9) and the chamber 25 (connected to the external environment).

All that assures the maintenance of the feature of the device 100 consisting in the autonomous closure of the chamber 9 and, therefore, of the room 101 with respect to the external environment, also in the fifth embodiment of the device 100, finalised to the maximum reduction of the axial and radial dimensions with resolution of the body 2 in two parts.

Figure 33:
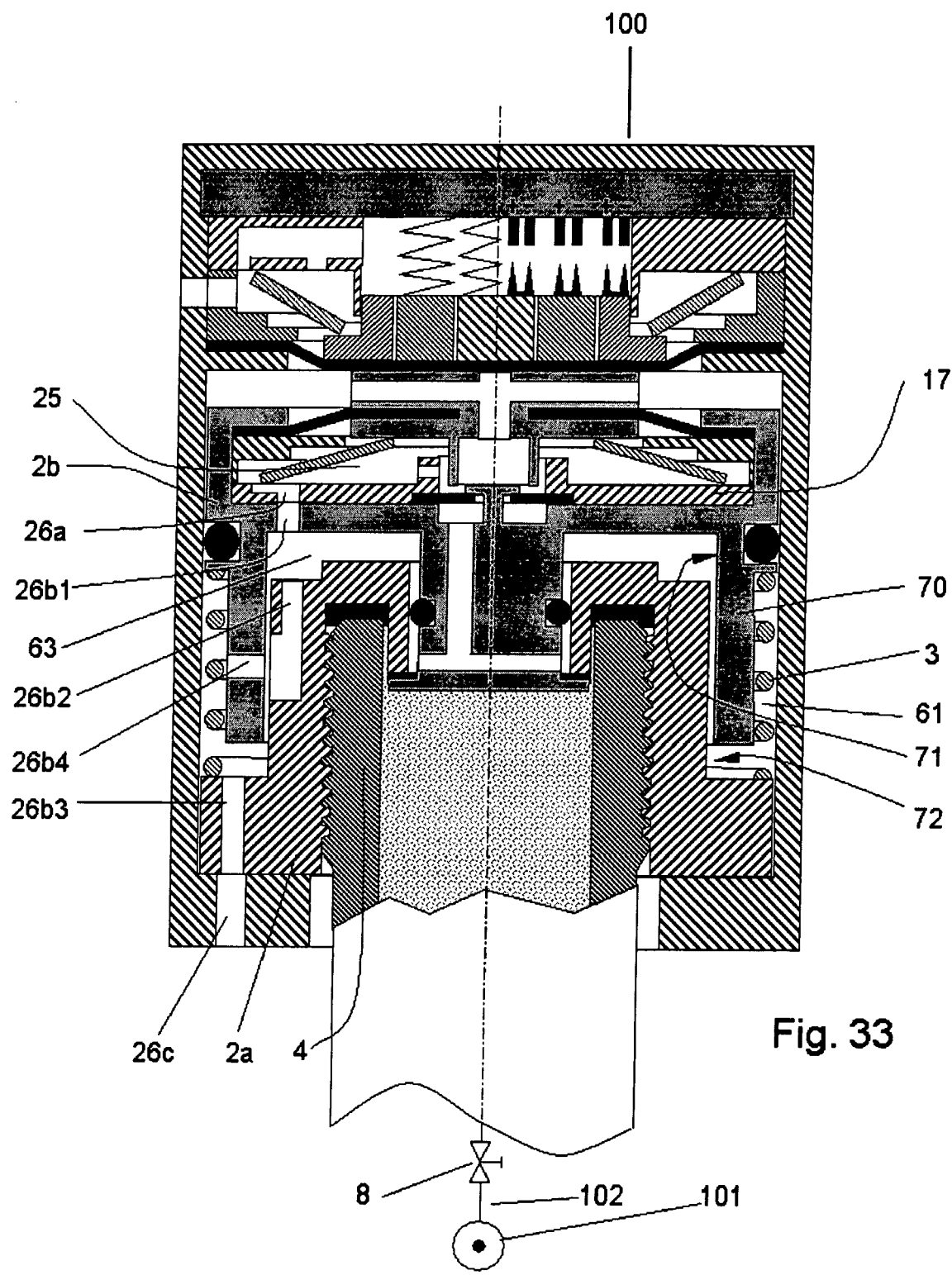
FIG. 33 illustrates a seventh embodiment of the device.

This configuration obtains the same functional effect also if it is realised without the flange 73 and the gasket 74 at the end of the protuberance 66, since, when the device 100 is in the non-active condition, the self-closing valve 131 is in the closing position. FIG. 33 illustrates a further embodiment of the second movable portion 2b of the body 2, providing the realisation of a hollow sleeve 70 integral with the second movable portion 2b of the body 2. The internal wall 71 of the hollow sleeve 70 slides axially with respect to the peripheral wall 72 of the first fixed portion 2a of the body 2. By means of a sufficiently accurate connection between the internal wall 71 and the peripheral wall 72, the hollow sleeve 70 forms a guide for the second movable portion 2b in its motion with respect to the first fixed portion 2a of the body 2.

In this embodiment, the counter spring 3 is housed in the interspace 61 out of the hollow sleeve 70, and the chamber 25 is permanently in communication with the external environment through the duct 26a (obtained in the first support 17), the duct 26b1 (obtained in the second movable portion 2b of the body 2), the chamber 63, the duct 26b2 (obtained in the first fixed portion 2a of the body 2), the duct 26b4 (obtained in the second movable portion 2b of the body 2), the interspace 61 (radially obtained in the second movable portion 2b of the body 2 for the housing of the counter spring 3), the duct 26b3 (obtained in the first fixed portion 2a of the body 2) and the duct 26c (obtained in the envelope 1).

Figure 34A:
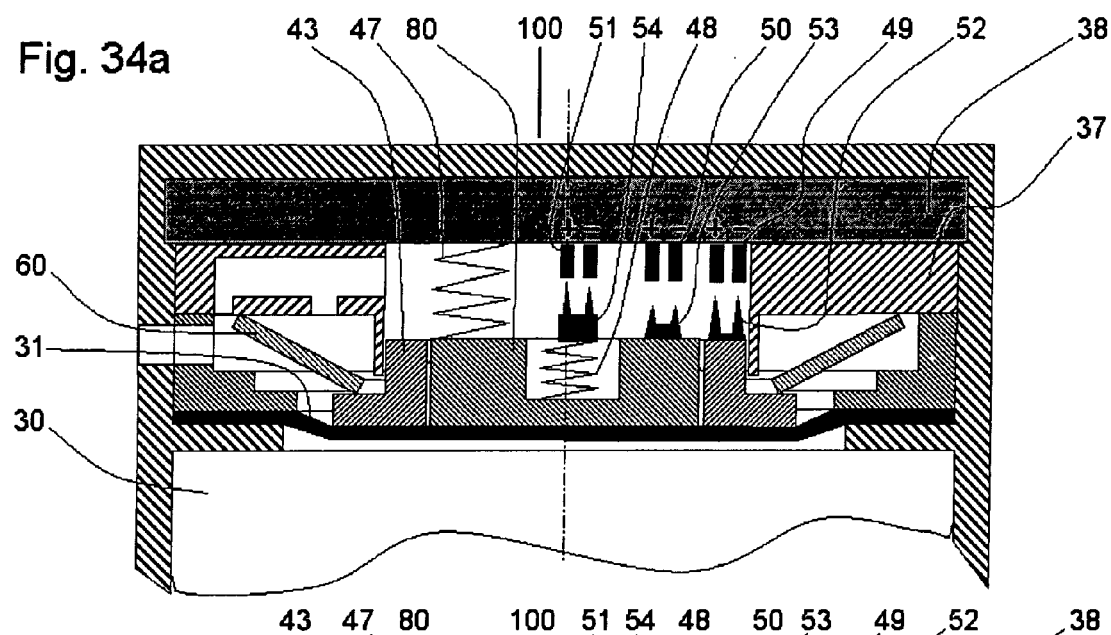
FIGS. 34a and 34b illustrate an eighth embodiment of the device, respectively, in the non-active and in the active condition.

In another embodiment shown in FIG. 34a, the second slider 44 is integral with the third slider 45. Said sliders 44, 45 form a sole fourth slider 80, free to move axially between a distal position and a position proximal with respect to the basis 38.

The first distal position of the fourth slider 80 with respect to the basis 38 is the position of equilibrium reached by the fourth slider 80 when the device 100 is in the first non-active condition, and the pressure of the external environment acts in the measuring chamber 30; the first distal position of the fourth slider 80 is reached because of the reaction of the first elastic means 47, in contrast with the strength to the deformation offered by the second movable diaphragm 31. In this configuration, the second spring 60 keeps the first slider 43 pressed against the second deforming diaphragm 31 in the first distal position with respect to the second support 37.

The first elastic means 47, interposed between the fourth slider 80 and the basis 38, keeps the fourth slider 80 pressed against the second movable diaphragm 31. The second elastic means 48 is located between the fourth slider 80 and the contact 54.

In the configuration of FIG. 34a the three switches consisting of the three couples contact 49-contact 52, contact 50-contact 53, contact 51-contact 54 are found in the condition assumed when the device 100 is in the first non-active condition. The contact 52 is connected to the movement the first slider 43, the contact 53 is connected to the movement of the fourth slider 80. The contact 54 is not connected to a slider, but receives the push directly from the second elastic means 48.

Figure 34B:
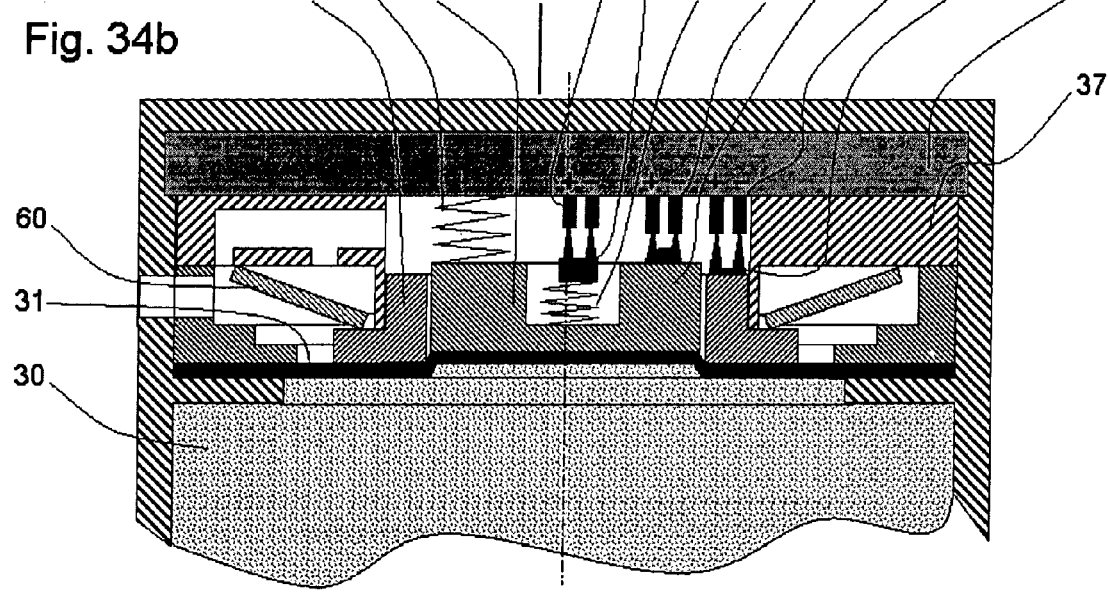

FIG. 34b illustrates the device in the active condition, when the fluid is in the measuring chamber 30, said fluid acting on the second movable diaphragm 31. Said fluid in the measuring chamber 30 has a relative pressure higher that the second threshold value Pcs. The second movable diaphragm 31 acts with a push on the active surface of the fourth slider 80. Said surface is defined by the section of the fourth slider 80 perpendicular to its axis of translation. Section equivalent to the contacting surface between the fourth slider 80 and the second movable diaphragm 31, maintaining the fourth slider 80 in the position proximal with respect to the basis 38, in contrast with the reaction of the first elastic means 47 and second elastic means 48. The position proximal with respect to the basis 38 of the fourth slider 80 is defined by the resting of the contact 53 on the second electric contact 50. In this configuration, the resting of the contact 54 on the electric contact 51 causes the compression of the second elastic means 48, the reaction of which acts on the fourth slider 80.

The second movable diaphragm 31 acts also on the active surface of the first slider 43 with a push, tending to maintain it in the position proximal with respect to the second support 37, in contrast with the reaction of the second spring 60.

In said configuration the three switches, consisting of the three couples contact 49-contact 52, contact 50-contact 53, contact 51-contact 54, are commuted with respect to the condition assumed when the device 100 is in the non-active condition.

In this configuration, the signal indicating the exceeding of the second pre-established threshold pressure value Pcs is emitted by the device 100 when the switch, consisting of the couple contact 50-contact 53, commutes to the condition opposite with respect to condition that said switch has when the device 100 is in the non-active condition. The emission of said signal is inhibited when the switch, consisting of the couple contact 50-contact 53, commutes in the condition that said switch has when the device 100 is in the non-active condition.

Figure 35A:
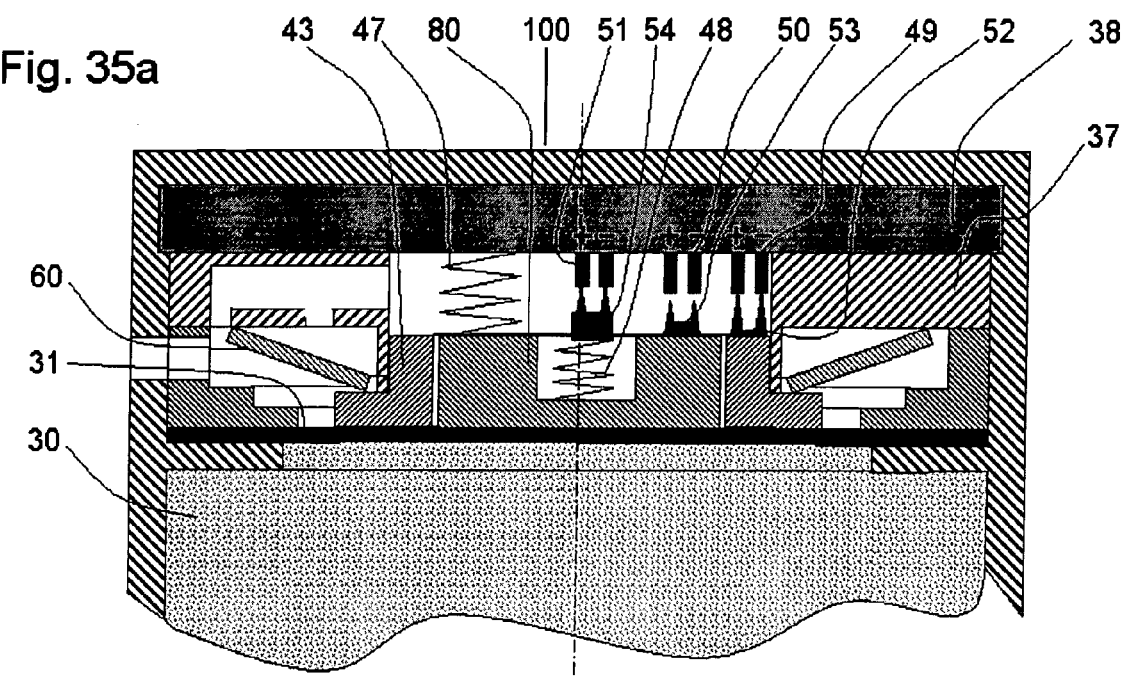
FIGS. 35a and 35b illustrate the embodiment of the device shown in FIGS. 34a and 34b in two different conditions of relative pressure.

If the fluid in the measuring chamber 30 has a relative pressure lower than the second threshold value Pcs, but higher than the third threshold value Padvi (FIG. 35a), the push of the second movable diaphragm 31 on the active surface of the fourth slider 80 is not more sufficient to overcome the reaction of the first and second elastic means 47,48, the fourth slider 80 translates towards a third position with respect to the basis 38, located between the distal and the proximal position, by causing the commutation of the switch, consisting of the couple contact 50-contact 53, to the condition of said switch when the device 100 is in the non-active condition.

By means of a proper balancing of the elastic features of the first and second elastic means 47, 48, the configuration reached when the fluid in the measuring chamber 30 has a relative pressure lower than the second threshold value Pcs, but higher than the third threshold value Padvi, allows the switch, consisting of the couple contact 50-contact 53, to be in the condition assumed when the device 100 is in the non-active condition, while the switch, consisting of the couple contact 51-contact 54, and the switch, consisting of the couple contact 49-contact 52, are kept in the condition commuted with respect to the condition assumed by said switches when the device 100 is in the non-active condition.

Figure 35B:
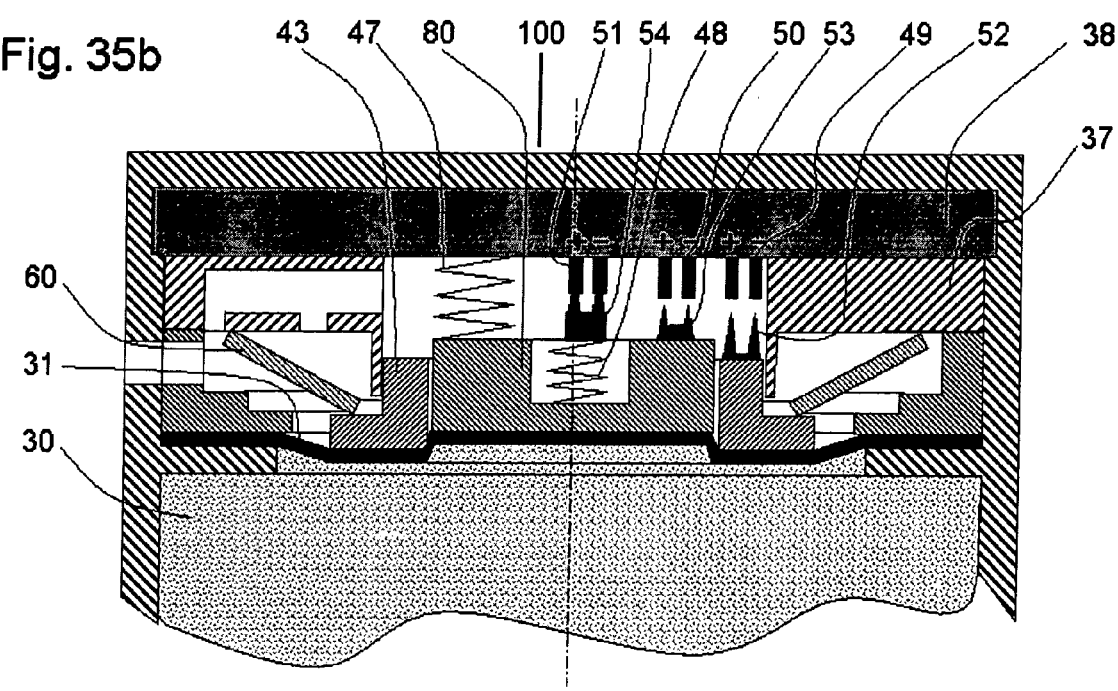

If the fluid in the measuring chamber 30 is has a relative pressure lower than the third threshold value Padvi, but higher than the first threshold value Pci (FIG. 35b), the fourth slider 80 keeps in the range of the third position intermediate with respect to the basis 38 in a configuration allowing the switch, consisting of the couple contact 50-contact 53, to remain in the condition assumed when the device 100 is in the non-active condition, and the switch, consisting of the couple contact 51-contact 54, remains in the condition commuted with respect to the condition assumed when the device 100 is in the non-active condition.

The first slider 43 translates towards the position distal with respect to the second support 37, causing the commutation of the switch, consisting of the couple contact 49-contact 52, to the condition assumed when the device 100 is in the non-active condition. The commutation of the switch, consisting of the couple contact 49-contact 52, causes the emission of the signal indicating the exceeding of the third pre-established threshold pressure Padvi. The emission of said signal indicating the exceeding of the third pre-established threshold pressure Padvi is inhibited when the switch, consisting of the couple contact 49-contact 52, commutes to the condition opposite to the condition assumed when the device 100 is in the non-active condition.

If the fluid in the measuring chamber 30 has a relative pressure lower than the first pre-established threshold value Pci, the device 100 returns in the configuration of FIG. 34a. The fourth slider 80 translates towards the position distal with respect to the basis 38 in a configuration allowing the switch, consisting of the couple contact 50-contact 53, to remain in the condition assumed when the device 100 is in the non-active condition, and the switch, consisting of the couple contact 51-contact 54, commutes in the condition assumed when the device 100 is in the non-active condition because of the features of the second elastic means 48.

The commutation of the switch, consisting of the couple contact 51-contact 54, causes the emission of the signal indicating the exceeding of the first pre-established pressure threshold Pci. The emission of said signal is inhibited when the switch, consisting of the couple contact 51-contact 54, commutes to the condition opposite to the condition assumed when the device 100 is in the non-active condition.

Figure 36A:
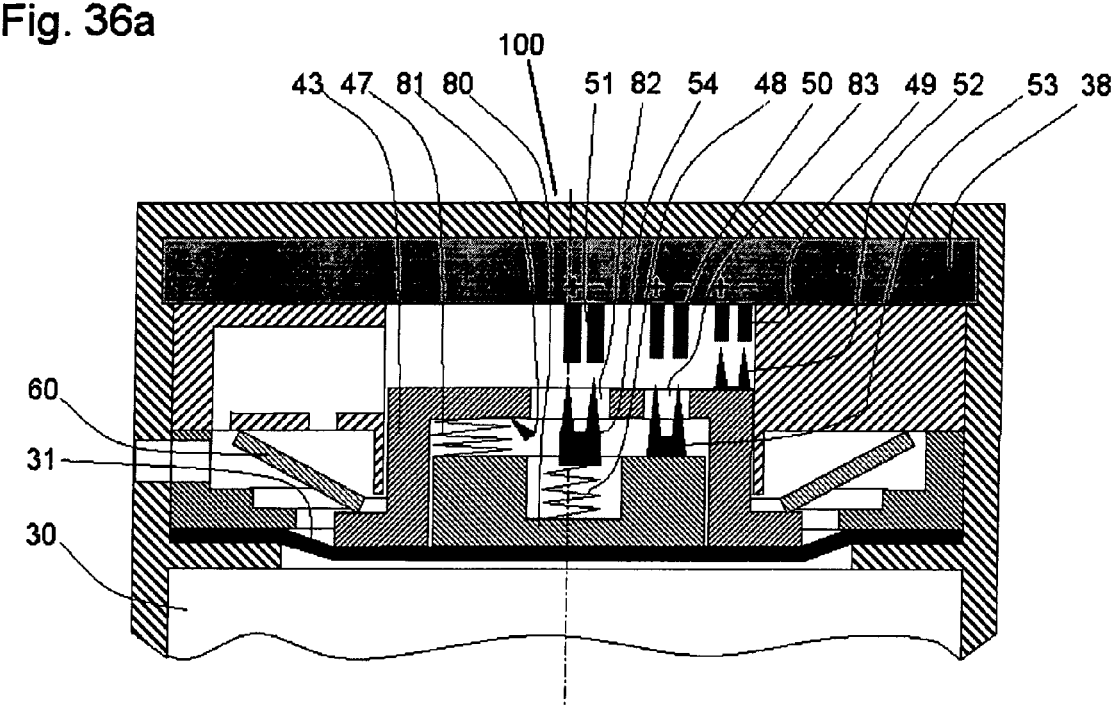
FIGS. 36a and 36b illustrate a ninth embodiment of the device, respectively, in the non-active and in the active condition.

In a further embodiment shown in FIG. 36a, the second slider 44 is integral with the third slider 45. Said sliders 44, 45 form a fourth slider 80. The first elastic means 47 is located between the fourth slider 80 and the wall 81, connected to the movement of the first slider 43. The reaction of the first elastic means 47 discharges on the first slider 43. The fourth slider 80 is free to axially move between a distal position and a position proximal with respect to the basis 38.

The position of the fourth slider 80 distal with respect to the basis 38 is the position of equilibrium reached by the fourth slider 80, when the device 100 is in the non-active condition, and when the pressure of the external environment acts in the measuring chamber 30, because of the reaction of the first elastic means 47 in contrast with the strength to the deformation offered by the second movable diaphragm 31. In this configuration, the second spring 60 keeps the first slider 43 pressed against the second movable diaphragm 31 in the position distal with respect to the second support 37.

The second elastic means 48 is interposed between the fourth slider 80 and the contact 54, which crosses the wall 81 through the aperture 82 in order to act on the third electric contact 51. The contact 53 crosses the wall 81 through the aperture 83, in order to act on the second electric contact 50.

In said configuration the three switches, consisting of the three couples contact 49-contact 52, contact 50-contact 53, contact 51-contact 54, are in the condition assumed when the device 100 is in the non-active condition.

Figure 36B:
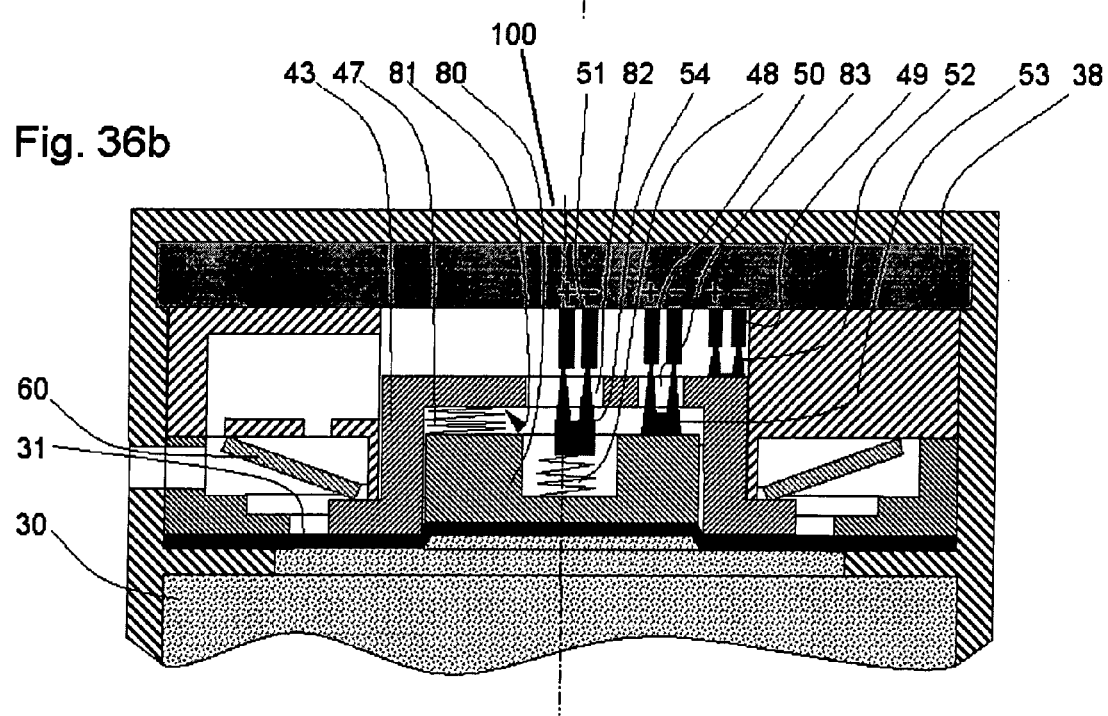

FIG. 36b shows the device in the active condition, when the fluid is in the measuring chamber 30 and acts on the second movable diaphragm 31. Said fluid has a relative pressure higher than the second pre-established threshold value Pcs. The second movable diaphragm 31 acts on the active surface of the fourth slider 80, defined by the section of the fourth slider 80 perpendicular to its axis of translation, section equivalent to the surface of contact between the fourth slider 80 and the second movable diaphragm 31, with a push keeping the fourth slider 80 in the position proximal with respect to the basis 38, in contrast with the reaction of the first and of the second elastic means 47, 48. The position proximal with respect to the basis 38 of the fourth slider 80 is defined by the resting of the contact 53 on the second electric contact 50. In this configuration the resting of the contact 54 on the electric contact 51 causes the compression of the second elastic means 48, the reaction of which acts on the fourth slider 80.

The second movable diaphragm 31 acts also on the active surface of the first slider 43 with a push tending to maintain said slider 43 in the position proximal with respect to the second support 37, in contrast with the reaction of the second spring 60.

In said configuration the three switches, consisting of the three couples contact 49-contact 52, contact 50-contact 53, contact 51-contact 54, are commuted with respect to the condition assumed when the device 100 is in the non-active condition.

Figure 37A:
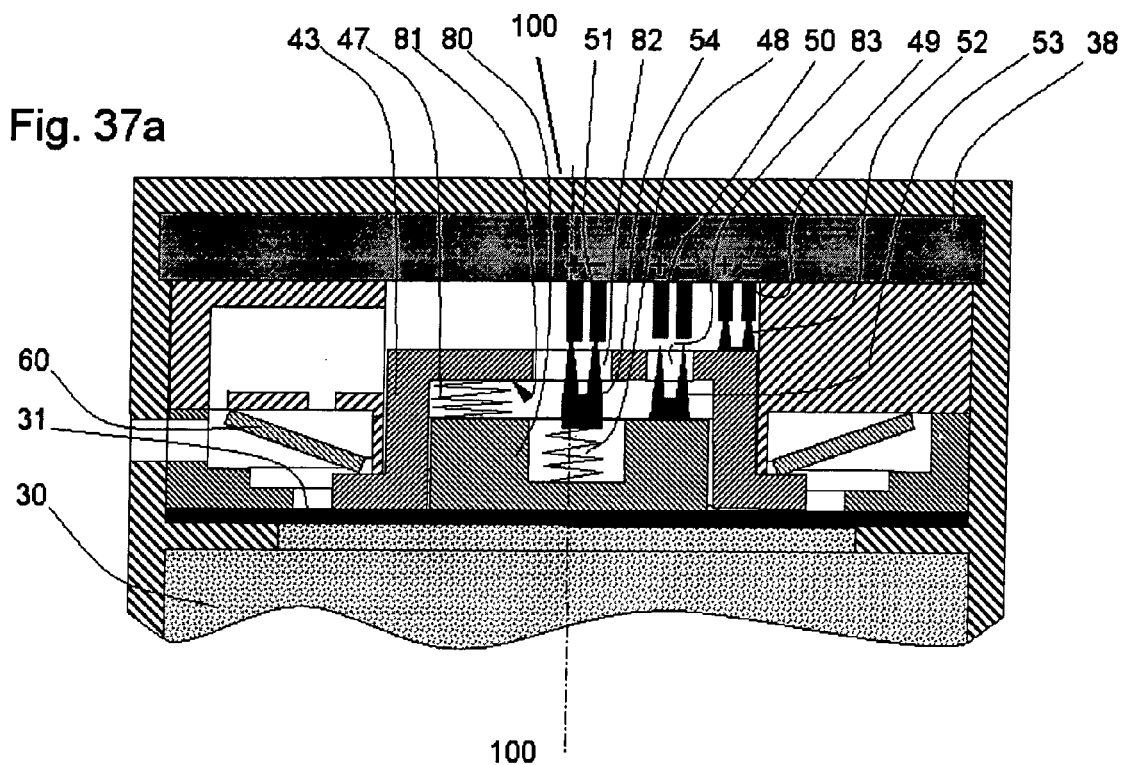
FIGS. 37a and 37b illustrate the embodiment of FIGS. 36a and 36b in two different conditions of relative pressure.

In this configuration, the signal indicating the exceeding of the second pre-established pressure threshold Pcs is emitted by the device 100, when the switch, consisting of the couple contact 50-contact 53, commutes to the condition opposite with respect the condition assumed when the device 100 is in the non-active condition. The emission of said signal is inhibited, when the switch, consisting of the couple contact 50-contact 53, commutes to the condition assumed when the device 100 is in the non-active condition. If the fluid in the measuring chamber 30 has a relative pressure lower than the second threshold value Pcs, but higher than the third threshold value Padvi (FIG. 37a), the push of the second movable diaphragm 31 on the active surface of the fourth slider 80 is not more sufficient to overcome the reaction of the first and of the second elastic means 47, 48. The fourth slider 80 translates towards a third position with respect to the basis 38, finding between the distal position and the proximal position, by causing the commutation of the switch, consisting of the couple contact 50-contact 53, to the condition assumed when the device 100 is in the non-active condition.

By means of a proper balancing of the elastic features of the first and second elastic means 47, 48, the configuration reached when the fluid in the measuring chamber 30 has a relative pressure lower than the second threshold value Pcs, but higher than the third threshold value Padvi allows the switch, consisting of the couple contact 50-contact 53, to be in the condition assumed when the device 100 is in the non-active condition, while the switch, consisting of the couple contact 51-contact 54, and the switch, consisting of the couple contact 49-contact 52, keeps the condition commuted with respect to the condition assumed when the device 100 is in the non-active condition.

Figure 37B:
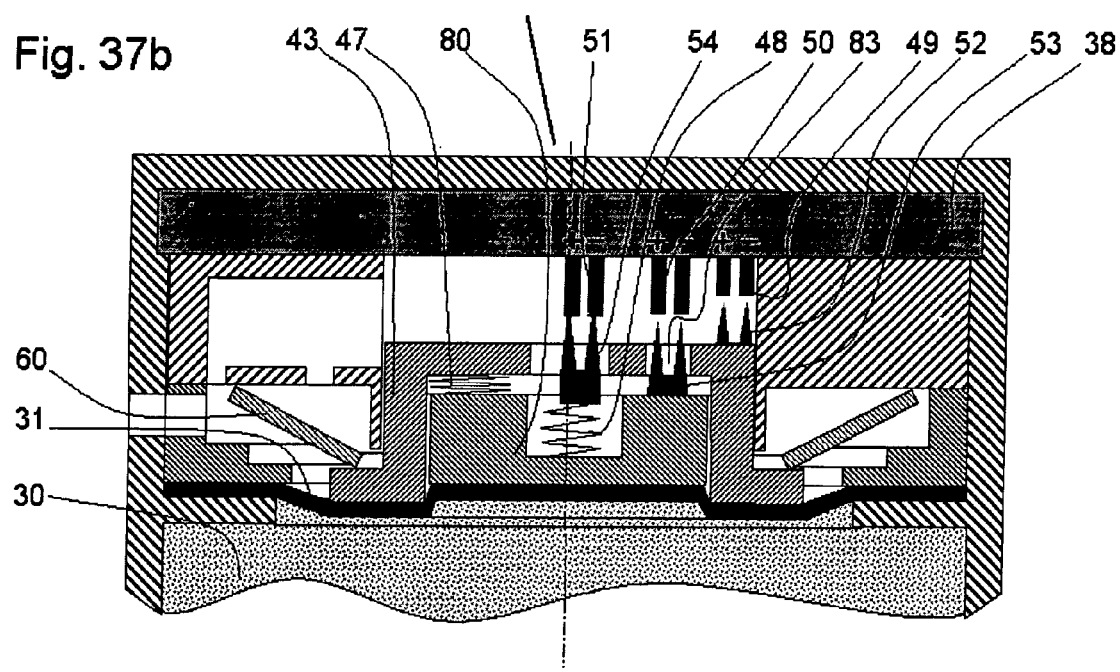

If the fluid in the measuring chamber 30 has a relative pressure lower than the third threshold value Padvi, but higher than the first threshold value Pci (FIG. 37b), the fourth slider 80 remains in the range of the third position intermediate with respect to the basis 38 in a configuration allowing the switch, consisting of the couple contact 50-contact 53, to remain in the condition assumed when the device 100 is in the non-active condition, and the switch, consisting of the couple contact 51-contact 54, remains in the condition commuted with respect to the condition assumed when the device 100 is in the non-active condition.

The first slider 43 translates towards the position distal with respect to the second support 37, by causing the commutation of the switch, consisting of the couple contact 49-contact 52, to the condition assumed when the device 100 is in the non-active condition.

The commutation of the switch, consisting of the couple contact 49-contact 52, causes the emission of the signal indicating the exceeding of the third pre-established threshold pressure Padvi. The emission of said signal is inhibited when the switch, consisting of the couple contact 49-contact 52, commutes to the condition opposite to the condition assumed when the device 100 is in the non-active condition.

If the fluid in the measuring chamber 30 has a relative pressure lower than the first pre-established threshold value Pci, the device 100 returns in the configuration of FIG. 36a. The fourth slider 80 translates towards the position distal with respect to the basis 38, in a configuration allowing the switch, consisting of the couple contact 50-contact 53, to remain in the condition assumed when the device 100 is in the non-active condition, and the switch, consisting of the couple contact 51-contact 54, commutes in the condition assumed when the device 100 is in the non-active condition, because of the features of the second elastic means 48.

The commutation of the switch, consisting of the couple contact 51-contact 54, causes the emission of the signal indicating the exceeding of the first pre-established threshold pressure Pci. Said is inhibited when the switch, consisting of the couple contact 51-contact 54, commutes to the condition opposite to the condition assumed when the device 100 is in the non-active condition.

Figure 22:
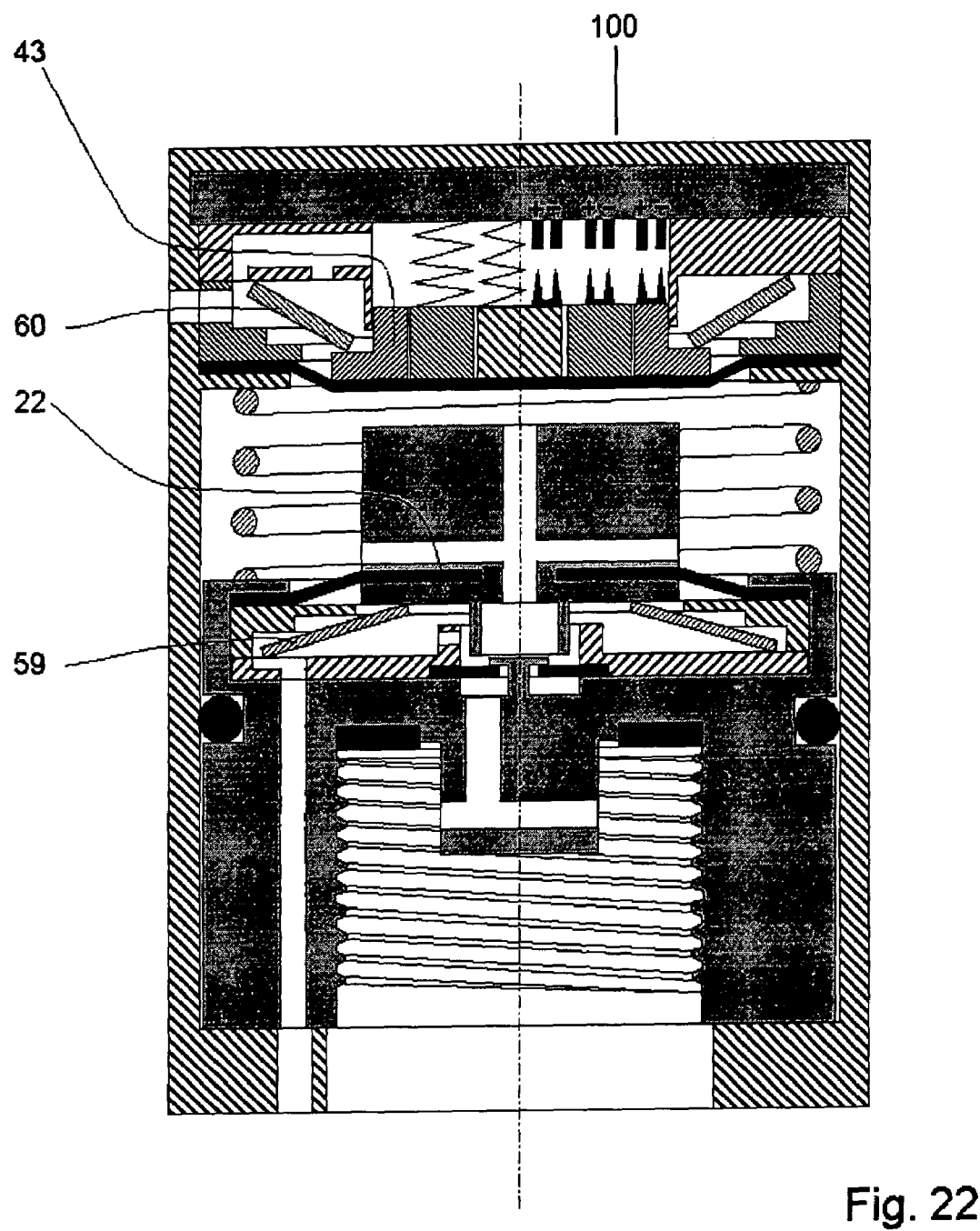
FIG. 22 represents a fourth embodiment of the device.
Figure 38A:
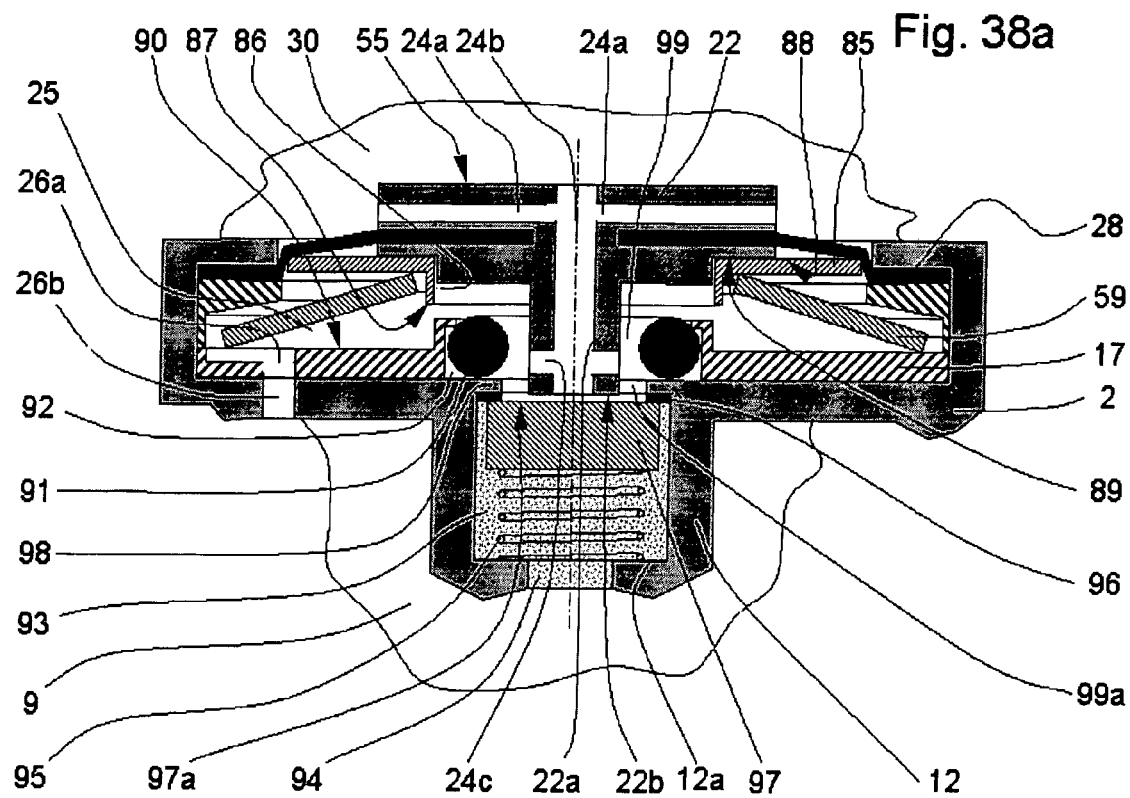
FIGS. 38a and 38b represent the device, respectively, in the non-active and in the active condition.
Figure 38B:
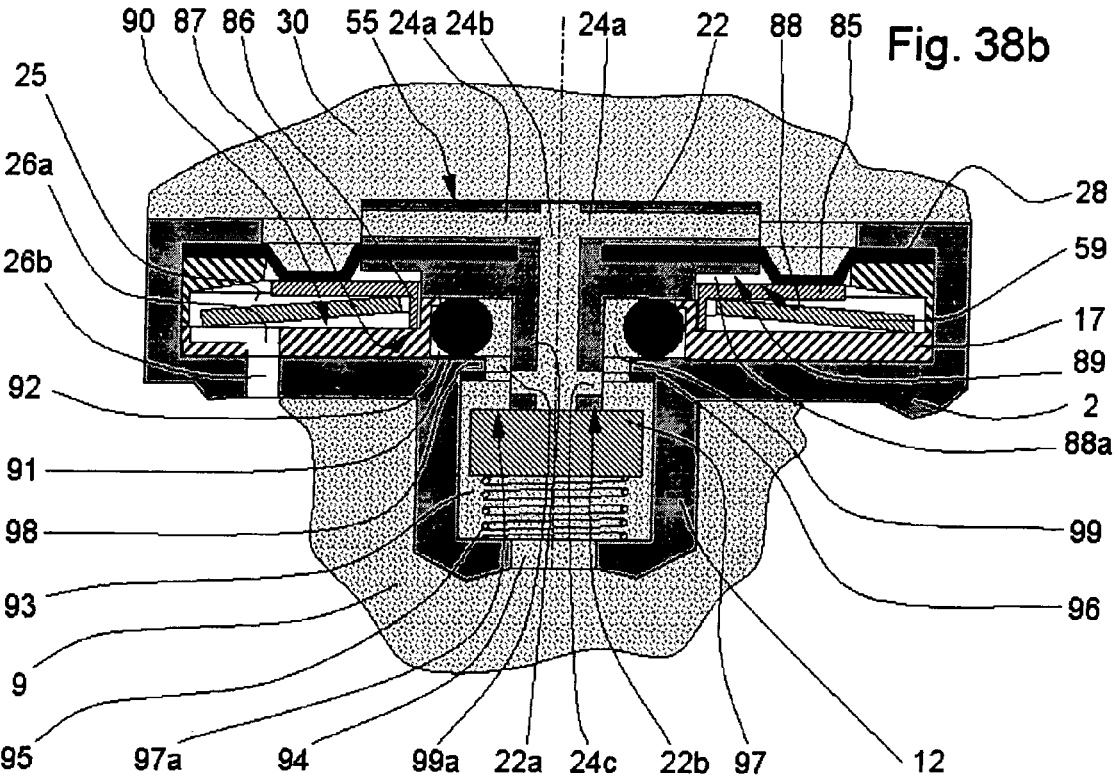

In a subsequent embodiment, shown in FIGS. 38a and 38b, with reference to the device explained in FIG. 10 (or FIG. 22), a plate 85 is interposed between the rigid member 22 and the first spring 59. The plate 85 is free to axially translate with respect to the rigid member 22 between a distal position and a position proximal with respect to the first support 17.

The position of the plate 85 distal with respect to the first support 17 is defined by the contact between the side 88 of the plate 85 and the side 89 of the rigid member 22. The contact between the side 88 of the plate 85 and the side 89 of the rigid member 22 is due the elastic reaction of the first spring 59 in contrast with the strength to deformation of the first movable diaphragm 28.

The position proximal of the plate 85 with respect to the first support 17 is defined by the contact between the end 87 of the hollow protuberance 86, connected to the movement of the plate 85, with the wall 90 of the first support 17. When the plate 85 is in the position proximal with respect to the first support 17 the higher value of compression of the first spring 59 is obtained.

A protuberance 22a, integral with the rigid member 22, houses the ducts 24b and 24c. A gasket 91 is housed in a seat 92, located between the first support 17 and the body 2. The seat 92 prevents the gasket 91 to move axially. The chamber 25 is found out of the seat 92 and communicates with the external environment through the ducts 26a and 26b.

A chamber 93 communicates with the chamber 9 through the duct 94. When the chamber 9 is connected to the environment containing the fluid to be surveyed, said fluid invades also the chamber 93. A gasket 96 is located between a rigid member 97 and a limit stop 98 integral with the body 2.

The rigid member 97 translates axially between a position proximal with respect to the limit stop 98, defined by the contact a seal between the rigid member 97 and the limit stop 98 through the gasket 96, and a position distal with respect to the limit stop 98, defined by the interruption of the seal of the gasket 96 and the connection between the chamber 93 and a chamber 99, internal to the gasket 91, through a duct 99a obtained in the meatus situated between the limit stop 98 and the protuberance 22a.

A spring 95, interposed between a limit stop 12a, located in the protuberance 12 integral with the body 2, and the rigid member 97, puts the rigid member 97 into contact with the gasket 96, which is, therefore, compressed between the rigid member 97 and the limit stop 98.

FIG. 38a shows the apparatus when the device 100 is in the non-active condition. Both the rigid member 22 and the plate 85 are in their position distal with respect to the first support 17.

The end 22b of the protuberance 22a is not in contact with the end 97a of the rigid member 97; therefore the gasket 96 is compressed against the limit stop 98 by the push of the spring 95. If the fluid is in the chamber 9, it is also in the chamber 93 through the duct 94. Therefore, the push due to the relative pressure of the fluid acts on the rigid member 97, multiplied by the section of the seat of the gasket 96 added to the action of the spring 95. The seal of the rigid member 97 is hermetic.

The commutation of the device 100 from the first non-active condition to the second active condition (FIG. 38b) is obtained by means of the axial translation of the envelope 1 from the distal position to a position proximal with respect to the end 4; the translation is due to an external force F acting on the envelope 1. The force F is sufficient to overcome the reaction of the counter spring 3, the first spring 59 and the second spring 60.

The axial translation of the envelope 1 due to the force F causes, at first, the approach of the second movable diaphragm 31 to the end 55 of the rigid member 22 by contrasting the action of the counter spring 3 only.

When the end 55 of the rigid member 22 comes into contact with the second movable diaphragm 31, the subsequent action of the force F contrasts also the action of the first and second spring 59, 60, and causes the translation of the rigid member 22 and the plate 85, in contrast with the action of the first spring 59, at their respective proximal positions.

The position of the rigid member 22 proximal with respect to the first support 17 is defined, in this embodiment, by the sealing contact between the rigid member 22 and the gasket 91.

The translation of the rigid member from distal the position to the position proximal with respect to the first support 17 causes the contact between the end 22b of the protuberance 22a and the end 97a of the rigid member 97 and the subsequent translation of the rigid member 97 to a position distal with respect to the limit stop 98, connecting the chamber 93 to the chamber 99 through the duct 99a.

A so realised seal separates the chamber 99 from the chamber 25. The chamber 99 is, in its turn, connected on one side to the measuring chamber 30 through the ducts 24c, 24b and 24a, and on the other side to the chamber 93, the duct 94 and the chamber 9, where the fluid is found. Therefore, said fluid can invade the chamber 99 and the measuring chamber 30.

The plate 85 is entrained by the translation of the rigid member 22 and remains in contact with the rigid member 22 until it does not reached the position proximal with respect to the first support 17. The relative pressure of the fluid in the measuring chamber 30 acts on the first movable diaphragm 28, by causing two functions.

The first function consists of the force acting on the rigid member 22, tending to compress the gasket 91 for assuring the seal and the separation of the chamber 99 from the chamber 25. Said force is given by the product of the relative pressure of the fluid in the measuring chamber 30, multiplied by the effective section of the rigid member 22, and keeps the rigid member 22 in contact with the gasket 91.

The second function consists of the force acting on the plate 85, tending to compress the first spring 59. Said force is given by the product of the relative pressure of the fluid in the measuring chamber 30, multiplied by the effective section of the plate 85.

The effective section of the plate 85 and the feature of the first spring 59 are so chosen that, if the relative pressure of the fluid in the measuring chamber 30 is higher or equal to the first pre-established threshold Pci, the plate 85 reaches and keeps its second position proximal with respect to the first support 17 with stability.

The axial position of the rigid member 22 in the position proximal with respect to the first support 17, consequent to the equilibrium between the push due to the relative pressure of the fluid in the measuring chamber 30 and the reaction of the gasket 91, is uncertain and continuously variable in the time, since it depends on the form tolerances of the gasket 91 and the continuous changing in the time of the elastic features of the material (usually elastomer) forming the gasket 91.

When the rigid member 22 is in the position proximal with respect to the first support 17 and the plate 85 is in its position proximal with respect to the same support 17, the side 88 of the plate 85 and the side 89 of the rigid member 22 are separated by a meatus 88a sufficient to assure that the side 88 of the plate 85, the position of which remains fixed with respect to the first support 17, and the side 89 of the rigid member 22 do not come into contact each other for any changing of the axial position of the rigid member 22.

Because of the uncertainty of the axial position of the rigid member 22 it is not possible to realise a device capable of sensing, with certainty and without changing in the time, the exceeding of the first pre-established threshold Pci, by means of the rigid member 22 directly acting on the first spring 59. This example is represented in FIG. 10, because of the fact that the position of equilibrium of the rigid member 22, variable for the above mentioned reasons, causes a reaction of the first spring 59 that cannot be predetermined and is continuously variable in the time, and causes also a effective position completely uncertain of the seal.

The embodiment shown in FIGS. 38a and 38b solves this problem. In fact, the separation of the rigid member 22 from the plate 85 allows to uncouple the actions regarding the seal of the gasket 91 (for separating the chamber 99 from the chamber 25) and the actions involved in the equilibrium of the first spring 59.

The reaction of the first spring 59 contrasts the push of the relative pressure of the fluid in the measuring chamber 30, multiplied by the effective section of the plate 85.

The stronger reaction of the first spring 59 depends on the proximal position reached by the plate 85 with respect to the first support 17, which is certain and invariable (since it is defined by the contact between the end 87 of the hollow protuberance 86, integral with the plate 85, and the wall 90 of the first support 17), and it is completely independent on the position of equilibrium reached by the rigid member 22 with respect to the compression of the gasket 91.

The effective section of the rigid member 22 is so planed to guarantee a force sufficient to assure the seal of the gasket 91, not only when the relative pressure of the fluid in the measuring chamber 30 has a value higher or equal to the first pre-established threshold value Pci, but also when the relative pressure of said fluid has a value a few lower than the first pre-established threshold value Pci of relative pressure.

If the relative pressure of the fluid in the measuring chamber 30 is higher than the first pre-established threshold value Pci, the force acting on the plate 85 is sufficient to overcome the reaction of the first spring 59 and to maintain the plate 85 in the position proximal with respect to the first support 17.

If the relative pressure of the fluid in the measuring chamber 30 is equal or lower than the first pre-established threshold value Pci, the force acting on the plate 85 is not more sufficient to overcome the reaction of the first spring 59, and the plate 85 translates towards the position distal with respect to the first support 17.

When the translation of the plate 85 starts, the rigid member 22 is still in contact with the gasket 91 and keeps the seal separating the chamber 99 from the chamber 25, thanks to the proper planing of the effective section of the rigid member 22. In the first section of the translation, the plate 85 covers the meatus 88a separating the side 88 of the plate 85 from the side 89 of the rigid member 22. In this first section of translation the plate 85 does not act with any push on the rigid member 22. When the side 88 of the plate 85 comes into contact with the side 89 of the rigid member 22, the plate 85 transmits the reaction of the first spring 59 to the rigid member 22. The equilibrium of the forces acting on the rigid member 22 is, therefore, interrupted and the plate 85, continuing its translation towards the position distal with respect to the first support 17 because of the reaction of the first spring 59, drags also the rigid member 22 towards the position distal with respect to the first support 17.

The translation of the rigid member 22 towards the position distal with respect to the first support 17 causes the end of the seal between the rigid member 22 and the gasket 91, connecting the chamber 99 to the chamber 25, on its turn connected to the external environment, and causes also the translation of the rigid member 97 from the distal position to the position proximal with respect to the limit stop 98, restoring the seal of the gasket 96 and interrupting the connection of the chamber 93 to the chamber 99.

By means of a proper choice of the elastic features of the gaskets 91, 96, and making so that the seal of the gasket 96 with respect to the limit stop 98 and to the rigid member 97 operates before the end of the seal of the gasket 91 on the rigid member 22, it is possible to avoid to directly connect the chambers 93, 95 to the chamber 25.

An analogous embodiment can be applied to the device according to the fifth embodiment of the device 100, having the aim of minimising the axial and radial dimensions. This embodiment, shown in FIG. 23, provides the decomposing of the body 2 in two portions, a first fixed portion 2a used for fixing the device 100 on the end 4, and a second movable portion 2b free to axially translate both with respect to the first fixed portion 2a and with respect to the envelope 1.

The above mentioned apparatuses are housed in the second movable portion 2b of the body 2 rather than in the body 2. The chamber 93 and the duct 94, and also the spring 95, the gasket 96 and the rigid member 97 are housed in the protuberance 66 integral with the second movable portion 2b of the body 2.

Figure 39:
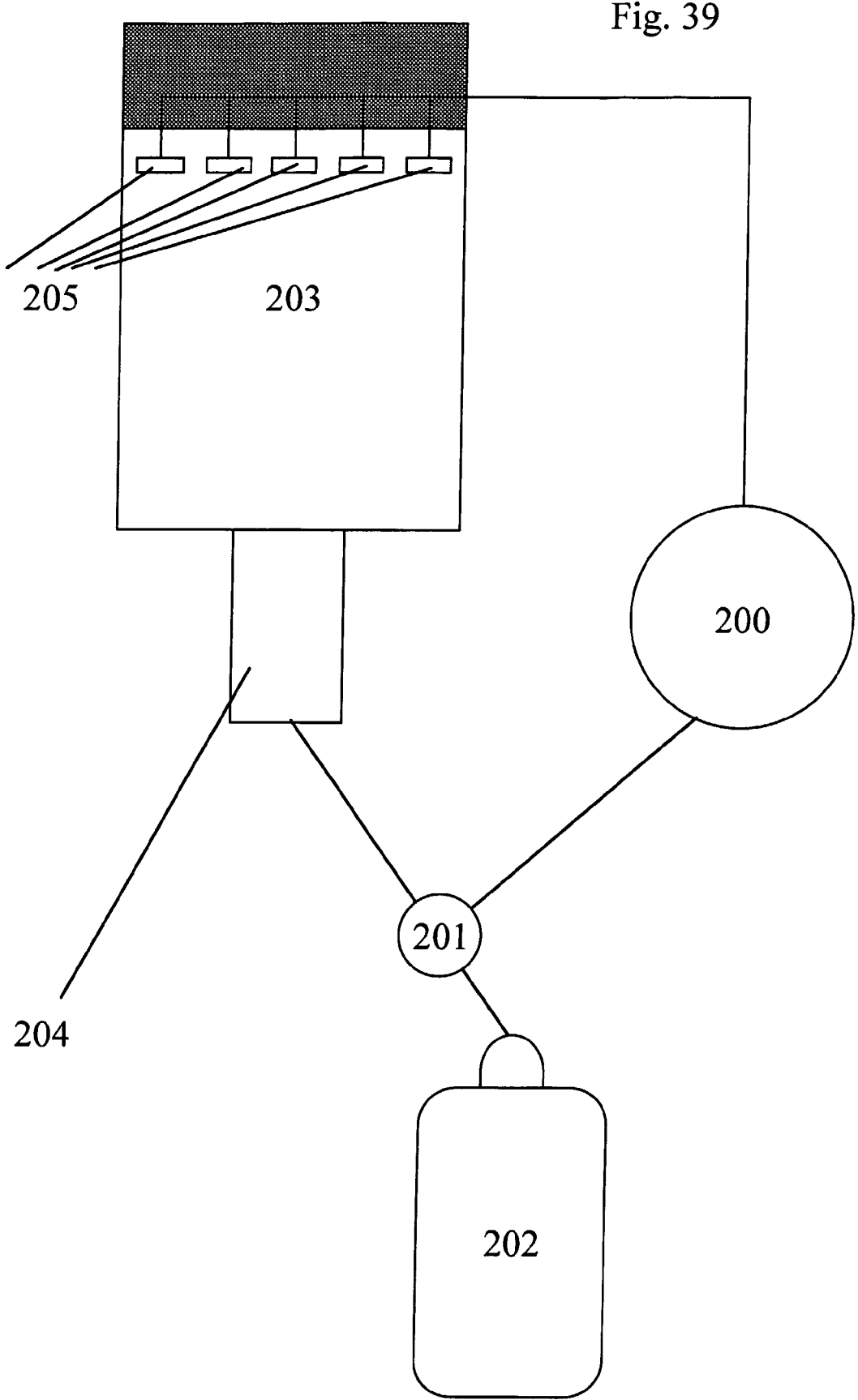
FIG. 39 shows an apparatus according the prior art documentation.

The known apparatus shown in FIG. 39 consists of a hollow body 203 housing a plurality of sensors 205 capable of sensing the pressure or another physical characteristic of the fluid of the hollow body 203. The sensors 205 send signals to a control unit 200 acting on a solenoid valve of a faucet 201. The faucet 201 regulates the flow rate of the fluid coming from a bottle 202 and sent to an inlet 204 of the hollow body 203.

Each sensor is suitable for a pre-established threshold of relative pressure in the hollow body 203. In particular, one of the sensors commutes from a first to a second condition when the relative pressure is lower than a threshold Pci. Therefore, when said sensor commutes from the first to the second condition, the control unit 200 receives a signal indicating a relative pressure lower than said threshold Pci.

In this case, the control unit 200 processes an electrical signal closing the faucet 201 in order to prevent the passage of the fluid from the bottle 202 to the inlet 204 of the hollow body 203.

This apparatus controls the devices of FIGS. 2a and 2c, but it is not capable of controlling the inflation valve shown in FIG. 2b.

The invention claimed is:

1. A device for surveying the pressure of fluids housed in tanks or flowing through ducts, characterised by the fact that it comprises the following elements:

a connecting body having an axial symmetry;

connecting means connectable to ends of tubes coming from containers or pipes to send a fluid to the body;

an external envelope, with axial symmetry, housing the connecting body, the external envelope sliding on the connecting body from a first distal position to a second position proximal with respect to the body according when an external force (F) acts on the envelope;

self-closing means capable of sealing an entrance room located between the connecting means and a measuring chamber;

a manoeuvre member, integral with a rigid member, and mechanically connected to the external envelope; the manoeuvre member allows that the self-closing means open the entrance room, when the external envelope is sliding from the first distal position to the second proximal position;

the manoeuvre member allows the closing of the self-closing means when the external envelope is in the distal position and the relative pressure of the fluid in the measure chamber is lower than a first pre-established threshold value (Pci);

the rigid member forms a sensor with a relative pressure threshold, since the manoeuvre member, integral with the rigid member, remains in the proximal position when the action of the force (F) stops only if the relative pressure of the fluid is higher or the same than the first pre-established threshold value; on the contrary, the manoeuvre member moves towards the distal position if the relative pressure of the fluid is lower than said first pre-established threshold value;

signalling means are provided to signal the distal or proximal position of the rigid member to the external environment;

the measuring chamber contains the fluid of the container or pipe coming through passages, from the entrance room when opened by the manoeuvre member; at least the pressure force of the fluid acts in the measuring chamber; the manoeuvre member closes the connection among the measuring chamber, the ends and the external environment;

a deforming element sensitive to the forces acting in the measuring chamber, said deforming element being capable of moving the manoeuvre member together with said rigid member which guides the deforming element;

a space connected to the external environment and housing a spring, the space is found in a position opposite to the measuring chamber so that the spring acts on the deforming element contrasting at least the pressure force in the measuring chamber on the deforming element; therefore, when the manoeuvre member is in a position proximal with respect to a first support and the relative pressure in the measuring chamber is lower than the first pre-established threshold (Pci), the force of the spring exceeds the contrasting forces acting on the deforming element, and the element moves the manoeuvre member towards a distal position, allowing that the self-closing means close the entrance room;

passages are further provided, connecting the measuring chamber to the environment when the self-closing means closes the entrance room.

2. The device as in claim 1, wherein a spring is housed in the measuring chamber;
said spring is located between the end of the body and a supporting basis, integral with the external envelope;
in this way, the spring can move said external envelope towards the first distal position with respect to the end;
in the first distal position a limit stop of the external envelope is in contact with the body.

3. The device as in claim 1, wherein the deforming element is defined by a first movable diaphragm and wherein the measuring chamber is delimited by the first movable diaphragm, the rigid member, the body, the external envelope and a second movable diaphragm.

4. The device as in claim 3, wherein a first Belleville washer, is further provided,
said washer acting on the rigid member, contrasting the action of at least the force of the pressure in the measuring chamber on said rigid member, and on the first movable diaphragm.

5. The device as in claim 4, wherein a second Belleville washer is also provided, said second washer acting on a first slider.

6. The device as in claim 1, wherein measure mechanisms are further provided,
said measure mechanisms acting according to the equilibrium between the forces of the relative pressure in the measuring chamber and the forces of elastic elements contrasting the forces of the relative pressure.

7. The device as in claim 1, wherein a rigid support consists of a basis fixed by a wall, integral with the external envelope.

8. The device as in claim 1, wherein the self-closing means comprises a valve with three ways and two positions; wherein the entrance room, which feeds the valve with three ways and two positions, and the space, connected to the external environment, are always separated;
wherein the entrance room is connected to a cavity located at the extremity of the end, while the space communicates with the external environment.

9. The device as in claim 8, wherein the valve with three ways and two positions comprises a self-closing diaphragm held by a seat, located between the first support and the body.

10. The device as in claim 9, wherein the valve with three ways and two positions further consists of the self-closing diaphragm;
said closing diaphragm having a surface sealing the entrance room when said surface is in contact with an edge of a head, disposed at the extremity of a pin integral with the body; the pin crosses a hole located in the self-closing diaphragm.

11. The device as in claim 9, wherein the manoeuvre member consists of a hollow rod, integral with the rigid member,
the hollow rod opens the self-closing diaphragm to commute the valve with three ways and two positions from a first condition, defined by the disjunction of the hollow rod from the self-closing diaphragm, to a second condition in which the contact between the edge of the hollow rod and the surface of the self-closing diaphragm seals the communication between a cavity of the hollow rod and the space.

12. The device as in claim 11, wherein the commutation of the valve with three ways and two positions in the second condition occurs when the hollow rod, in contact with the surface of the diaphragm, acts on the diaphragm with a push sufficient to move the surface towards the entrance room communicating with the cavity.

13. The device as in claim 8, wherein the manoeuvre member acts on the valve with three ways and two positions for commuting from the closing condition to the opening condition, in closing condition the entrance room is separated from the measuring chamber and the measuring chamber communicates with the environment, while, in the opening condition the entrance room communicates with the measuring chamber, and the measuring chamber is separated from the external environment.

14. The device as in claim 1, wherein other sensors are further provided, said other sensors commuting from first to second conditions of equilibrium to emit signals depending on the instantaneous value of the relative pressure of the fluid to be surveyed; the sensors being capable of sensing thresholds (Padvi, Pci, Pcs) of different values of the relative pressure of the fluid founding in the measuring chamber.

15. The device as in claim 14, wherein said other sensors are sensitive of the force of the relative pressure in the measuring chamber transmitted to the sensors through a second movable diaphragm.

16. The device as in claim 15, wherein said other sensors consist of sliders resting on the second movable diaphragm, of elastic members, of contacts supported by the sliders, and of contacts fixed to a basis;
if the value of the relative pressure in the measuring chamber exceeds a threshold value (Padvi, Pci, Pcs), the contacts supported by the sliders touch the contacts fixed to the basis for defining a first electric condition; vice-versa, if the value of the relative pressure in the measuring chamber is lower than the threshold value (Padvi, Pci, Pcs), the contacts supported by the sliders are detached from the contacts fixed to the basis for defining a second electric condition.

17. The device as in claim 16, further comprising electric circuits and apparatuses mounted on the basis: wherein in said electric conditions said electric circuits and apparatuses generate signals to be transmitted to the external environment.

18. The device as in claim 16, wherein a second slider is integral with a third slider for forming a sole fourth slider, free to axially move between a distal position and a position proximal with respect to the basis.

19. The device as in claim 18, wherein the fourth slider is in a first distal position with respect to the basis, the distal position being the position of equilibrium reached by the fourth slider when the environmental pressure acts in the measuring chamber;
the first distal position of the fourth slider is reached because of the reaction of a first elastic member contrasting with the strength to the deformation offered by a second movable diaphragm;
a second spring keeps the first slider pressed against the second movable diaphragm in the first position distal with respect to a second support.

20. The device as in claim 19, wherein the first elastic member, located between the fourth slider and the basis, keeps the fourth slider pressed against the second movable diaphragm.

21. The device as in claim 19, wherein a second elastic member is located between the fourth slider and the contact.

22. The device as in claim 16, wherein a fourth slider comprises a joined second and third sliders;
a first elastic member is found between the fourth slider and the wall, connected to a first slider; the reaction of the first elastic member discharges on the first slider, and the fourth slider is free to axially move between a distal position and a position proximal with respect to the basis.

23. The device as in claim 14, wherein said other sensors are housed in a cavity joined to the environment for referencing the value of the pressure in the measuring chamber to the value of the external environment.

24. The device as in claim 1, wherein the rigid member is fitted with internal ducts to connect the entrance room to the measuring chamber through the cavity, when the forces acting in the measuring chamber exceed the spring.

25. The device as in claim 1, wherein an interspace is provided,
said interspace being obtained by increasing the radial dimensions of the external envelope to keep the advantage consisting in the shortening of the total length of the device and to maintain a counter spring, disposed between the body and the supporting basis, integral with the external envelope.

26. The device as in claim 1, wherein the connecting body is separated in two portions,
a first fixed portion for fastening the device to the end, and
a second movable portion axially translating both with respect to the fixed portion and with respect to the external envelope.

27. The device as in claim 26, wherein a flange is realised at the end of a protuberance, integral with the movable portion of the body;
a gasket being located between the flange and an end, integral with the fixed portion of the body; the gasket sealing the flange and the end.

28. The device as in claim 27, wherein the body houses a cavity, in which the protuberance axially translates.

29. The device as in claim 26, wherein a hollow sleeve is integral with the movable portion of the body;
the internal wall of the hollow sleeve axially sliding with respect to a peripheral wall of the fixed portion.

30. The device as in claim 29, wherein the internal wall is coupled to the peripheral wall with a sufficient accuracy, therefore the hollow sleeve forms a guide for the movable portion.

31. The device as in claim 29, wherein a counter spring is housed in an interspace out the hollow sleeve;
the space is permanently connected to the external environment through a duct, obtained in the first support, a duct located in the movable portion, a chamber separating the first fixed portion from the second movable portion, a duct obtained in the fixed portion, a duct obtained in the movable portion, the interspace radially obtained in the movable portion to house the counter spring, a duct obtained in the fixed portion and a duct obtained in the external envelope.

32. The device as in claim 1, wherein a plate is further provided,
the plate being disposed between the rigid member and a first Belleville washer;
the plate being free to axially translate, with respect to the rigid member between a distal position and a position proximal with respect the first support.

33. The device as in claim 32, wherein the rigid member and the plate are separated to uncouple the actions regarding the seal of a gasket for separating a chamber internal to the gasket from a chamber connected to the external environment.

* * * * *